US010867440B2

(12) United States Patent
Venshtain

(10) Patent No.: US 10,867,440 B2
(45) Date of Patent: *Dec. 15, 2020

(54) SYSTEMS AND METHODS FOR CAPTURING, TRANSFERRING, AND RENDERING VIEWPOINT-ADAPTIVE THREE-DIMENSIONAL (3D) PERSONAS

(71) Applicant: Verizon Patent and Licensing Inc., Basking Ridge, NJ (US)

(72) Inventor: Simion Venshtain, Chicago, IL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/865,122

(22) Filed: Jan. 8, 2018

(65) Prior Publication Data
US 2019/0042832 A1 Feb. 7, 2019

Related U.S. Application Data

(60) Provisional application No. 62/542,267, filed on Aug. 7, 2017.

(51) Int. Cl.
*G06T 15/20* (2011.01)
*G06T 17/20* (2006.01)
(Continued)

(52) U.S. Cl.
CPC .......... *G06T 17/20* (2013.01); *G06F 3/04815* (2013.01); *G06K 9/00201* (2013.01);
(Continued)

(58) Field of Classification Search
None
See application file for complete search history.

(56) References Cited

U.S. PATENT DOCUMENTS 6,438,266 B1 8/2002 Bajaj et al.
6,668,091 B1 12/2003 Kim et al.
(Continued)

OTHER PUBLICATIONS

Tao, et al., "SimpleFlow: A Non-iterative, Sublinear Optical Flow Algorithm", Computer Graphics Forum (Eurographics 2012), 31(2), 9 pages, May 2012.

*Primary Examiner* — Tize Ma

(57) ABSTRACT

Systems and methods relate to receiving a plurality of video streams captured of a subject by a plurality of video cameras, each video stream including video frames time-synchronized according to a shared frame rate, each video camera having a known vantage point in a predetermined coordinate system; obtaining at least one three-dimensional (3D) mesh of the subject at the shared frame rate, the 3D mesh time-synchronized with the video frames of the video streams, the at least one mesh including a plurality of vertices with known locations in the predetermined coordinate system; calculating one or more lists of visible-vertices at the shared frame rate, each list including a subset of the plurality of vertices of the at least one 3D mesh of the subject, the subset being a function of the location of the known vantage point associated with at least one of the plurality of video cameras; generating one or more time-synchronized data streams at the shared frame rate, the one or more time-synchronized data streams including: one or more video streams encoding at least one of the plurality of video streams; and one or more geometric-data streams including the calculated one or more visible-vertices lists; and transmitting the one or more time-synchronized data streams to a receiver for rendering of a viewpoint-adaptive 3D persona of the subject.

21 Claims, 27 Drawing Sheets

(51) Int. Cl.

| | | |
|---|---|---|
| *G06T 19/20* | (2011.01) | |
| *G06F 3/0481* | (2013.01) | |
| *H04N 7/15* | (2006.01) | |
| *G06K 9/20* | (2006.01) | |
| *H04L 29/06* | (2006.01) | |
| *H04N 13/254* | (2018.01) | |
| *G06K 9/00* | (2006.01) | |
| *H04N 13/271* | (2018.01) | |
| *H04N 7/14* | (2006.01) | |
| *G06T 7/73* | (2017.01) | |
| *H04N 13/214* | (2018.01) | |
| *G06K 9/46* | (2006.01) | |
| *G06K 9/62* | (2006.01) | |
| *G06T 19/00* | (2011.01) | |
| *G06T 15/08* | (2011.01) | |
| *H04L 12/18* | (2006.01) | |

(52) U.S. Cl.
CPC ..... *G06K 9/00228* (2013.01); *G06K 9/00281* (2013.01); *G06K 9/2018* (2013.01); *G06K 9/4642* (2013.01); *G06K 9/6207* (2013.01); *G06K 9/6289* (2013.01); *G06T 7/74* (2017.01); *G06T 7/75* (2017.01); *G06T 15/20* (2013.01); *G06T 19/003* (2013.01); *G06T 19/20* (2013.01); *H04L 29/06176* (2013.01); *H04L 65/604* (2013.01); *H04L 65/607* (2013.01); *H04N 7/142* (2013.01); *H04N 7/147* (2013.01); *H04N 7/157* (2013.01); *H04N 13/214* (2018.05); *H04N 13/254* (2018.05); *H04N 13/271* (2018.05); *G06T 15/08* (2013.01); *G06T 2200/04* (2013.01); *G06T 2200/08* (2013.01); *G06T 2207/10024* (2013.01); *G06T 2207/10028* (2013.01); *G06T 2207/30201* (2013.01); *G06T 2207/30204* (2013.01); *G06T 2215/16* (2013.01); *H04L 12/18* (2013.01)

(56) References Cited

U.S. PATENT DOCUMENTS

| | | | |
|---|---|---|---|
| 7,142,209 | B2 | 11/2006 | Uyttendaele et al. |
| 8,643,701 | B2 | 2/2014 | Nguyen et al. |
| 8,649,592 | B2 | 2/2014 | Nguyen et al. |
| 8,818,028 | B2 | 8/2014 | Nguyen et al. |
| 9,008,457 | B2 | 4/2015 | Dikmen et al. |
| 9,053,573 | B2 | 6/2015 | Lin et al. |
| 9,055,186 | B2 | 6/2015 | Lin et al. |
| 9,300,946 | B2 | 3/2016 | Do et al. |
| 9,386,303 | B2 | 7/2016 | Nguyen et al. |
| 9,414,016 | B2 | 8/2016 | Lin et al. |
| 9,485,433 | B2 | 11/2016 | Venshtain et al. |
| 9,563,962 | B2 | 2/2017 | Lin et al. |
| 9,607,397 | B2 | 3/2017 | Lin et al. |
| 9,628,722 | B2 | 4/2017 | Do et al. |
| 9,671,931 | B2 | 6/2017 | Kosmach et al. |
| 9,881,207 | B1 | 1/2018 | Nguyen et al. |
| 9,883,155 | B2 | 1/2018 | Patel et al. |
| 10,460,515 | B2 | 10/2019 | Venshtain et al. |
| 2002/0140670 | A1 | 10/2002 | Albeck et al. |
| 2008/0170078 | A1 | 7/2008 | Sullivan et al. |
| 2012/0038739 | A1 | 2/2012 | Welch et al. |
| 2013/0095920 | A1 | 4/2013 | Patiejunas et al. |
| 2014/0139639 | A1* | 5/2014 | Wagner ............... G06T 17/00 348/46 |
| 2014/0340404 | A1 | 11/2014 | Wang et al. |
| 2015/0042743 | A1* | 2/2015 | Cullen ............... H04N 7/141 348/14.02 |
| 2015/0172069 | A1 | 6/2015 | Lin et al. |
| 2015/0188970 | A1 | 7/2015 | Kowshik et al. |
| 2016/0277751 | A1 | 9/2016 | Sweeney et al. |
| 2016/0343148 | A1 | 11/2016 | Nguyen et al. |
| 2016/0353080 | A1 | 12/2016 | Nguyen et al. |
| 2017/0039765 | A1 | 2/2017 | Zhou et al. |
| 2017/0053447 | A1 | 2/2017 | Chen et al. |
| 2017/0345183 | A1 | 11/2017 | Chen |
| 2018/0120478 | A1 | 5/2018 | Imhof |
| 2018/0139431 | A1* | 5/2018 | Simek ............... H04N 5/2258 |
| 2018/0157901 | A1 | 6/2018 | Arbatman et al. |
| 2018/0205963 | A1 | 7/2018 | Matei et al. |
| 2018/0240244 | A1 | 8/2018 | Uyyala et al. |
| 2018/0336737 | A1* | 11/2018 | Varady ............... G06T 7/536 |
| 2018/0350134 | A1* | 12/2018 | Lodato ............... G06T 15/04 |
| 2019/0035149 | A1 | 1/2019 | Chen et al. |
| 2019/0042832 | A1 | 2/2019 | Venshtain et al. |
| 2019/0043252 | A1 | 2/2019 | Venshtain et al. |
| 2019/0045157 | A1 | 2/2019 | Venshtain et al. |
| 2019/0215486 | A1 | 7/2019 | Venshtain et al. |

* cited by examiner

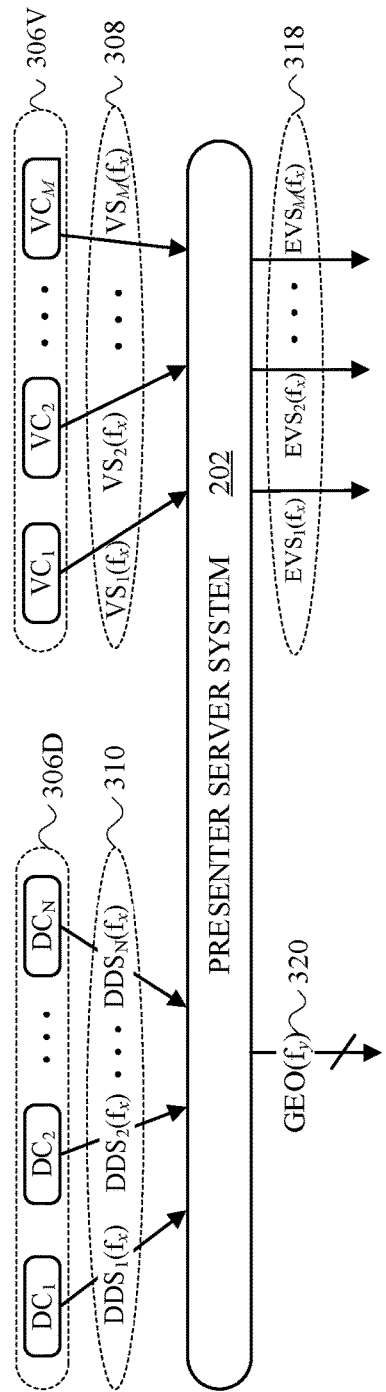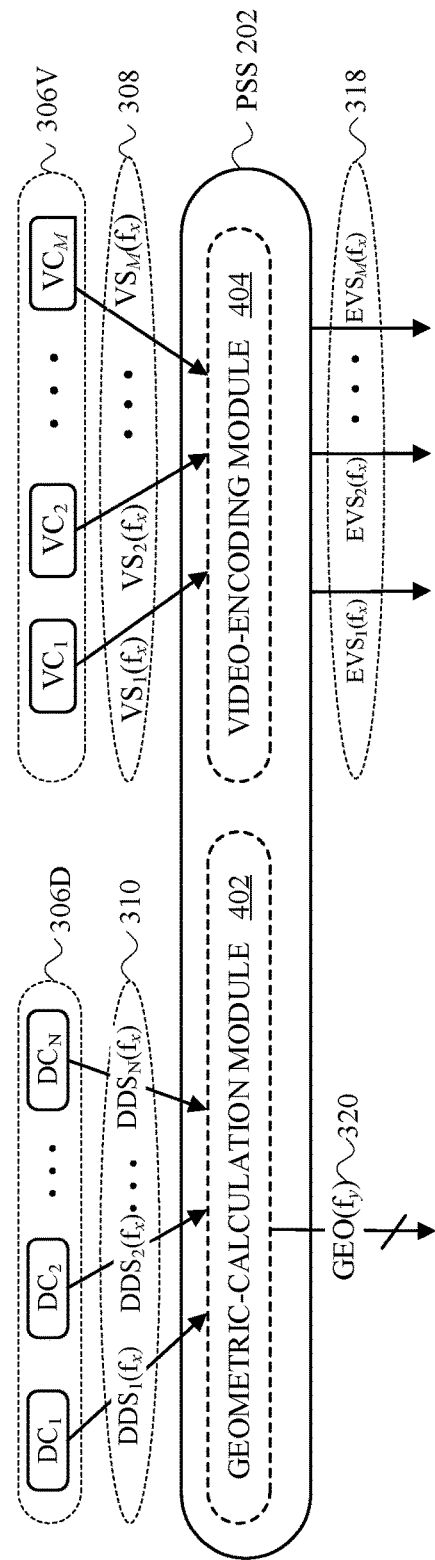

1600

```
RECEIVE A PLURALITY OF TIME-SYNCHRONIZED VIDEO STREAMS     1602
OF SUBJECT FROM VIDEO CAMERAS AT KNOWN VANTAGE POINTS
                            ↓
OBTAIN AT LEAST ONE TIME-SYNCHRONIZED 3D MESH OF SUBJECT    1604
                            ↓
CALCULATE TIME-SYNCHRONIZED VISIBLE-VERTICES LIST           1606
FROM VANTAGE POINT OF EACH VIDEO CAMERA
                            ↓
GENERATE ONE OR MORE ENCODED VIDEO STREAMS AND ONE OR
MORE GEOMETRIC-DATA STREAMS                                 1608
INCLUDING THE CALCULATED VISIBLE-VERTICES LISTS
                            ↓
TRANSMIT ONE OR MORE TIME-SYNCHRONIZED DATA STREAMS TO
RECEIVER FOR RENDERING OF VIEWPOINT-                        1610
ADAPTIVE 3D PERSONA OF SUBJECT
```

```
OBTAIN A THREE-DIMENSIONAL (3D) MESH OF A SUBJECT, WHEREIN
THE OBTAINED 3D MESH IS GENERATED FROM DEPTH-CAMERA-        1612
CAPTURED INFORMATION ABOUT THE SUBJECT
                            ↓
OBTAIN A FACIAL-MESH MODEL                                  1614
                            ↓
LOCATE A FACIAL PORTION OF THE OBTAINED                     1616
3D MESH OF THE SUBJECT
                            ↓
COMPUTE A GEOMETRIC TRANSFORM BASED ON THE FACIAL PORTION
AND THE FACIAL-MESH MODEL, THE GEOMETRIC TRANSFORM
DETERMINED IN RESPONSE TO AGGREGATED ERROR DIFFERENCES      1618
BETWEEN FEATURE POINTS ON THE FACIAL-MESH MODEL AND
CORRESPONDING FEATURE POINTS ON THE FACIAL PORTION
                            ↓
GENERATE A TRANSFORMED FACIAL-MESH MODEL                    1620
USING THE GEOMETRIC TRANSFORM
                            ↓
GENERATE A HYBRID MESH OF THE SUBJECT AT LEAST IN PART
BY COMBINING THE TRANSFORMED FACIAL-MESH MODEL AND          1622
AT LEAST A PORTION OF THE OBTAINED 3D MESH
```

FIG. 16B

SYSTEMS AND METHODS FOR CAPTURING, TRANSFERRING, AND RENDERING VIEWPOINT-ADAPTIVE THREE-DIMENSIONAL (3D) PERSONAS

CROSS-REFERENCE TO RELATED APPLICATIONS

The present application is related to and claims the benefit of the earliest available effective filing date(s) from the following listed applications.

U.S. application Ser. No. 15/865,120, filed Jan. 8, 2018 titled "SYSTEMS AND METHODS FOR RECONSTRUCTION AND RENDERING OF VIEWPOINT-ADAPTIVE THREE-DIMENSIONAL (3D) PERSONAS" naming Simion Venshtain, Yi Zhang, and Cong Nguyen as inventors, U.S. application Ser. No. 15/865,126, filed Jan. 8, 2018 titled "SYSTEMS AND METHODS COMPRESSION, TRANSFER, AND RECONSTRUCTION OF THREE-DIMENSIONAL (3D) DATA MESHES" naming Simion Venshtain, Yi Zhang, and Cong Nguyen as inventors, U.S. application Ser. No. 15/865,129, filed Jan. 8, 2018 titled "SYSTEMS AND METHODS FOR REFERENCE-MODEL-BASED MODIFICATION OF A THREE-DIMENSIONAL (3D) MESH DATA MODEL" naming Simion Venshtain and Po-Han Huang as inventors, which claim benefit to provisional application Ser. No. 62/542,267, filed on Aug. 7, 2017, entitled "SYSTEMS AND METHODS FOR CAPTURING, TRANSFERRING, AND RENDERING VIEWPOINT-ADAPTIVE THREE-DIMENSIONAL (3D) PERSONAS", all of which are hereby incorporated by reference in its entirety.

BACKGROUND

Interpersonal communication is a fundamental part of human society. Historically significant developments in the area of interpersonal communication include the invention of the telegraph, the invention of the telephone, and the realization of interpersonal communication over data connections, often via the Internet. The continuing proliferation of personal communication devices such as cellphones, smartphones, tablets, head-mounted displays (HMDs), and the like has only furthered the ways in which and the extent to which people communicate with one another, both in one-to-one communication sessions and in one-to-many and many-to-many conference communication sessions, such as sessions that involve three or more endpoints).

Further developments have occurred in which both visible-light-image (e.g., color-image) and depth-image data is captured (perhaps as part of capturing sequences of video frames) and combined in ways that allow extractions from two-dimensional (2D) video of "personas" wherein the remainder of the visible portion of video frames, such as the background outside of the outline of the person has been removed. Persona extraction, or "user extraction" is accordingly also known as "background removal" and by other names. In some implementations, an extracted persona is partially overlaid, typically on a pixel-wise basis, over a different background, video stream, slide presentation, and/or the like.

The following U.S. Patents and U.S. Patent Application Publications relate in various ways to persona extraction and associated technologies. Each of them is hereby incorporated herein by reference in its respective entirety.

U.S. Pat. No. 9,628,722, issued Apr. 18, 2017 and entitled "Systems and Methods for Embedding a Foreground Video into a Background Feed Based on a Control Input;"

U.S. Pat. No. 8,818,028, issued Aug. 26, 2014 and entitled "Systems and Methods for Accurate User Foreground Video Extraction;"

U.S. Pat. No. 9,053,573, issued Jun. 9, 2015 and entitled "Systems and Methods for Generating a Virtual Camera Viewpoint for an Image;"

U.S. Pat. No. 9,008,457, issued Apr. 14, 2015 and entitled "Systems and Methods for Illumination Correction of an Image;"

U.S. Pat. No. 9,300,946, issued Mar. 29, 2016 and entitled "System and Method for Generating a Depth Map and Fusing Images from a Camera Array;"

U.S. Pat. No. 9,055,186, issued Jun. 9, 2015 and entitled "Systems and Methods for Integrating User Personas with Content During Video Conferencing;"

U.S. Patent Application Publication No. 2015/0172069, published Jun. 18, 2015 and entitled "Integrating User Personas with Chat Sessions;"

U.S. Pat. No. 9,386,303, issued Jul. 5, 2016 and entitled "Transmitting Video and Sharing Content via a Network Using Multiple Encoding Techniques;"

U.S. Pat. No. 9,414,016, issued Aug. 9, 2016 and entitled "System and Methods for Persona Identification Using Combined Probability Maps;"

U.S. Pat. No. 9,485,433, issued Nov. 1, 2016 and entitled "Systems and Methods for Iterative Adjustment of Video-Capture Settings Based on Identified Persona;"

U.S. Patent Application Publication No. 2015/0188970, published Jul. 2, 2015 and entitled "Methods and Systems for Presenting Personas According to a Common Cross-Client Configuration;"

U.S. Pat. No. 8,649,592, issued Feb. 11, 2014 and entitled "System for Background Subtraction with 3D Camera;"

U.S. Pat. No. 8,643,701, issued Feb. 4, 2014 and entitled "System for Executing 3D Propagation for Depth Image-Based Rendering;"

U.S. Pat. No. 9,671,931, issued Jun. 6, 2017 and entitled "Methods and Systems for Visually Deemphasizing a Displayed Persona;"

U.S. Pat. No. 9,607,397, issued Mar. 28, 2017 and entitled "Methods and Systems for Generating a User-Hair-Color Model;"

U.S. Pat. No. 9,563,962, issued Feb. 7, 2017 and entitled "Methods and Systems for Assigning Pixels Distance-Cost Values using a Flood Fill Technique;"

U.S. Patent Application Publication No. 2016/0343148, published Nov. 24, 2016 and entitled "Methods and Systems for Identifying Background in Video Data Using Geometric Primitives;"

U.S. Patent Application Publication No. 2016/0353080, published Dec. 1, 2016 and entitled "Methods and Systems for Classifying Pixels as Foreground Using Both Short-Range Depth Data and Long-Range Depth Data;"

unpublished U.S. patent application Ser. No. 15/181,653, filed Jun. 14, 2016 and entitled "Methods and Systems for Combining Foreground Video and Background Video Using Chromatic Matching;" and unpublished U.S. patent application Ser. No. 15/333,623, filed Oct. 25, 2016 and entitled "Methods and Systems for Real-Time User Extraction Using Deep Learning Networks."

SUMMARY

Presently disclosed are systems and methods for capturing, transferring, and rendering viewpoint-adaptive 3D personas.

In accordance with an embodiment, a method includes receiving a plurality of video streams captured of a subject by a plurality of video cameras, each video stream including video frames that are time-synchronized according to a shared frame rate, each video camera having a known vantage point in a predetermined coordinate system, obtaining at least one three-dimensional (3D) mesh of the subject at the shared frame rate, the 3D mesh time-synchronized with the video frames of the video streams, the at least one mesh including a plurality of vertices with known locations in the predetermined coordinate system, calculating one or more lists of visible-vertices at the shared frame rate, each list including a subset of the plurality of vertices of the at least one 3D mesh of the subject, the subset being a function of the location of the known vantage point associated with at least one of the plurality of video cameras, generating one or more time-synchronized data streams at the shared frame rate, the one or more time-synchronized data streams including: one or more video streams encoding at least one of the plurality of video streams, and one or more geometric-data streams including the calculated one or more visible-vertices lists, and transmitting the one or more time-synchronized data streams to a receiver for rendering of a viewpoint-adaptive 3D persona of the subject.

In one embodiment, the obtaining at least one three-dimensional (3D) mesh of the subject at the shared frame rate includes, for at least one period at the shared frame rate: receiving the 3D mesh of the subject for a current shared-frame-rate period from depth data; and deforming the 3D mesh of the subject for the current shared-frame-rate period.

In one embodiment, the deforming the 3D mesh of the subject is constrained by at least one motion restriction.

In one embodiment, the method also includes receiving a plurality of depth-data streams captured of the subject by a plurality depth cameras that each have a known vantage point, each depth-data stream including depth-data frames, each depth-data frame including a plurality of depth-data points, the depth-data frames being time-synchronized with the video frames according to the shared frame rate.

In one embodiment the obtaining the at least one 3D mesh of the subject at the shared frame rate includes generating the at least one 3D mesh of the subject at the shared frame rate based at least in part on the received time-synchronized depth-data frames and includes, in each shared-frame-rate period: combining the depth-data points from the depth-data streams into a collective 3D point cloud in the predetermined coordinate system; and generating the at least one 3D mesh based at least in part on the collective 3D point cloud.

In one embodiment, the generating the at least one 3D mesh based at least in part on the collective 3D point cloud includes identifying a plurality of mesh vertices of the at least one 3D mesh at least in part by performing Truncated Signed Distance Function (TSDF) processing on the collective 3D point cloud.

Generating the at least one 3D mesh based at least in part on the collective 3D point cloud, in one embodiment, includes defining a plurality of mesh triangles of the at least one 3D mesh at least in part by identifying connections among neighboring mesh vertices.

In one embodiment, the method further includes receiving a plurality of depth-data streams captured of the subject by a plurality of depth-data cameras, at least one of the plurality of depth-data streams including depth-data frames that are time-synchronized with the video frames of the plurality of video streams according to the shared frame rate.

The obtaining the at least one 3D mesh of the subject at the shared frame rate, according to one embodiment, includes generating the at least one 3D mesh of the subject at the shared frame rate based at least in part on the received time-synchronized depth-data frames in the plurality of depth-data streams.

In one embodiment, each depth data camera includes two stereoscopic infrared (IR) depth cameras; and each depth-data camera is associated with an IR illuminator providing a temporally static pseudorandom pattern of IR light on the subject.

In one embodiment, the method further includes capturing a depth data set with respect to the subject using the depth data camera by: collecting reflections of at least some of the pseudorandom pattern with each stereoscopic IR depth camera; and generating the depth data set with respect to the subject based on a stereoscopic-differential analysis of the collected respective reflections of at least some of the pseudorandom pattern, the depth-data set including a user extraction (UE) of the subject.

In another embodiment, the calculating the one or more lists of visible-vertices at the shared frame rate, each list including a subset of the plurality of vertices of the at least one 3D mesh of the subject, the subset being a function of the location of the known vantage point associated with the at least one of the plurality of video cameras includes modeling a virtual depth camera having a vantage point matching that of the corresponding video camera, and evaluating the at least one 3D mesh from the vantage point of the virtual depth camera to identify vertices visible therefrom.

In one embodiment, the evaluating the at least one 3D mesh includes performing a Z-delta analysis.

In another embodiment, each visible-vertices list from each respective vantage point is organized as a list of mesh triangles for which all three vertices are visible from the corresponding vantage point.

In one embodiment, generating the plurality of encoded video streams includes: identifying, in the plurality received video streams, non-subject pixels that are determined to not represent the subject; and replacing the identified non-subject pixels with one or more of chromakey pixels and/or alpha mask pixels in the plurality encoded video streams.

In one embodiment, the method also includes transmitting, to the receiver, data identifying pixels in the video frames that project on to which vertices in the at least one 3D mesh of the subject.

In another embodiment, the method also includes transmitting, to the receiver, camera assembly capabilities data that convey one or more technical specifications of each of the video cameras in two or more camera assemblies; and geometric arrangement data that convey the known vantage points in the predetermined coordinate system of each of the video cameras.

In one embodiment, the one or more geometric-data streams include the calculated one or more visible-vertices lists and include a respective geometric-data stream for each camera assembly.

Another embodiment is directed to a presenter server system including a communication interface; a processor; and data storage containing instructions executable by the processor for causing the presenter server system to carry out a set of functions, wherein the set of functions includes: receiving, via the communication interface, a plurality of video streams captured of a subject by a plurality of video cameras, each video stream including video frames that are time-synchronized according to a shared frame rate, each video camera having a known vantage point in a predetermined coordinate system; obtaining at least one three-dimensional (3D) mesh of the subject at the shared frame rate, the 3D mesh time-synchronized with the video frames of the video streams, the at least one mesh including a plurality of vertices with known locations in the predetermined coordinate system; calculating, by the processor, one or more lists of visible-vertices at the shared frame rate, each list including a subset of the plurality of vertices of the at least one 3D mesh of the subject, the subset being a function of the location of the known vantage point associated with at least one of the plurality of video cameras; generating, by the processor, one or more time-synchronized data streams at the shared frame rate, the one or more time-synchronized data streams including: one or more video streams encoding at least one of the plurality of video streams; and one or more geometric-data streams including the calculated one or more visible-vertices lists; and transmitting, via the communications interface, the one or more time-synchronized data streams to a receiver for rendering of a viewpoint-adaptive 3D persona of the subject.

Another presenter server system embodiment includes a geometric-calculation module configured to receive a plurality of video streams captured of a subject by a plurality of video cameras, each video stream including video frames that are time-synchronized according to a shared frame rate, each video camera having a known vantage point in a predetermined coordinate system; a video-encoding module configured to obtain at least one three-dimensional (3D) mesh of the subject at the shared frame rate, the 3D mesh time-synchronized with the video frames of the video streams, the at least one mesh including a plurality of vertices with known locations in the predetermined coordinate system; calculate one or more lists of visible-vertices at the shared frame rate, each list including a subset of the plurality of vertices of the at least one 3D mesh of the subject, the subset being a function of the location of the known vantage point associated with at least one of the plurality of video cameras; generate one or more time-synchronized data streams at the shared frame rate, the one or more time-synchronized data streams including one or more video streams encoding at least one of the plurality of video streams; and one or more geometric-data streams including the calculated one or more visible-vertices lists; and transmit the one or more time-synchronized data streams to a receiver for rendering of a viewpoint-adaptive 3D persona of the subject.

Any of the variations and permutations described anywhere in this disclosure can be implemented for any embodiments, including for any method embodiments and for any system embodiments. Furthermore, this flexibility and cross-applicability of embodiments is present in spite of the use of slightly different language (e.g., process, method, steps, functions, set of functions, and/or the like) to describe and/or characterize such embodiments.

In the present disclosure, one or more elements are referred to as "modules" that carry out (e.g., perform, execute, and the like) various functions that are described herein in connection with the respective modules. As used herein, a module includes hardware (e.g., one or more processors, one or more microprocessors, one or more microcontrollers, one or more microchips, one or more application-specific integrated circuits (ASICs), one or more field programmable gate arrays (FPGAs), one or more memory devices, and/or the like) deemed suitable by those of skill in the relevant art for a given implementation. Each described module also includes instructions executable by the aforementioned hardware for carrying out the one or more functions described herein as being carried out by the respective module. Those instructions could take the form of or include hardware (e.g., hardwired) instructions, firmware instructions, software instructions, and/or the like, and may be stored in any suitable non-transitory computer-readable medium or media, such as those commonly referred to as random-access memory (RAM), read-only memory (ROM), and/or the like.

BRIEF DESCRIPTION OF THE DRAWINGS

FIG. 3 is an input/output-(I/O)-characteristic block diagram of the PSS of FIG. 2, in accordance with at least one embodiment.

FIG. 4 is a first example functional-module-specific I/O-characteristic block diagram of the PSS of FIG. 2, in accordance with at least one embodiment.

FIG. 16A is a flowchart of a first example method, in accordance with at least one embodiment.

FIG. 16B is a flowchart of a second example method, in accordance with at least one embodiment.

Figure 1:
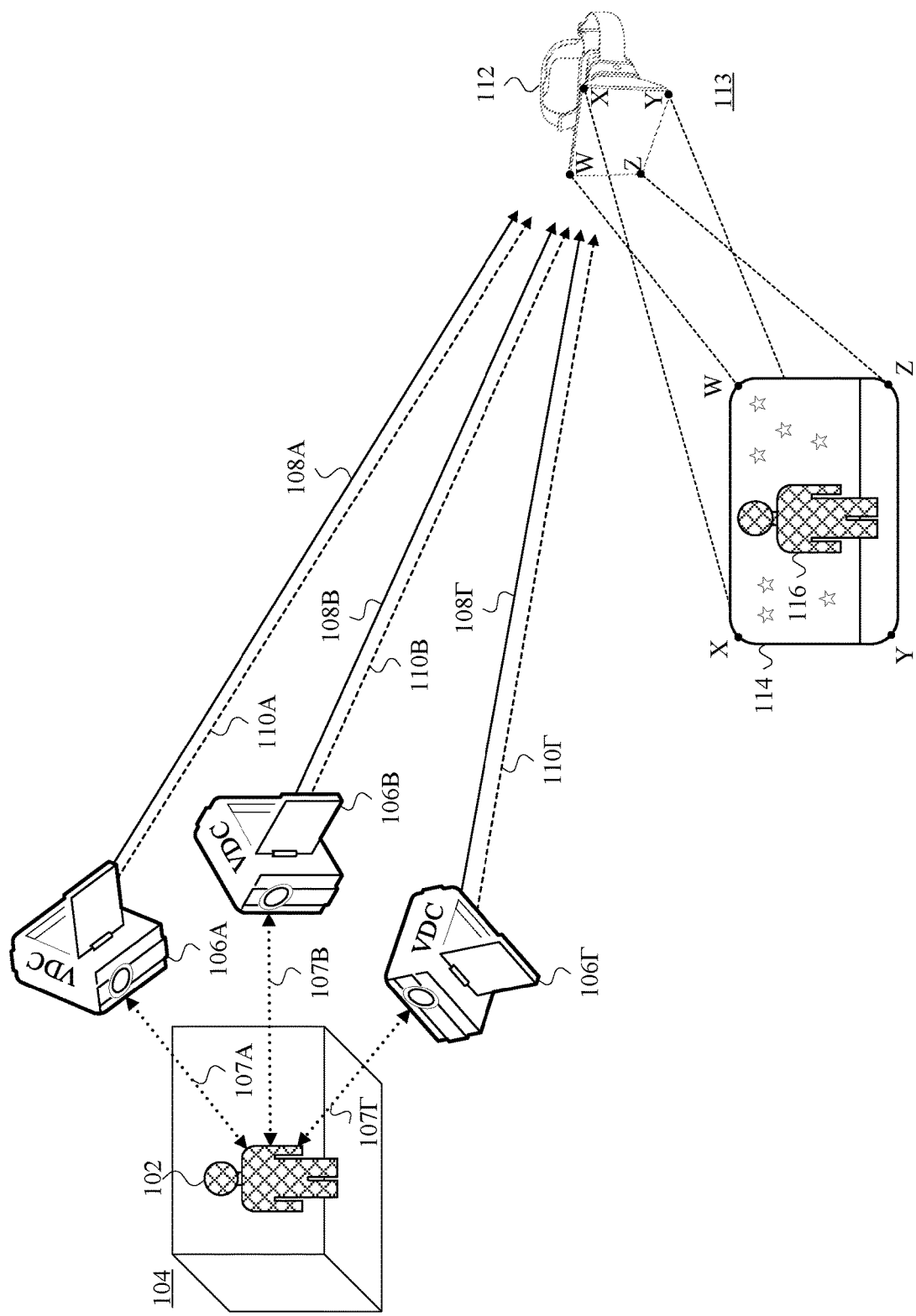
FIG. 1 is a schematic information-flow diagram depicting data capture of an example presenter, and transmission of the captured data, by a set of example video-and-depth cameras (VDCs), as well as data receipt and presentation to a viewer of an example viewpoint-adaptive 3D persona of the presenter by an example head-mounted display (HMD), in accordance with at least one embodiment.

The entities, connections, arrangements, and the like that are depicted in and described in connection with the various figures are presented by way of example and not limitation. As such, any and all statements or other indications as to what a particular figure "depicts," what a particular element or entity in a particular figure "is" or "has," and any and all similar statements—that may in isolation and out of context be read as absolute and therefore limiting—can only properly be read as being constructively preceded by a clause such as "In at least one embodiment . . . ." And it is for reasons akin to brevity and clarity of presentation that this implied leading clause is not repeated in the below detailed description of the drawings.

DETAILED DESCRIPTION OF THE DRAWINGS

I. Introduction

In addition to persona extraction from a 2D combination of visible-light-image and depth-image data, it is also possible to use multiple visible-light cameras and multiple depth cameras that can be combined in sets that can include at least one of each, for example, in "camera assemblies," a term that is further defined below—positioned at multiple viewpoints around a subject (e.g., a person) to capture enough visible-light data and depth data to render a 3D representation of the subject. That 3D representation, referred to herein as a 3D persona, could be rendered to a viewer at a remote location (e.g., at a location that is remote with respect to the location of the subject). As used herein, the subject thus "teleports" to the remote location, virtually, not corporeally.

With virtual teleportation, there are tradeoffs such as resolution vs. effective data-transfer rate (the transfer on average of a given quantum of data per a given unit of time, a ratio that depends on factors such as available bandwidth and efficiency of use). Higher resolution produces more visually impressive results but typically requires a higher effective data-transfer rate, lower resolution requires a lower effective data-transfer rate and decreases the end-user experience.

According to a first scenario, two people at two different locations are communicating. For simplicity of explanation and not by way of limitation, this first example scenario involves substantially one-way data communication from a first person (referred to in connection with this example as "the presenter") to a second person (referred to in connection with this example as "the viewer").

In this example, the presenter is giving an astronomy lecture from the first location (e.g., a lecture hall), at which suitable data-capture equipment (perhaps a camera-assembly rig having multiple camera assemblies mounted thereon, examples of both of which are described herein) has been installed or otherwise set up, while the viewer is viewing this lecture in realtime, or substantially live, from the second location (e.g., their home) using an HMD. It is not necessary that the viewer be using an HMD, nor is it necessary that the viewer be viewing the lecture in realtime, as these are examples. The viewer could be viewing the lecture via one or more screens of any type and/or any other display technology deemed suitable by those of skill in the art for a given context or in a given implementation. The viewer could be viewing the lecture any amount of time after it actually happened—e.g., the viewer could be streaming the recorded lecture from a suitable server. And numerous other arrangements are possible as well.

As explained herein, the viewer can change their viewing angle (e.g., by walking around, turning their head, changing the direction of their gaze, operating a joystick, operating a control cross, operating a keyboard, operating a mouse, and/or the like) and be presented with color-accurate and depth-accurate renderings of a 3D persona of the presenter ("a 3D presenter persona") from the viewer's selected viewing angle ("a viewpoint-adaptive 3D persona, or, "a viewpoint-adaptive 3D presenter persona"). Herein, the adjective "viewpoint-adaptive" is not used to qualify every occurrence of "3D persona," "3D presenter persona," and the like; but to enhance readability.

As examples, the 3D presenter persona is shown to appear to the viewer to be superimposed on a background (e.g., the lunar surface) as part of a virtual-reality (VR) experience, or superimposed at the viewer's location as part of an augmented-reality (AR) experience. If the data-capture equipment at the first location is sufficiently comprehensive, the viewer may be able to virtually "walk" all around the 3D presenter persona—the viewer may be provided with a 360° 3D virtual experience.

Other data-capture-equipment arrangements are contemplated, including three, four or multi-camera assemblies— including both visible-light-camera equipment and depth-camera equipment arranged on a rigid physical structure referred to herein as a camera-assembly rig positioned in front of the presenter able to capture the presenter from each of a set of vantage points such as left, right, and center. Top-center and bottom-center can be included in a four-camera-assembly rig. Other rigs are also possible, including six or more cameras located at vantage points as needed in a given location. For example, in some embodiments, 45° angles could be desirable and the number of cameras could therefore multiply as needed. Furthermore, cameras focusing on a feature of a presenter could be added to a rig and the geometry for such cameras can be calculated to provide necessary integration with the other cameras in the rig.

In some embodiments, such as those in which the camera-assembly equipment is mounted on a camera-assembly rig (e.g., embodiments in which no visible-light-camera equipment or depth-camera equipment other than that which is mounted on the camera-assembly rig at the data-capture location), 3D presenter persona can be presented to the viewer in a less-than-360° 3D virtual experience.

Two-way (and more than two-way) virtual-teleportation sessions are contemplated, though one-way virtual-teleportation sessions are also described herein, to simplify the explanation of the present systems and methods.

Returning now to the first-described example scenario, reference is made to FIG. 1, which is a schematic information-flow diagram depicting data capture of an example presenter 102, and transmission of the captured data, by a set of example VDCs 106A ("Alpha"), 106B ("Beta"), and 106Γ ("Gamma"), as well as data receipt and presentation to a viewer (not depicted) of an example viewpoint-adaptable 3D persona 116 of the presenter 102 by an example HMD 112, in accordance with at least one embodiment. The set of VDCs 106A, 106B, and 106Γ are referred to herein using an abbreviation such as "the VDCs 106ABΓ," "the VDCs 106A-Γ," "the VDCs 106," and/or the like. One of the VDCs 106 may be referred to specifically by its particular reference numeral. The Greek letters Alpha ("A"), Beta ("B"), and Gamma ("Γ") refer to various elements in FIG. 1 to convey that these could be any three arbitrary vantage points of the presenter 102, and are not meant to bear any relation to concepts such as left, center, right, and/or the like.

As can be seen in FIG. 1, the presenter 102 is located in a presenter location 104 (e.g., the above-mentioned lecture hall). At the presenter location 104, the respective VDCs 106 are capturing both video and depth data of the presenter 102, as represented by the dotted arrows 107A, 107B, and 107. Each of the arrows 107 is depicted as double-ended to indicate a two-way flow of information. As described more fully below, each of the VDCs 106 may include an illuminator that project a pattern of infrared light in the direction of the presenter 102 and then gather the reflection of that pattern using multiple depth cameras and stereoscopically analyze the collected data as part of a depth-camera system of a given VDC 106. And each VDC 106 is using its respective video-camera capability to capture visible-light video of the presenter 102.

Each of the VDCs 106 is capturing such video and depth data of the presenter 102 from their own respective vantage point at the presenter location 104. The VDCs 106 transmit encoded video streams 108A, 108B, and 108Γ to HMD 112, located at a viewer location 113 (e.g., the above-mentioned home of the viewer). As also shown in FIG. 1, the VDCs 106 are transmitting depth-data streams 110A, 110B, and 110F to HMD 112. At the viewer location 113, HMD 112 uses the video streams 108ABΓ and the depth-data streams 110ABΓ to render the viewpoint-adaptive 3D persona 116 of the presenter 102 on a display 114 of HMD 112. As to the depiction of the display 114, the reference letters W, X, Y, and Z are shown in FIG. 1 to convey that the view of the display 114 shown in FIG. 1 is depicted as the viewer would see it while wearing HMD 112.

FIG. 1 displays a high-level conceptual view 100 of an embodiment in which both video and depth data of the presenter 102 is captured by each of multiple VDCs 106. This video and depth data is transmitted using multiple distinct data streams from the respective VDCs 106 to HMD 112, and the video and depth data is combined by HMD 112 in rendering the viewpoint-adaptive 3D persona 116 of the presenter 102 on the display 114. 3D persona 116 is shown standing on a lunar surface with a backdrop of stars in a simplified depiction of a VR experience.

Data capture, transmission, and rendering functions can be distributed in various ways as suitable by those of skill in the art along the communication path between and including the data-capture equipment (e.g., the VDCs 106) and the persona-rendering equipment (e.g., HMD 112). In different embodiments, one or more servers (and/or other suitable processing devices, systems, and/or the like) are located at the data-capture location, the data-rendering location, and/or in between, and the herein-described functions can be distributed in various ways among those servers, the data-capture equipment, the data-rendering equipment, and/or other equipment.

II. Example Architecture

A. Example Presenter Server System (PSS)

Figure 2:
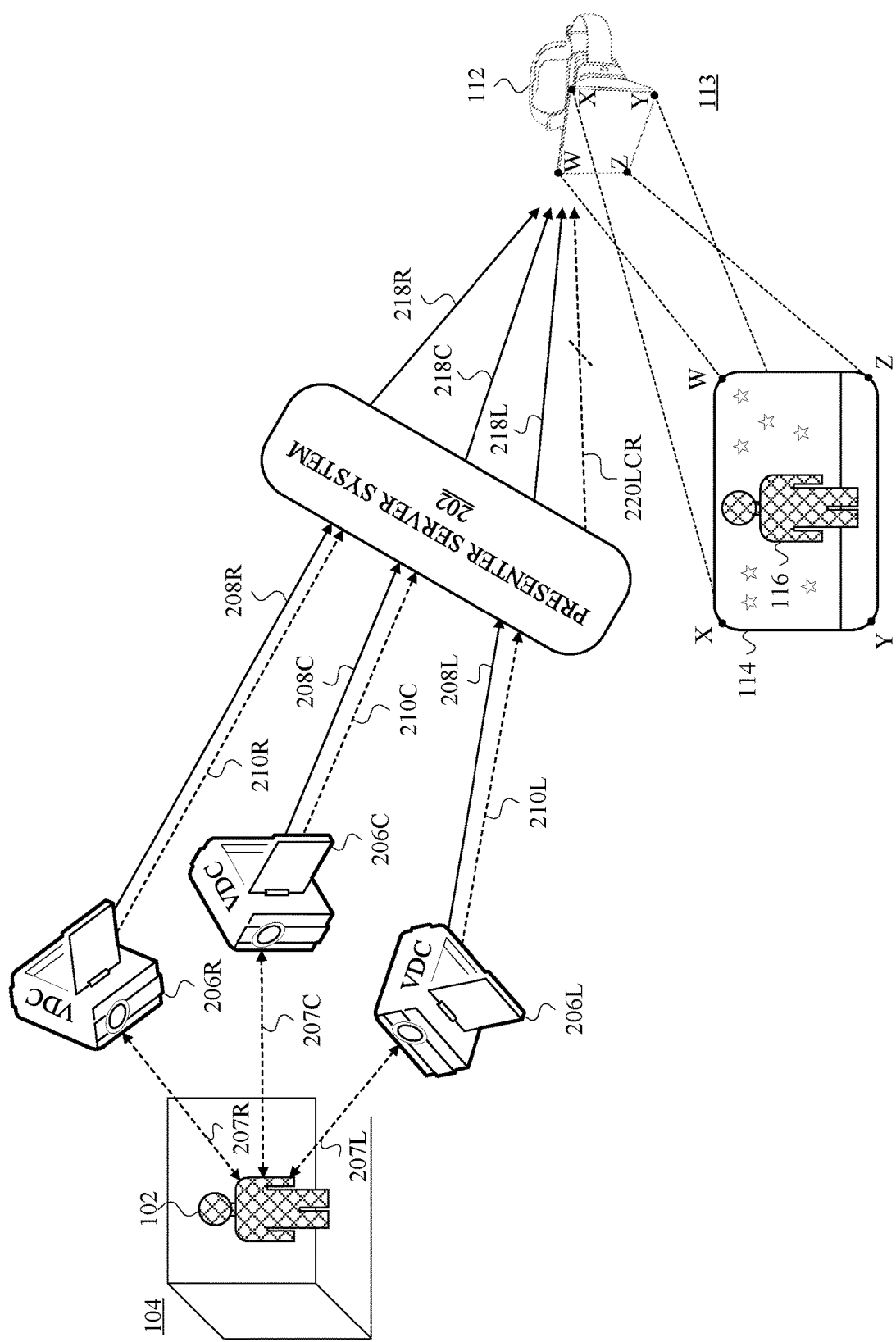
FIG. 2 is a schematic information-flow diagram depicting an example presenter server system (PSS) communicatively disposed between the VDCs and the HMD of FIG. 1, in accordance with at least one embodiment.

An example of a server being communicatively disposed on the communication path between the data-capture equipment and the data-rendering equipment is depicted in FIG. 2, which is a schematic information-flow diagram depicting a view 200 of an embodiment in which an example presenter server system (PSS) 202 is communicatively disposed between a set of VDCs 206 and HMD 112. Many of the elements depicted in FIG. 2 are also depicted in FIG. 1.

One difference from FIG. 1 to FIG. 2 is that the VDCs 106 are replaced by VDCs 206. Because the information flow in this embodiment differs from the information flow depicted and described in connection with FIG. 1, different reference numerals identify devices carrying out different sets of functions. Unlike the ABS notation used for the VDCs 106 of FIG. 1, the VDCs 206 of FIG. 2 use an LCR notation to specifically denote "left," "center," and right," though there is no serious attempt (other than sequential arrangement) in FIG. 2 to depict the VDCs 206L ("left"), 206C ("center"), and 206R ("right") capturing a left-side view, a centered view, and a right-side view, respectively, of the presenter 102. Aside from the ABΓ notation and the LCR notation, the data-capture function is still carried out in substantially the same way in the embodiment of FIG. 2 as it is in the embodiment of FIG. 1. Also common to FIG. 1 and FIG. 2 are the presenter 102, the presenter location 104, HMD 112, the viewer location 113, the display 114, and the 3D presenter persona 116.

One difference between FIG. 1 and FIG. 2 is the presence in FIG. 2 of PSS 202. In various embodiments, PSS 202 could reside at the presenter location 104, the viewer location 113, or anywhere in between. Regarding FIG. 2, an embodiment is described in which PSS 202 resides at the presenter location 104. Accordingly, each of the video streams 208L, 208C, and 208R can include a "raw" video stream, in that it is not compressed or truncated; in other words, the video streams 208LCR can include full, stand-alone color frames (images) (encoded in a well-known color space such as RGB, RGB-A, or the like), in which none of the frames reference any one of the other frames.

In some embodiments, each of the VDCs 206 transmits a respective depth-data stream 210 to PSS 202. In embodiments in which this depth data is gathered stereoscopically by each VDC 206 using multiple infrared (IR) cameras to gather reflection of a single projected IR pattern, the VDCs 206 themselves could resolve these stereoscopic differences in hardware and transmit depth-pixel images to PSS 202 in the respective depth-data streams 210; it could instead be the case that the VDCs 206 transmit raw IR images to PSS 202, which then stereoscopically resolves pairs of IR images to arrive at depth-pixel images that correspond with the visible-light video images. Other example implementations are possible.

In various embodiments, the capture and processing of video and depth data are time-synchronized according to a shared frame rate across the various data-capture equipment (e.g., the VDCs 106, the VDCs 206, the hereinafter-described camera assemblies, and/or the like), data-processing equipment (e.g., PSS 202), and data-rendering equipment (e.g., HMD 112).

Data transfer between various entities or any data-processing steps is not necessarily carried out by the entities instantaneously. In some embodiments, there is time-synchronized coordination whereby, for example, each instance of data-capture equipment captures one frame (e.g., one video image and a contemporaneous depth image) of the presenter 102 every fixed amount of time, which is referred to herein as "the shared-frame-rate period" (or perhaps just "the period"), and it is the inverse of the shared frame rate, as is known in the art. In one embodiment, 3D-mesh generation, data transmission, and rendering functions also step along according to this shared frame rate.

Depending on factors such as the length of the shared-frame-rate period, the available computing speed and power, and/or the time needed to carry out various functions, capture, processing, and transmission (e.g., at least the sending) for a given frame x could all occur within a single period. In other embodiments, more of an assembly-line approach is used, whereby one entity (e.g., PSS 202) may be processing a given frame x during the same period that the data-capture equipment (e.g., the collective VDCs 206) is capturing the next frame x+1. And certainly numerous other timing examples could be given.

In the embodiment that is described herein in connection with FIG. 2, PSS 202 transmits an encoded video stream 218 corresponding to each raw video stream 208 that PSS 202 receives from a respective VDC 206. As described herein, PSS 202 may encode a given raw video stream 208 as a corresponding encoded video stream 218 in a number of different ways. Some known video-encoding algorithms (a.k.a. "codecs" or "video codecs") include (i) those developed by the "Moving Picture Experts Group" (MPEG), which operates under the mutual coordination of the International Standards Organization (ISO) and the International Electro-Technical Commission (IEC), (ii) H.261 (a.k.a. Px64) as specified by the International Telecommunication Union (ITU), and (iii) H.263 as also specified by the ITU, though certainly others could be used as well.

In some embodiments, each video camera (or video-camera function of each VDC, camera assembly, or the like) captures its own video stream, and each of those video streams is encoded according to a (known or hereinafter-developed) standard video codec for transmission in a corresponding distinct encoded video stream for delivery to the rendering device. The video-capture and video-encoding modules and/or equipment of various embodiments of the present methods and systems need know nothing of one another, including shared geometry, 3D-mesh generation, viewpoint-adaptive rendering, and so on; they capture, encode (e.g., compress), and transmit video.

Each respective depth-data stream 210 could include two streams of raw IR images captured by two different IR cameras in each VDC 206, for stereoscopic resolution thereof by PSS 202 include depth images of depth pixels that are generated at each VDC 206 using, e.g., VDC-hardware processing to create stereoscopic resolution of pairs of time-synchronized IR images. In one embodiment shown in FIG. 2, VDC-hardware-based stereoscopic resolution of pairs of IR images into depth-pixel images are then transmitted to PSS 202 for further processing. In some embodiments, the VDCs capture RGB images in time-synchrony with the two IR images and create a depth-pixel image.

Depth images could be captured by two IR cameras in a VDC. In other embodiments, depth images can be created by using a single IR camera. For example, a single IR camera transfers IR images to create depth images after combination with other IR images captured by different VDCs. Thus, multiple IR data streams can combine to create a depth stream outside of the VDCs or DCS, for example, if only one IR camera is present in each VDC. Thus, inexpensive VDCs can be utilized to create stereoscopic 3D video without requiring a two IR camera VDC.

Along with the encoded video streams 218, PSS 202 is depicted in FIG. 2 as transmitting one or more geometric-data streams 220LCR to HMD 112. There could be three separate streams 220L, 220C, and 220R, or it could instead be a single data stream 220LCR; and certainly other combinations could be implemented and listed here as well. Regardless of stream count and arrangement, this set of one or more geometric-data streams is referred to herein as "the geometric-data stream 220LCR." Matters that are addressed in the description of ensuing figures include (i) example ways in which PSS 202 could generate the geometric-data stream 220LCR from the depth-data streams 210 and (ii) example ways in which HMD 112 could use the geometric-data stream 220LCR in rendering the viewpoint-adaptive 3D presenter persona 116.

A more scale-independent and explicitly mathematically expressed version of the I/O characteristics of PSS 202 is shown in FIG. 3, which is an input/output-(I/O)-characteristic block diagram of PSS 202 of FIG. 2, in accordance with at least one embodiment. From FIG. 2 to FIG. 3 PSS 202 is shown, note that other elements that are depicted in FIG. 3 are numbered in the 300 series to correspond with the numbering in the 200 series elements in FIG. 2.

The VDCs 206 of FIG. 2 are replaced in FIG. 3 by the separating the video components from the depth components. FIG. 2 shows a set of M video cameras (VCs) 306V and a set of N depth-capture cameras (DCs) 306D. The raw video streams 208L, 208C and 208R of FIG. 2 are shown in FIG. 3 by M raw video streams 308, each of which is expressed in FIG. 3 using the notation $VS_M(f_x)$, where VS stands for "video stream," M identifies the video camera associated with the corresponding video stream 308, and $f_x$ notation "frame x" indicates that the video streams 308 are time-synchronized according to a shared frame rate. (each video camera 306V captures the same numbered frame at the same time). The depth capture streams 210L, 210C and 210R of FIG. 2 are shown in FIG. 3 by N depth-data streams 310, each of which is expressed in FIG. 3 using the notation $DDS_N(f_x)$, where DDS stands for "depth-data stream," N identifies the depth-data camera associated with the corresponding depth-data stream 310, and $f_x$ notation "frame x" indicates that the depth-data streams 310 are time-synchronized according to a shared frame rate.

The encoded video streams 218 of FIG. 2 are replaced in FIG. 3 by the M encoded video stream(s) 318, each of which is expressed in FIG. 3 using the notation $EVS_M(f_x)$, where (i) EVS stands for "encoded video stream," (ii) M identifies the video camera, and (iii) $f_y$ indicates "frame y," that the raw video streams 308 are time-synchronized according to the shared frame rate. Per the above timing discussion, y is equal to x-a, where a is an integer greater than or equal to zero; in other words, "frame y" and "frame x" could be the same frame, or "frame y" could be the frame captured one or more frames prior to "frame x."

As depicted in FIG. 3, the DCs 306D transmit one or more depth-data streams (DDS(s)) 310 to PSS 202. The one or more DDS(s) 310 (hereinafter "DDS 310") in FIG. 3 replace the depth-data streams 210 of FIG. 2. In one embodiment, DDS 310 is in frame synchrony—time synchrony according to a shared frame rate—with one or more of the raw video streams 308, and is expressed in FIG. 3 using the notation $DDS(f_x)$. The geometric-data stream 220LCR of FIG. 2 is replaced in FIG. 3 by the (similarly one or more) geometric-data stream(s) 320 (referred to hereinafter as "the geometric-data stream 320" whether it includes one stream of geometric data or more than one stream of geometric data). The geometric-data stream 320 is expressed in FIG. 3 as $GEO(f_y)$ to indicate frame synchrony with each of the encoded video streams 318.

The data-capture equipment in FIG. 1 and FIG. 2 take the form of multiple VDCs 106 and multiple VDCs 206, respectively. The terms "VDC" and "camera assembly" are used interchangeably in this description to refer to instantiations of hardware that each include at least a visible-light (e.g., RGB) video camera and a depth-camera system (e.g., an IR illuminator and one or two IR cameras, the IR images from which are stereoscopically resolved to produce depth images/depth-pixel images/arrays of depth pixels. Likewise there are multiple depth-capture equipment options. FIG. 3 illustrates a separation of video-capture equipment (VCs 306V) and depth-capture equipment (DCs 306D), however, depth-capture equipment DCs 306D can be located near each VC 306V or apart from a VC 306V.

These multiple different depicted data-capture-equipment arrangements convey at least the point that combined video-and-depth-capture equipment assemblies (e.g., VDCs, camera assemblies, and the like) are an option but not the only option. Video could be captured from some number of separate video-data-capture vantage points and depth information could be captured from some (perhaps different) number of (perhaps different) depth-data-capture vantage points. There could be one or more combined video-and-depth data-capture vantage points, one or more video-data-capture-only vantage points, and/or one or more depth-data-capture-only vantage points.

Thus, the DCs 306D could take forms such as a depth camera substantially co-located with every respective video camera 306V, a set of depth cameras, each of which may or may not be co-located with a respective video camera 306V, and/or any other arrangement of depth-data-capture equipment deemed suitable by those of skill in the art for a given implementation. Moreover, stereoscopic resolution is but one of a number of different depth-determination technologies that could be used in combination, as known to those of skill in the art.

The DDS 310 could take forms such as (i) a stream—that is frame-synchronized (in frame synchrony) with each raw video stream 308—from each of multiple depth-camera systems (or camera assemblies) of respective pairs of raw, time-synchronized IR images in need of stereoscopic resolution, (ii) a stream—that is frame-synchronized with each raw video stream 308—from each of multiple depth-camera systems (or camera assemblies) of depth-pixel images (that may be the result of stereoscopic resolution of corresponding pairs of IR images), (iii) a stream—that is frame-synchronized with each raw video stream 308—of 3D meshes of the subject (such as presenter 102) in embodiments in which the DCS 306D includes both depth-data-capture equipment and generates 3D meshes of a subject from depth data gathered from multiple vantage points of the subject. In various different embodiments, PSS 202 obtains frame-synchronized 3D meshes of the subject by receiving such 3D meshes from another entity such as the DCs 306D or by generating such 3D meshes from raw or processed depth data captured of the subject from multiple different vantage points. And other approaches could be used as well.

In one embodiment, frame ($f_x$) from one or more VCs combine to create a "super frame" 308 that is a combination of video. Thus, according to one embodiment, a super frame represents a video sequence that only has to be encoded in PSS 202 one time. Likewise, output streams from PSS 202 can be combined in a single stream 318.

PSS 202 may be architected in terms of different functional modules, one example of which is depicted in FIG. 4, which is a functional-module-specific I/O-characteristic block diagram of PSS 202, in accordance with at least one embodiment. Many aspects of FIG. 4 are also depicted in FIG. 3. What is different in FIG. 4 is that PSS 202 is specifically shown as including a geometric-calculation module 402 and a video-encoding module 404.

In various different embodiments, the geometric-calculation module 402 receives the DDS 310 from the DCs 306D, obtains (or generates) 3D meshes of presenter 102 from received DDS 310, generates geometric-data stream 320, and transmits one or more geometric-data streams from PSS 202 to HMD 112. Depending on the distribution of functionality, geometric-calculation module 402 may stereoscopically resolve associated pairs of IR images to generate depth frames.

In various different embodiments, the video-encoding module 404 carries out functions such as receiving the raw video streams 308 from video cameras 306V, encoding each of those raw video streams 308 into an encoded video stream EVS using a suitable video codec, and transmitting the generated encoded video streams EVS from PSS 202 to HMD 112 separately or in a single stream 318.

Figure 5:
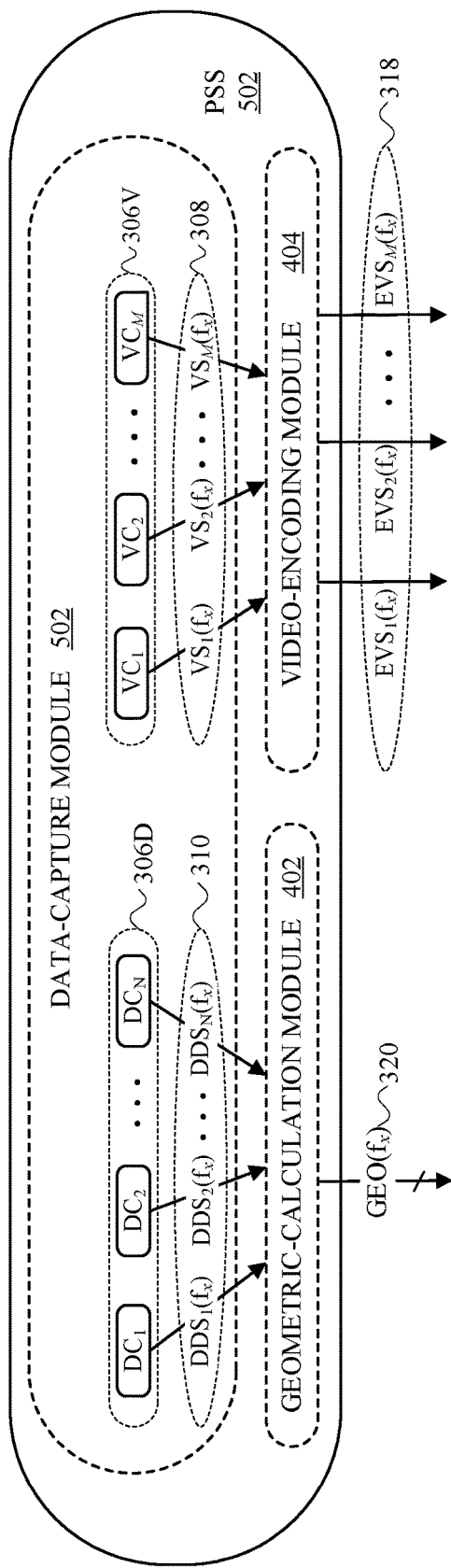
FIG. 5 is a functional-module-specific I/O-characteristic block diagram of a second example PSS, in accordance with at least one embodiment.

Another possible functional-module architecture of a PSS is shown in FIG. 5, which is a functional-module-specific I/O-characteristic block diagram of a second example PSS 502, in accordance with at least one embodiment. FIG. 5 is similar in many ways to FIG. 4, other than that PSS 502 is shown as including not only the geometric-calculation module 402 and the video-encoding module 404, but also a data-capture module 502 that includes the M video cameras 306V and N depth cameras DCs 306D. Thus, a PSS according to the present disclosure could include the video-data-capture equipment, and could include the depth data-capture equipment.

B. Example Computing-and-Communication Device (CCD)

Figure 6:
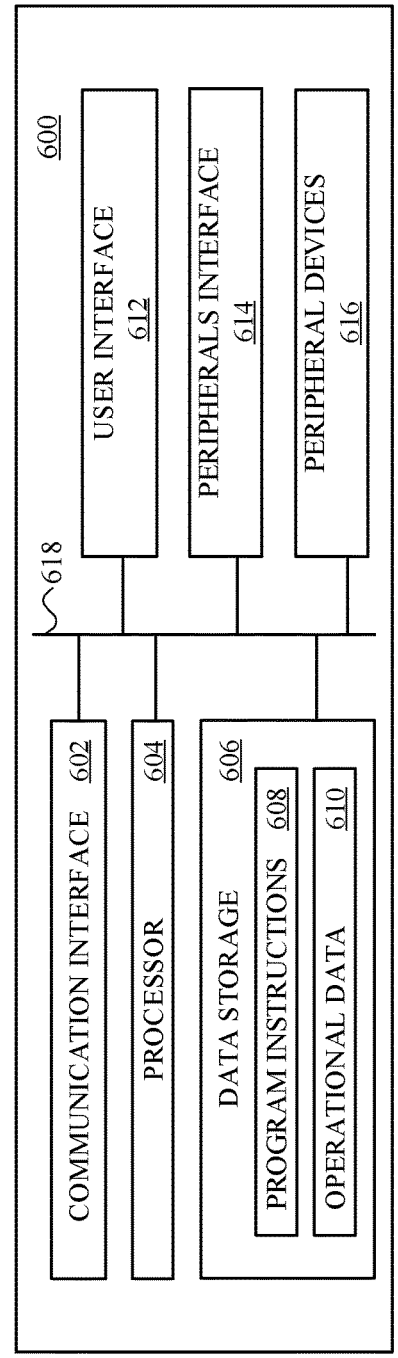
FIG. 6 is a hardware-architecture diagram of an example computing-and-communication device (CCD), in accordance with at least one embodiment.

FIG. 4 and FIG. 5 depict a functional-module architecture of PSS 202 and a possible functional-module architecture of PSS 502. FIG. 6 illustrates a hardware-architecture diagram of an example CCD 600, in accordance with an embodiment. A number of the devices described herein are CCDs (computing-and-communication devices). CCDs encompass mobile devices such as smartphones and tablets, personal computers (PCs) such as laptops and desktops, networked servers, devices designed for more specific purposes such as visible-light (e.g., RGB) cameras and depth cameras, devices such as HMDs usable in VR and AR contexts, and/or any other CCD(s) deemed suitable by those of skill in the art.

CCDs herein include but are not limited to the following: any or all of the VDCs 106, HMD 112, PSS 202, any or all of the VDCs 206, the DCS 306D, any or all of the video cameras 306V, any or all of the CCDs 704-710, any or all of the camera assemblies 924, any or all of the camera assemblies 1024, and any or all of the projection elements 2404.

CCD 600 includes a communication interface 602, a processor 604, a data storage 606 containing program instructions 608 and operational data 610, a user interface 612, a peripherals interface 614, and peripheral devices 616. Communication interface 602 may be operable for communication according to one or more wireless-communication protocols, some examples of which include Long-Term Evolution (LTE), IEEE 802.11 (Wi-Fi), Bluetooth, and the like. Communication interface 602 may also or instead be operable for communication according to one or more wired-communication protocols, some examples of which include Ethernet and USB. Communication interface 602 may include any necessary hardware (e.g., chipsets, antennas, Ethernet interfaces, etc.), any necessary firmware, and any necessary software for conducting one or more forms of communication with one or more other entities as described herein.

Processor 604 may include one or more processors of any type deemed suitable by those of skill in the relevant art, some examples including a general-purpose microprocessor and a dedicated digital signal processor (DSP).

The data storage 606 may take the form of any non-transitory computer-readable medium or combination of such media, some examples including flash memory, RAM, and ROM to name but a few, as any one or more types of non-transitory data-storage technology deemed suitable by those of skill in the relevant art could be used. As depicted in FIG. 6, the data storage 606 contains program instructions 608 executable by the processor 604 for carrying out various functions described herein, and further is depicted as containing operational data 610, which may include any one or more data values stored by and/or accessed by the CCD 600 in carrying out one or more of the functions described herein.

The user interface 612 may include one or more input devices and/or one or more output devices. User interface 612 may include one or more touchscreens, buttons, switches, microphones, keyboards, mice, touchpads, and/or the like. For output devices, the user interface 612 may include one or more displays, speakers, light emitting diodes (LEDs), speakers, and/or the like. One or more components of the user interface 612 could provide both user-input and user-output functionality, a touchscreen being one example.

Peripherals interface 614 could include any wired and/or any wireless interface for communicating with one or more peripheral devices such as input devices, output devices, I/O devices, storage devices, still-image cameras, video cameras, webcams, speakers, depth cameras, IR illuminator, HMDs, and/or any other type of peripheral device deemed suitable by those of skill in the art for a given implementation. Some example peripheral interfaces include USB, FireWire, Bluetooth, HDMI, DisplayPort, mini DisplayPort, and the like. Other example peripheral devices and peripheral interfaces could be listed.

Peripherals interface 614 of CCD 600 could have one or more peripheral devices 616 permanently or at least semi-permanently installed as part of the hardware architecture of the CCD 600. The peripheral devices 616 could include peripheral devices mentioned in the preceding paragraph and/or any type deemed suitable by those of skill in the art.

C. Example Communication System

Figure 7:
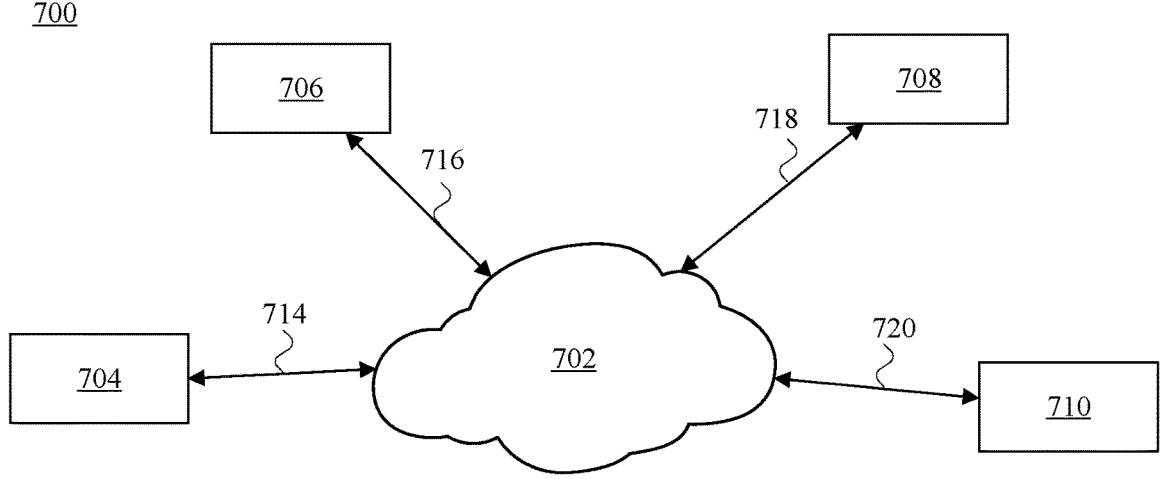
FIG. 7 is a diagram of an example communication system, in accordance with at least one embodiment.

FIG. 7 depicts an example communication system 700. In FIG. 7, four CCDs 704, 706, 708, and 710 are communicatively interconnected with one another via network 702. The CCD 704 is connected to network 702 via a communication link 714, CCD 706 via a communication link 716, CCD 708 via a communication link 718, and CCD 720 via a communication link 720. Any one or more of the communication links 714-720 could include one or more wired-communication links, one or more wireless-communication links, one or more switches, routers, bridges, other CCDs, and/or the like.

D. Example Head-Mounted Display (HMD)

Figure 8:
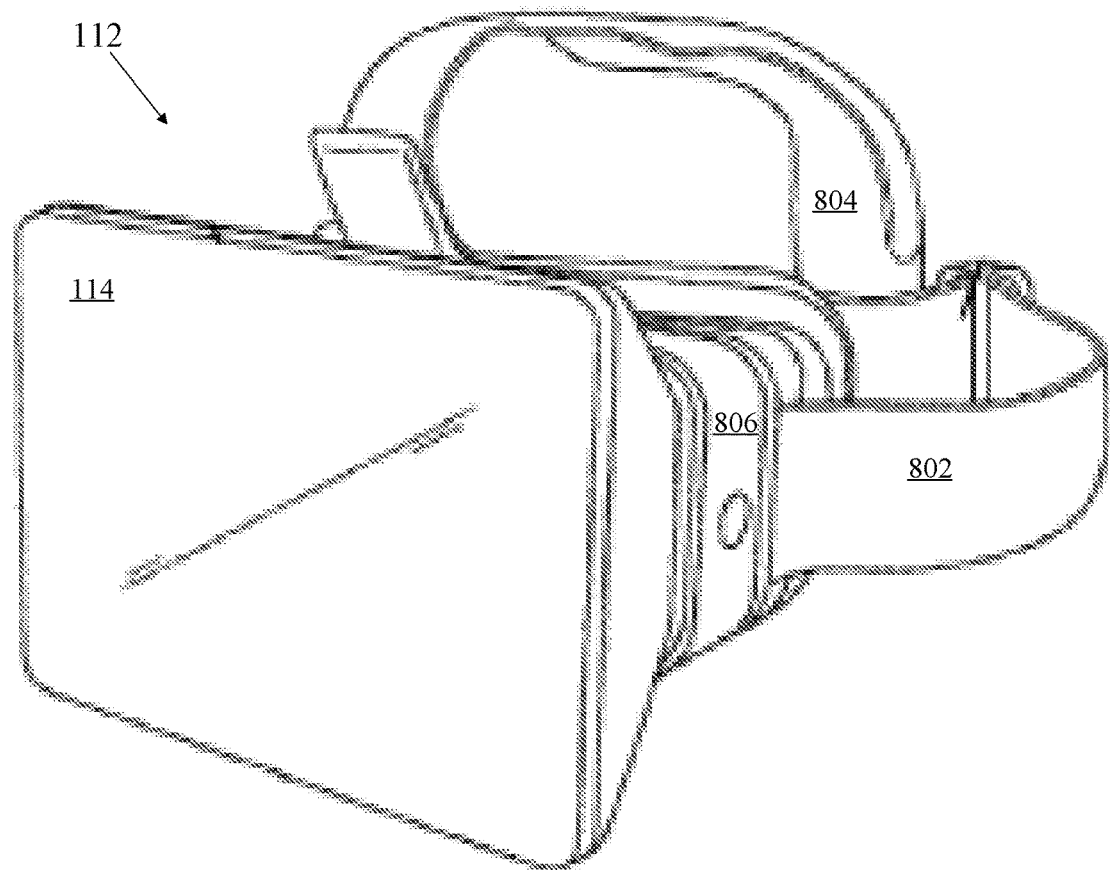
FIG. 8 depicts an example HMD, in accordance with at least one embodiment.

FIG. 8 depicts HMD 112 in accordance with at least one embodiment. HMD 112 includes a strap 802, an overhead piece 804, a face-mounting mask 806, and the aforementioned display 114. Other HMDs could include different components, as HMD 112 in FIG. 8 is provided by way of example and not limitation. As a general matter, the strap 802 and the overhead piece 804 cooperate with the face-mounting mask 806 to secure HMD 112 to the viewer's head such that the viewer can readily observe the display 114. Some examples of commercially available HMDs that could be used as HMD 112 in connection with embodiments of the present systems and methods include the Microsoft HoloLens®, the HTC Vive®, the Oculus Rift®, the OSVR HDK 1.4®, the PlayStation VR®, the Epson Moverio BT-300 Smart Glasses®, the Meta 2®, and the Osterhout Design Group (ODG) R-7 Smartglasses System®. Numerous other examples could be listed here as well.

E. Example Camera-Assembly Rigs

1. Rig Having Mounted Camera Assemblies

Figure 9A:
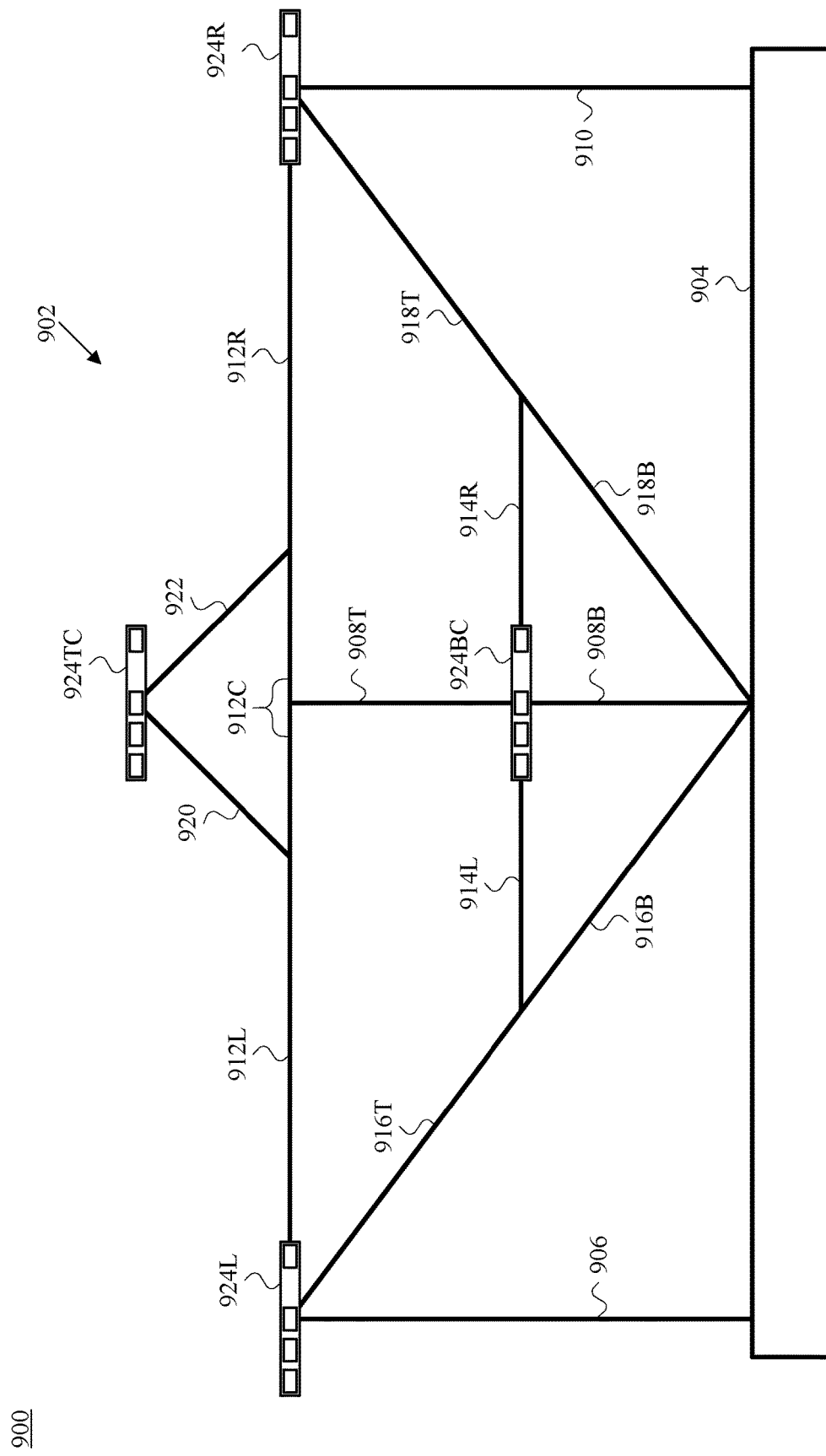
FIG. 9A is a first front view of an example camera-assembly rig having mounted thereon four example camera assemblies, in accordance with at least one embodiment.

In at least one embodiment, the presenter 102 is positioned in front of a camera-assembly rig, one example of which is shown in FIG. 9A, which is a front view 900 of an example camera-assembly rig 902 having mounted thereon four example camera assemblies 924L ("left"), 924R ("right"), 924TC ("top center"), and 924BC ("bottom center"). Although four mounted camera assemblies, it will be appreciated by one of skill in the art that different arrangements are possible and four is merely an example. The camera assemblies can also be independently configured with many camera assemblies, For the left-right convention that is employed herein, camera assembly 924L is considered to be "left" rather than "right" because it is positioned to capture the left side of the presenter 102 if they were standing square to the camera-assembly rig 902 such that it appeared to the presenter 102 substantially the way it appears in FIG. 9A. Herein, the "L" elements also appear to the left of the "R" elements when viewing the drawings as they are.

The camera-assembly rig 902 includes a base 904; vertical supports 906, 908T ("top"), 908B ("bottom"), and 910; horizontal supports 912L, 912C ("center"), 912R, 914L, and 914R; diagonal supports 916T, 916B, 918T, 918B, 920, and 922. The structure and arrangement that is shown in FIG. 9A is presented for illustration and not by way of limitation. Other camera-assembly-rig structures and numbers and positions of camera assemblies are possible in various different embodiments. For example, in one embodiment, as will be appreciated by one of skill in the art, each or certain ones of each camera-assembly could be doubled, tripled or the like. Another structure and (in that case a three-camera-assembly) arrangement is depicted in and described below in connection with FIGS. 10A-D.

Consistent with the groups-of-elements numbering convention that is explained above in connection with the VDCs 106 of FIG. 1, "the camera assemblies 924" refers to the set of four camera assemblies {924L, 924R, 924TC, 924BC} that is depicted in FIG. 9A, and "a camera assembly 924," "one of the camera assemblies 924," and/or the like refers to any one member of that set. As one would expect, a specific reference such as "the camera assembly 924TC" refers to that particularly referenced camera assembly, though such a reference may nevertheless be made in a context in which a particular one of the camera assemblies 924 is offered as an example to describe aspects common among the camera assemblies 924 and not necessarily to distinguish one from the others. Similarly, a reference such as "the vertical support 908" refers to both the vertical supports 908T and 908B. And so on.

In at least one embodiment, the base 904 is made of a material (e.g., steel) or combination of materials that is dense and heavy enough to keep the camera-assembly rig 902 stable and stationary during use. Furthermore, in at least one embodiment, each of the supports 906-922 is made of a material (e.g., steel) or combination of materials that is strong and rigid, such that the relative positions of the base 904 and the respective camera assemblies 924 do not change during operation, such that a characteristic geometry among the camera assemblies 924 that are mounted on the camera-assembly rig 902 can reliably be used in part of the data processing described herein.

In the depicted arrangement, by way of example, the triangle formed by the horizontal support 912C, the diagonal support 920, and the diagonal support 922 ("the triangle 912-920-922") is an equilateral triangle, and each of the six triangles that are formed among different combinations of the base 904; the vertical supports 906, 908, and 910; the horizontal supports 912 and 914, and the diagonal supports 916 and 918 is a "3-4-5" right triangle as is known in the art and in mathematical disciplines such as geometry and trigonometry. These six triangles are the triangle 904-906-916, the triangle 904-910-918, the triangle 908-912-916, the triangle 908-912-918, the triangle 908-914-916, and the triangle 908-914-918.

Figure 9B:
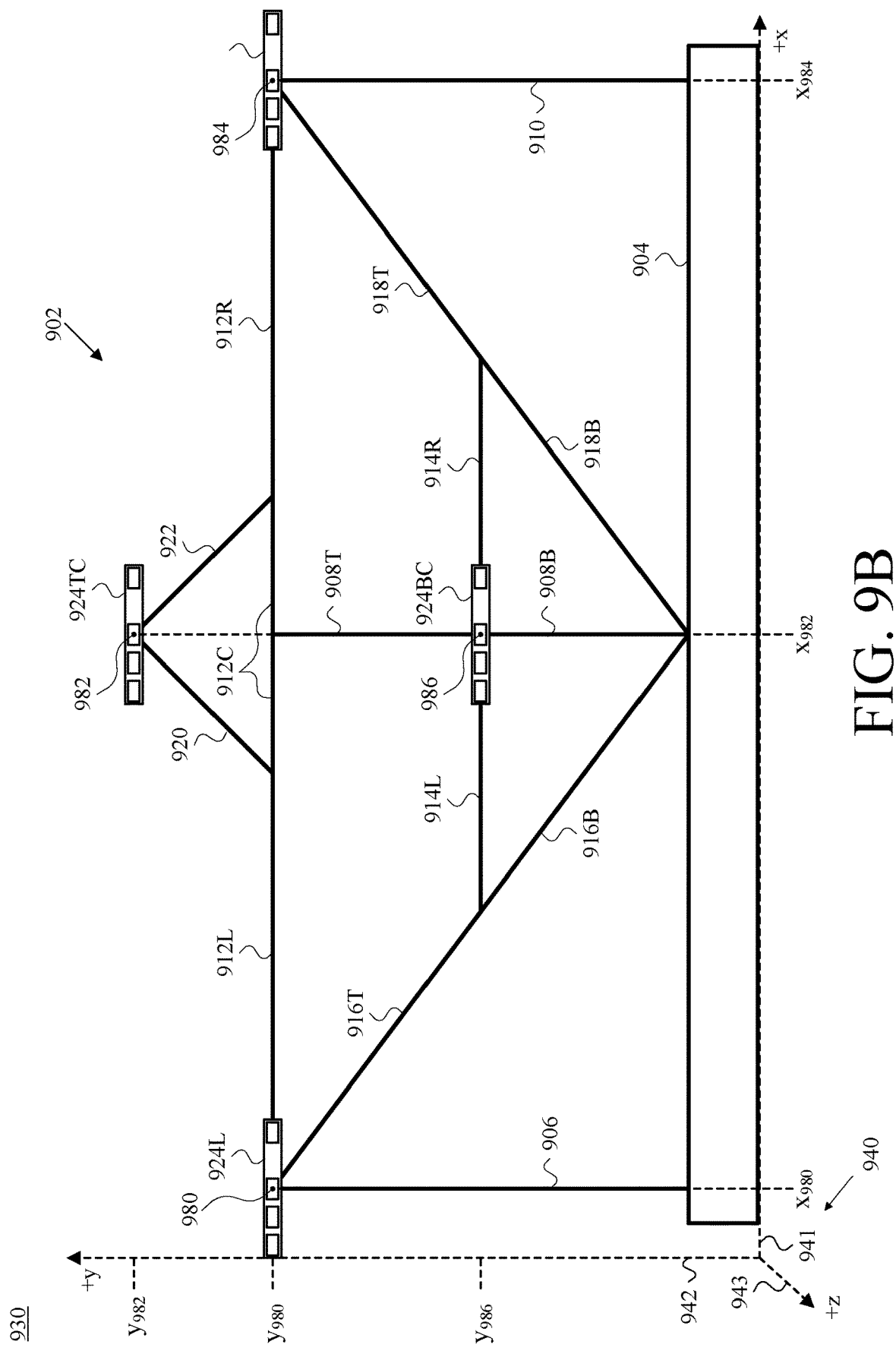
FIG. 9B is a second front view of the camera-assembly rig and camera assemblies of FIG. 9A, shown for an example reference set of cartesian-coordinate axes, in accordance with at least one embodiment.

Further with respect to geometry, FIG. 9B is a front view 930 of the camera-assembly rig 902 and camera assemblies 924 of FIG. 9A, and depicts those elements with respect to an example reference set of cartesian-coordinate axes 940, which includes an x-axis 941, a y-axis 942, and a z-axis 943, in accordance with at least one embodiment. The selection of cartesian-coordinate axes and the placement in FIG. 9B of the cartesian-coordinate axes 940 are by way of example and not limitation. Other coordinate systems could be used to organize 3D space, and certainly other placements of axes could be chosen other than the arbitrary choice that is reflected in FIG. 9B. This arbitrary choice, however, is maintained and remains consistent throughout a number of the ensuing figures.

Four different points 980, 982, 984, and 986 in 3D space are labeled in FIG. 9B. Each one has been chosen to correspond with what is referred to herein as the "front centroid" (e.g., the centroid of the front face) of the respective visible-light camera of a given one of the camera assemblies 924. In this description of FIG. 9B and of a number of the ensuing figures, a red-green-blue (RGB) camera is used as an example type of visible-light camera; this is by way of example and not limitation.

As is also discussed below in connection with at least FIGS. 11A and 11B, in at least one embodiment, each camera assembly 924 includes an RGB camera that is horizontally and vertically centered on the front face of the given camera assembly 924. The front centroid of each such RGB camera is the point at the horizontal and vertical center of the front face of that RGB camera, and therefore at the horizontal and vertical center of the respective front face of the respective camera assembly 924 as well. By convention, for the cartesian-coordinate axes 940, each of the front centroids 980, 982, 984, and 986 has been chosen to have a z-coordinate (not explicitly labeled in FIG. 9B) equal to zero, not by way of limitation.

The 3D-space point 980 is the front centroid of camera assembly 924L and is located for the cartesian-coordinate axes 940 at coordinates $\{x_{980}, y_{980}, 0\}$. The notation used in this description for that point in that space is $xyz_{940}::\{x_{980}, y_{980}, 0\}$. The 3D-space point 982 is the front centroid of the camera assembly 924TC and has coordinates $xyz_{940}::\{x_{982}, y_{982}, 0\}$. The 3D-space point 984 is the front centroid of the camera assembly 924R and has coordinates $xyz_{940}::\{x_{984}, y_{980}, 0\}$. The 3D-space point 986 is the front centroid of the camera assembly 924BC and has coordinates $xyz_{940}::\{x_{982}, y_{986}, 0\}$.

Other 3D-space points could be labeled as well, as these four are merely examples that illustrate among other things that, at least for some herein-described data operations, a shared (e.g., global, common, reference, etc.) 3D-space-coordinate system is used across multiple different camera assemblies that each have a respective different vantage point in that shared 3D-space-coordinate system—e.g., in that shared geometry. In this description, for at least FIG. 9B, FIG. 9C, and FIG. 9D, that shared 3D-space-coordinate system is the cartesian-coordinates axes 940 ($xyz_{940}$). 3D-space-coordinate system $xyz_{1040}$ (and associated cartesian-coordinate axes 1040) applies to FIG. 10B and 3D-space-coordinate system $xyz_{1040}$ and the three-camera-assembly geometry of example camera-assembly rig 1002 applies to FIG. 10A.

As shown in FIG. 9B, the 3D-space points 980, 982, 984, and 986 are referred to herein at times as front centroids 980, 982, 984, and 986, and front centroids of the RGB cameras of camera assemblies 924 and at times as being the respective front centroids of the respective camera assemblies 924 themselves since, as described above, they are both.

One or more of the camera assemblies 924 could be fixed to the camera-assembly rig 902 in a fixed or removable manner. One or more of the camera assemblies 924 could be fixed to the camera-assembly rig 902 at any angle deemed suitable by those of skill in art. Camera assembly 924TC could be oriented straight ahead and inclined down at a small angle, while the camera assembly 924BC could be oriented straight ahead and inclined up at a small angle; furthermore, the camera assemblies 924L and 924R could each be level and rotated inward toward center, perhaps each by the same angle. This sort of arrangement is depicted by way of example in FIG. 9C, which is a top view 960 of the camera-assembly rig 902 and of three of the four camera assemblies 924.

Figure 9C:
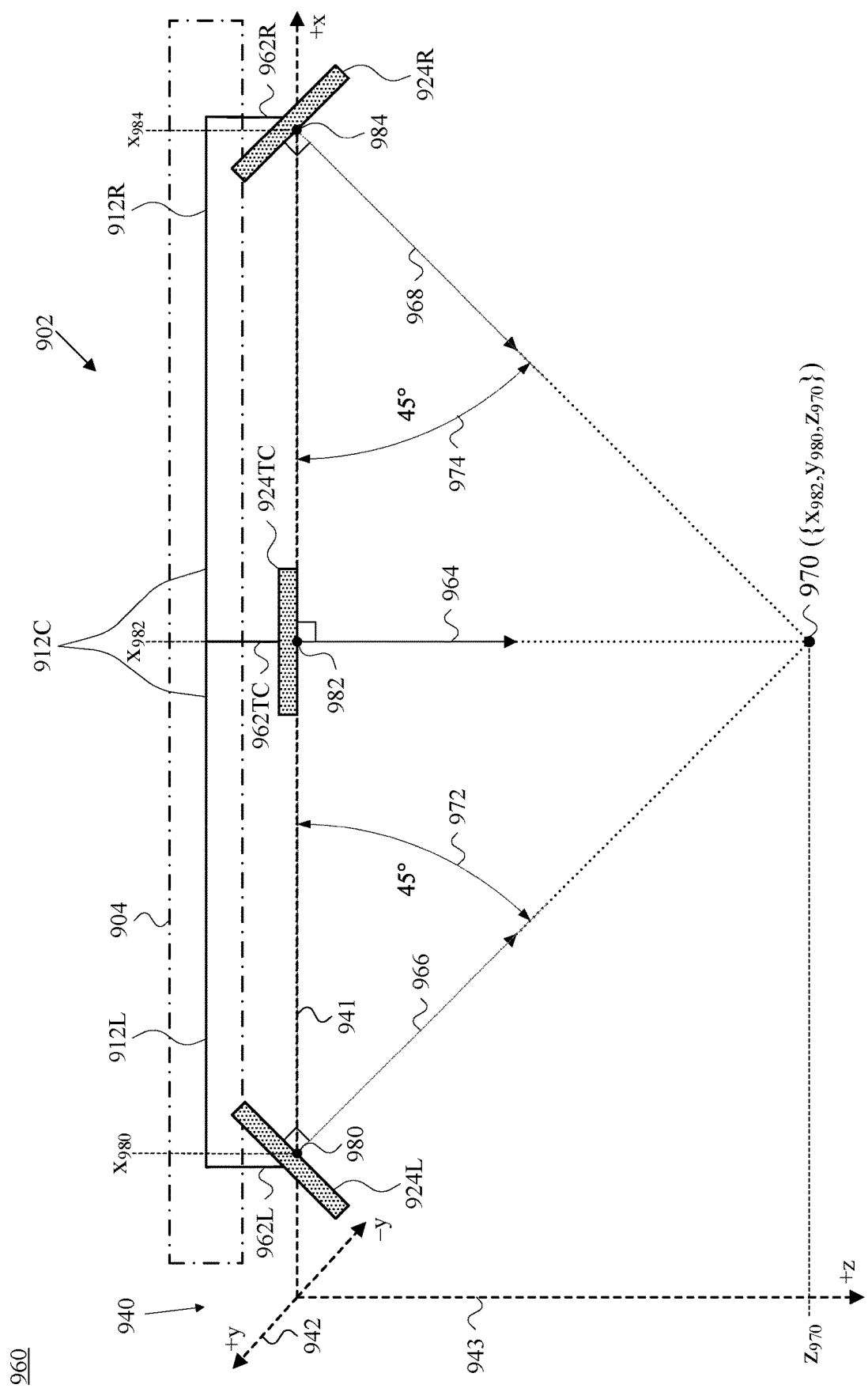
FIG. 9C is a partial top view of the camera-assembly rig and camera assemblies of FIG. 9A, shown with respect to the reference set of cartesian-coordinate axes of FIG. 9B, in accordance with at least one embodiment.

Among the elements of the camera-assembly rig 902 that are depicted in FIG. 9A and FIG. 9B, those that are also depicted in FIG. 9C are the base 904 (shown in FIG. 9C in dashed-and-dotted outline) and the horizontal supports 912L, 912C, and 912R. The three camera assemblies that are depicted in FIG. 9C are the camera assemblies 924L, 924TC, and 924R, each of which is shown with a dotted pattern representing its respective top surface. Also carried over from FIG. 9B to FIG. 9C are the cartesian-coordinates axes 940 (shown rotated consistent with FIG. 9B being a front view and FIG. 9C being a top view of the camera-assembly rig 902), the front centroid 980 (having x-coordinate $x_{980}$) of the camera assembly 924L, the front centroid 982 (having x-coordinate $x_{982}$) of the camera assembly 924 TC, and the front centroid 984 (having x-coordinate $x_{984}$) of the camera assembly 924R.

FIG. 9C (as compared with FIGS. 9A and 9B) are three horizontal supports 962L, 962TC, and 962R. Each horizontal support 962 lies in an xz-plane (has a constant y-value) of the cartesian-coordinate axes 940 in an orientation that is normal to the aforementioned horizontal supports 912 and 914. The horizontal support 962L is connected between the camera assembly 924L and the horizontal support 912L. The horizontal support 962TC is connected between the camera assembly 924TC and a junction between the diagonal supports 920 and 922. The horizontal support 962R is connected between the camera assembly 924R and the horizontal support 912R.

FIG. 9C illustrates camera assemblies 924L and 924R turned inwards by an angle of 45°. A 45° angle 972 is formed between the x-axis 941 and a ray 966 normal to the front face of the camera assembly 924L emanates from front centroid 980. A 45° angle 974 is formed between the x-axis 941 and a ray 968 normal to the front face of the camera assembly 924R emanates from the front centroid 984. Also depicted is a ray 964 normal to the front face of the camera assembly 924TC emanates from the front centroid 982. And though it is not required in this example, the rays 964, 966, and 968 all intersect at a focal point 970, which has coordinates $xyz_{940}::\{x_{982}, y_{980}, z_{970}\}$.

The camera-assembly rig 902 and the camera assemblies 924 affixed thereon are in connection with a single reference set of cartesian-coordinate axes 940. Camera-assembly-specific sets of cartesian-coordinate axes for camera assemblies 924 are also possible. Also, transforms between (i) locations in a given 3D space are possible with respect to the reference cartesian-coordinate axes 940 and (ii) those same locations in 3D space with respect to a set of cartesian-coordinate axes oriented with respect to a given one of the camera assemblies 924.

Figure 9D:
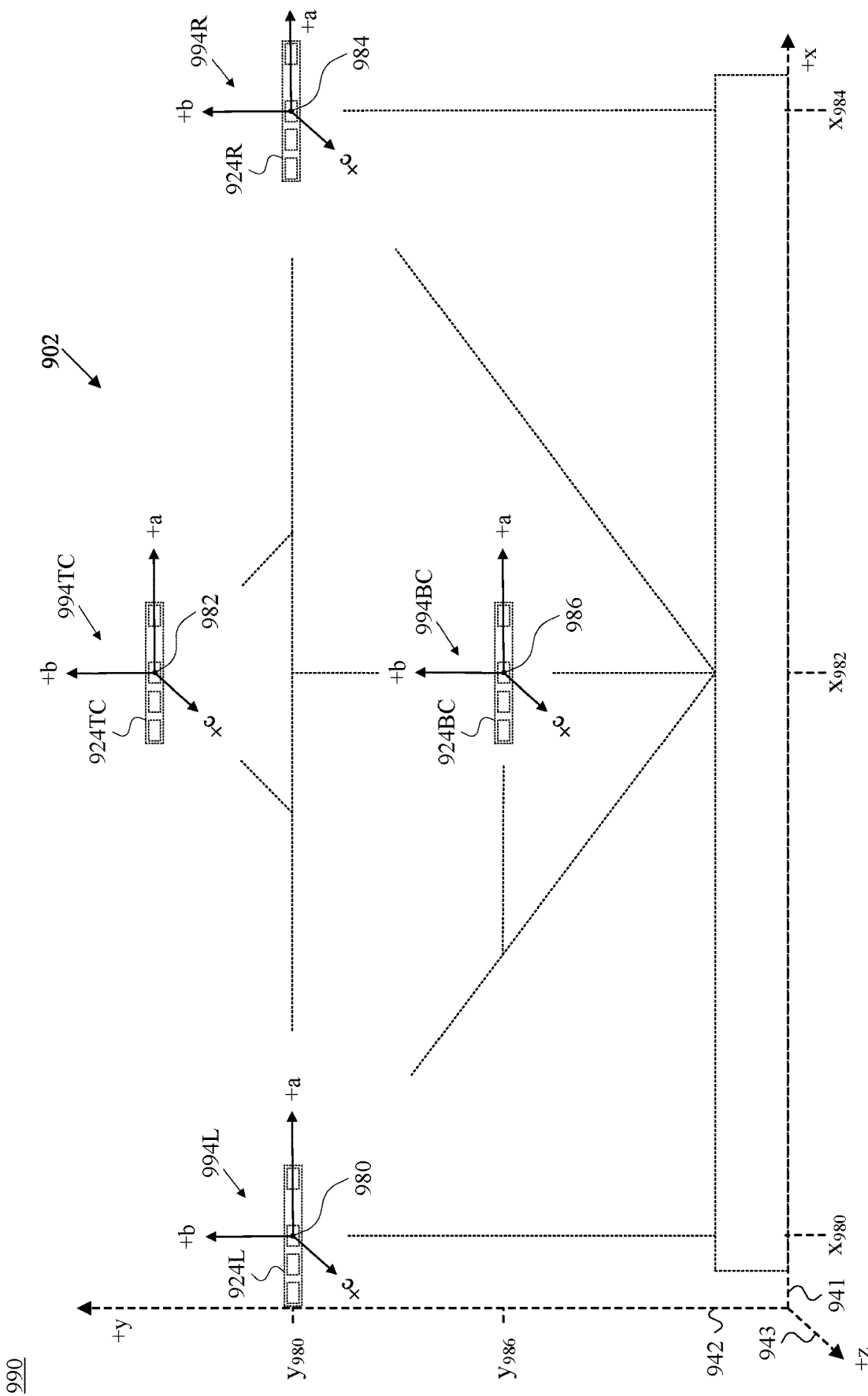
FIG. 9D is a partial front view of the camera-assembly rig and camera assemblies of FIG. 9A, shown with respect to the reference set of cartesian-coordinate axes of FIG. 9B, where each such camera assembly is also shown with respect to its own example camera-assembly-specific set of cartesian-coordinate axes, in accordance with at least one embodiment.

Some example camera-assembly-specific sets of cartesian-coordinate axes are shown in FIG. 9D, which is similar to FIG. 9B. In particular, FIG. 9D is a partial front view 990 of the camera-assembly rig 902 and camera assemblies 924, in accordance with at least one embodiment. In FIG. 9D, none of the individual components of the camera-assembly rig 902 (e.g., the base 904) are expressly labeled. Many of the lines of the camera-assembly rig 902 have been reduced to dashed lines and partially redacted in length so as not to obscure the presentation of the more salient aspects of FIG. 9D. Also, the lines that form the camera assemblies 924 themselves have been converted to being dashed lines.

In FIG. 9D, as is the case in FIG. 9B, the camera-assembly rig 902 is depicted for the reference cartesian-coordinate axes 940. In FIG. 9D, however, each of the camera assemblies 924 is also depicted with respect to its own example camera-assembly-specific set of cartesian-coordinate axes 994, each of which is indicated as having a respective a-axis, a respective b-axis, and a respective c-axis. Thus, the camera assembly 924L is shown with respect to cartesian-coordinate axes 994L, the camera assembly 924R with respect to cartesian-coordinate axes 994R, the camera assembly 924TC with respect to cartesian-coordinate axes 994TC, and the camera assembly 924BC with respect to cartesian-coordinate axes 994BC.

In the geometry herein, the a-axis, b-axis, and c-axis of each camera-assembly-specific cartesian-coordinate axes 994 are not respectively parallel to the x-axis 941, the y-axis 942, and the z-axis 943 of the reference cartesian-coordinate axes 940. Rather, the xy-plane where z=0 of each set of axes 994 is flush with the respective front face of the corresponding respective camera assembly 924. The particular angles at which the various camera assemblies 924 are affixed to the camera-assembly rig 902 with respect to the reference cartesian-coordinate axes 940 are therefore relevant to building proper respective transforms between each of the coordinate axes 994 and the reference axes 940. It is acknowledged that "axes" is at times used as a singular noun in this written description is basically as shorthand for "set of axes" (e.g., "The axes 994 is oriented . . . ").

Each of the axes 994 inherently has an origin—e.g., a point having the coordinates $\{a=0, b=0, c=0\}$ in its respective coordinate system. With each of the camera assemblies 924 being rigidly affixed to the camera-assembly rig 902, the location of each of those origin points has coordinates in the reference axes 940. A camera-assembly-specific set of cartesian-coordinate axes 994 herein is "anchored" at its corresponding coordinates in the reference axes 940.

The camera-assembly-specific set of cartesian-coordinate axes 994L is anchored at the front centroid 980 of the camera assembly 924L and is located at $xyz_{940}::\{x_{980},y_{980},0\}$; the camera-assembly-specific set of cartesian-coordinate axes 994R is anchored at the front centroid 984 of the camera assembly 924R and is located at $xyz_{940}::\{x_{984},y_{980},0\}$; the camera-assembly-specific set of cartesian-coordinate axes 994TC is anchored at the front centroid 982 of the camera assembly 924TC and is located at $xyz_{940}::\{x_{982},y_{980},0\}$; and the camera-assembly-specific set of cartesian-coordinate axes 994BC is anchored at the front centroid 986 of the camera assembly 924BC and is therefore located at $xyz_{940}::\{x_{982},y_{986},0\}$.

2. Rig Having Multi-Camera Mounted Camera Assemblies

Multi-camera assemblies are included in this disclosure, and one of skill in the art will appreciate with the benefit of this disclosure that seven, eight and more cameras are a function of geometrical space and bandwidth of transmission. For purposes of simplicity of explanation, a three-camera-assembly arrangement and associated geometry is depicted in and described below in connection with FIGS. 10A-10D. In FIGS. 10A-10D, many of the elements that are similar to corresponding elements that are numbered in the 900 series in FIGS. 9A-9D are numbered in the 1000 series in FIGS. 10A-10D. FIGS. 9A-9D and 10A-10D are similar and the differences that are described below.

Figure 10A:
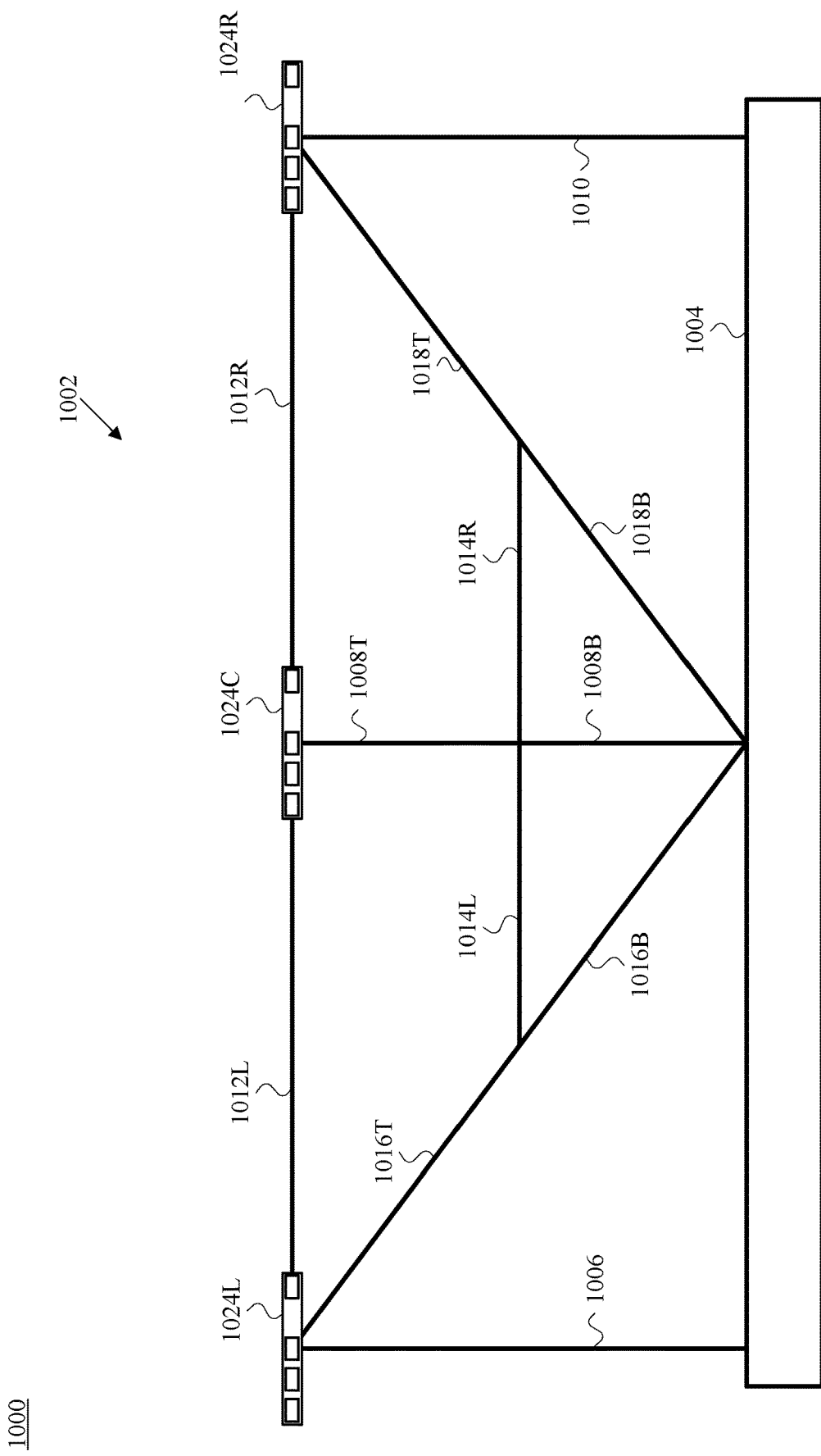
FIG. 10A is a first front view of an example camera-assembly rig having mounted thereon three example camera assemblies, in accordance with at least one embodiment.

FIG. 10A is a first front view 1000 of an example camera-assembly rig 1002 having mounted thereon three example camera assemblies 1024L, 1024C, and 1024R, in accordance with at least one embodiment. In comparing FIG. 10A to FIG. 9A, the camera assemblies 924TC and 924BC have been removed and replaced by a single camera assembly 1024C that is situated at the same height (y-value) as the camera assemblies 1024L and 1024R. Consistent with that change, there are no supports in FIG. 10A that correspond with the diagonal supports 920 and 922 of FIG. 9A; instead of horizontal supports 912L, 912C, and 912R, FIG. 10A has instead just the pair of horizontal supports 1012L and 1012R.

Figure 10B:
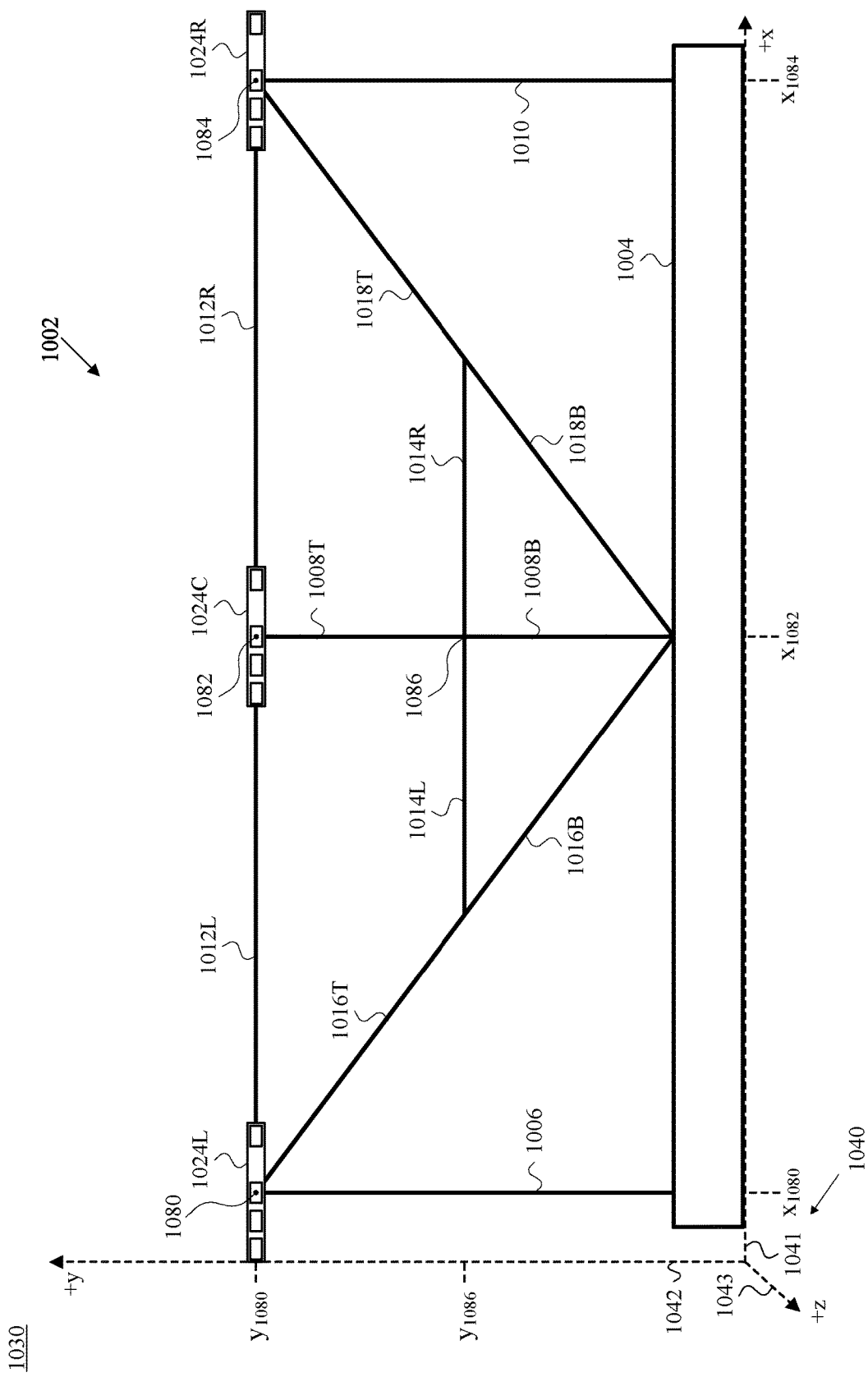
FIG. 10B is a second front view of the camera-assembly rig and camera assemblies of FIG. 10A, shown with respect to an example reference set of cartesian-coordinate axes, in accordance with at least one embodiment.

FIG. 10B is a second front view 1030 of the camera-assembly rig 1002 and the camera assemblies 1024 of FIG. 10A, shown with respect to the above-mentioned example reference set of cartesian-coordinate axes 1040, in accordance with at least one embodiment. FIG. 10B is similar in many ways to both FIG. 9B and to FIG. 10A. The axes 1040 includes an x-axis 1041, a y-axis 1042, and a z-axis 1043. It can be seen in FIG. 10B that the camera assembly 1024L has a front centroid 1080 having coordinates $xyz_{1040}::\{x_{1080},y_{1080},0\}$. The camera assembly 1024C has a front centroid 1082 having coordinates $xyz_{1040}::\{x_{1082},y_{1080},0\}$. Finally, the camera assembly 1024R has a front centroid 1084 having coordinates $xyz_{1040}::\{x_{1084},y_{1080},0\}$.

Figure 10C:
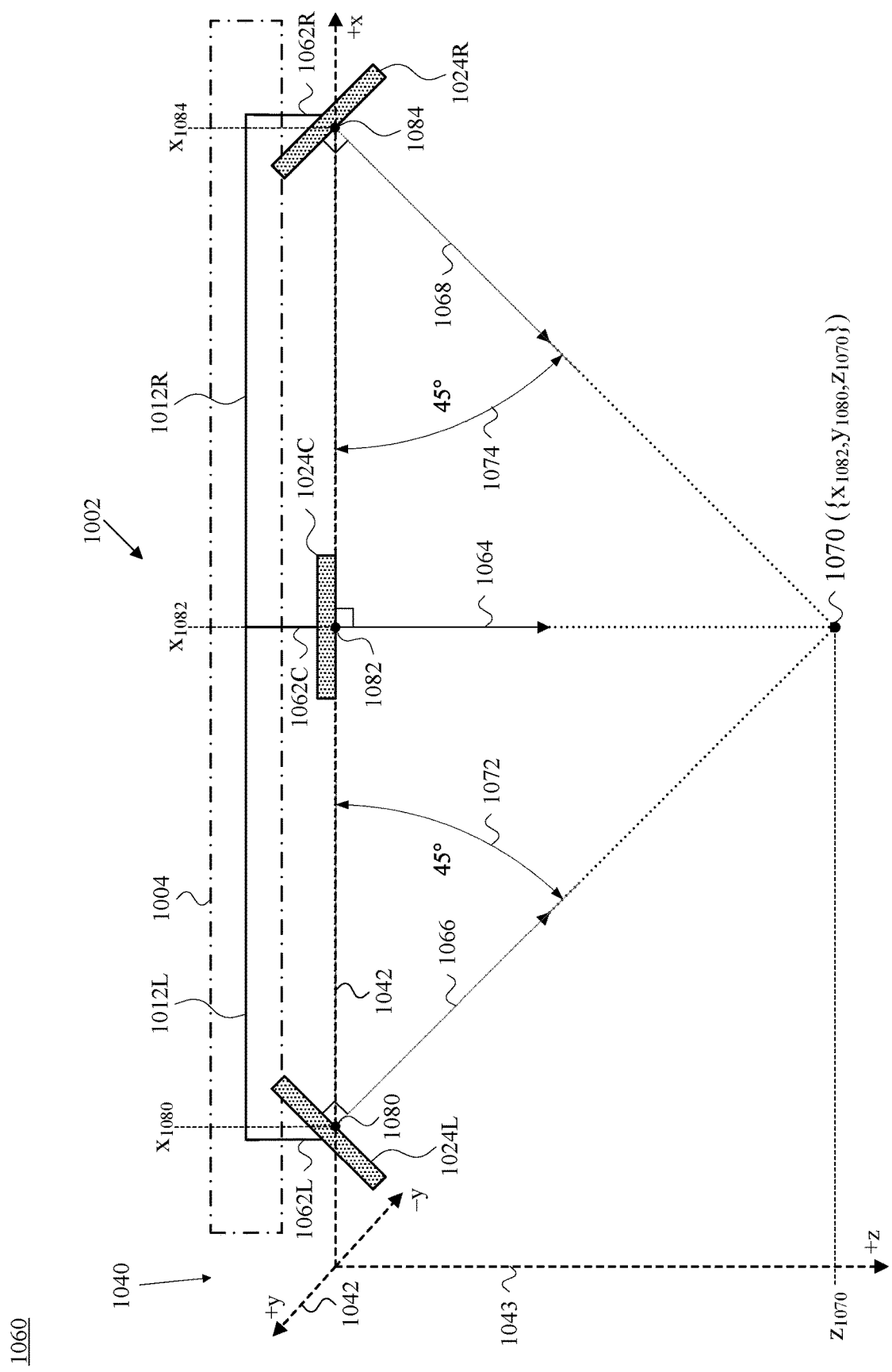
FIG. 10C is a partial top view of the camera-assembly rig and camera assemblies of FIG. 10A, shown with respect to the reference set of cartesian-coordinate axes of FIG. 10B, in accordance with at least one embodiment.

FIG. 10C is a partial top view 1060 of the camera-assembly rig 1002 and camera assemblies 1024 of FIGS. 10A and 10B, shown with respect to the reference set of cartesian-coordinate axes 1040 of FIG. 10B. FIG. 10C is nearly identical to FIG. 9C, and in fact the 3D-space points 970 and 1070 would be the same point in space (assuming complete alignment of the respective x-axes, y-axes, and z-axes of the sets of coordinates axes 940 and 1040, as well as identical dimensions of the respective camera-assembly rigs and camera assemblies).

One subtle difference is that the ray 964 is slightly longer than the ray 1064 due to the elevated position of the camera assembly 924TC as compared with the camera assembly 1024C. In other words, the vantage point of the camera assembly 924TC is looking downward at the focal point 970 whereas the vantage point of the camera assembly 1024C is looking straight ahead at the focal point 1070. This difference is not explicitly represented in FIGS. 9C and 10C themselves, but rather is inferable from the sets of drawings taken together.

Figure 10D:
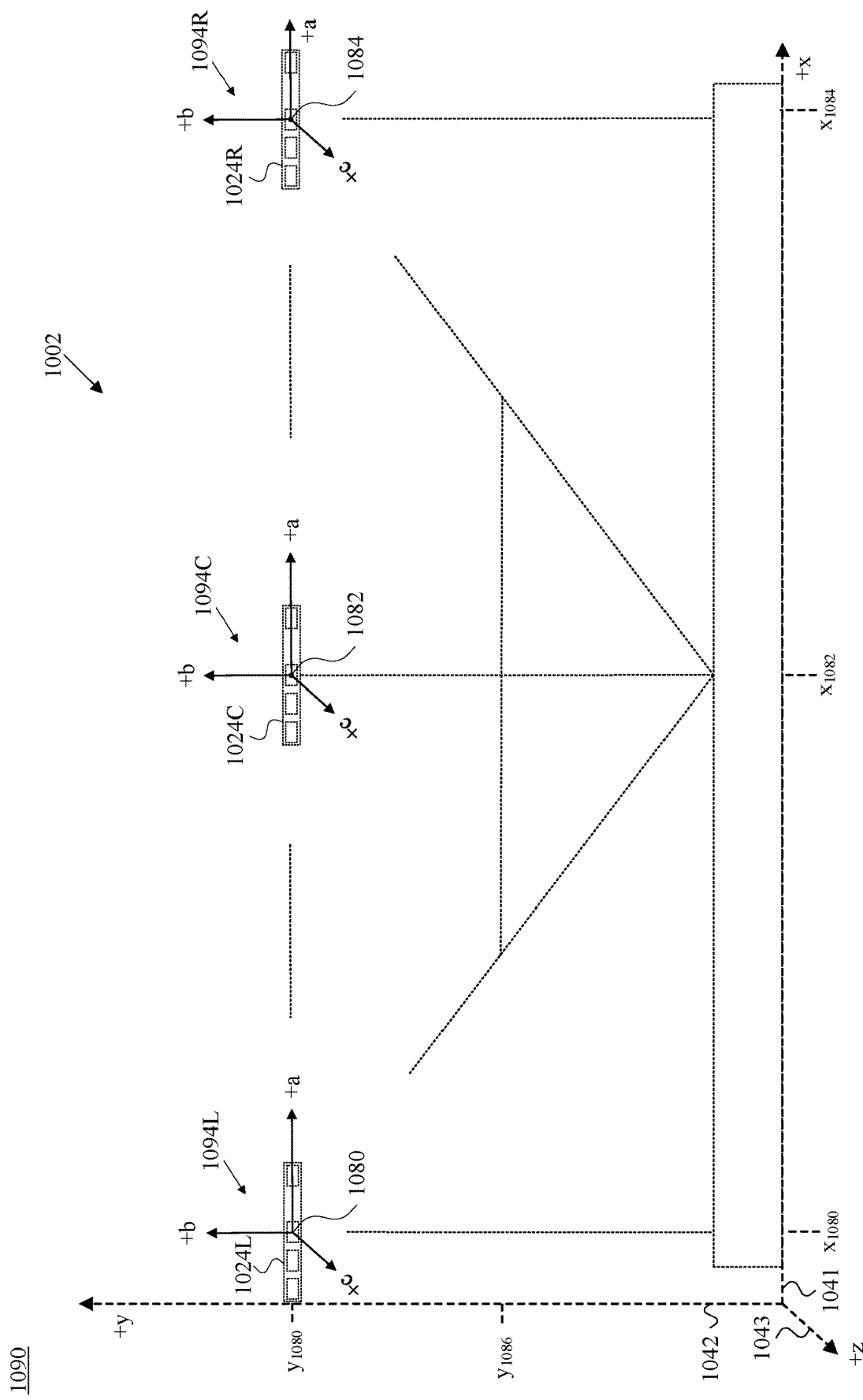
FIG. 10D is a partial front view of the camera-assembly rig and camera assemblies of FIG. 10A, shown with respect to the reference set of cartesian-coordinate axes of FIG. 10B, where each such camera assembly is also shown with respect to its own example camera-assembly-specific set of cartesian-coordinate axes, in accordance with at least one embodiment.

FIG. 10D is a partial front view 1090 of the camera-assembly rig 1002 and camera assemblies 1024, shown with respect to the reference set of cartesian-coordinate axes 1040, in which each camera assembly 1024 is also shown with respect to its own example camera-assembly-specific set of cartesian-coordinate axes, in accordance with at least one embodiment. FIG. 10D is nearly identical in substance to FIG. 9D (excepting of course that they depict different embodiments), and therefore is not covered in detail here. Note that the camera-assembly-specific axes 1094L is anchored at the front centroid 1080 of the camera assembly 1024L, the camera-assembly-specific axes 1094C is anchored at the front centroid 1082 of the camera assembly 1024C, and the camera-assembly-specific axes 1094R is anchored at the front centroid 1084 of the camera assembly 1024R. Unlike in FIG. 9D, there is in FIG. 10D a set of camera-assembly specific axes (in particular the axes 1094C) that are respectively parallel to the reference set of axes (which in the case of FIG. 10D is the axes 1040).

F. Example Camera Assembly

Figure 11A:
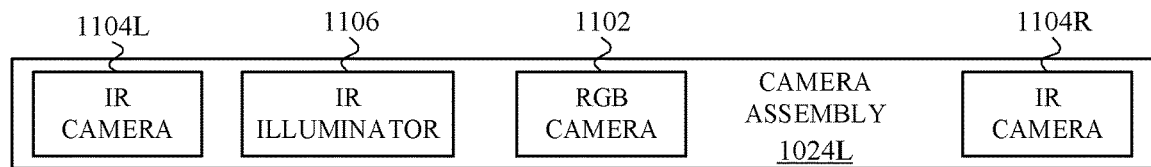
FIG. 11A is a first front view of an example one of the camera assemblies of FIG. 10A, in accordance with at least one embodiment.
Figure 11B:
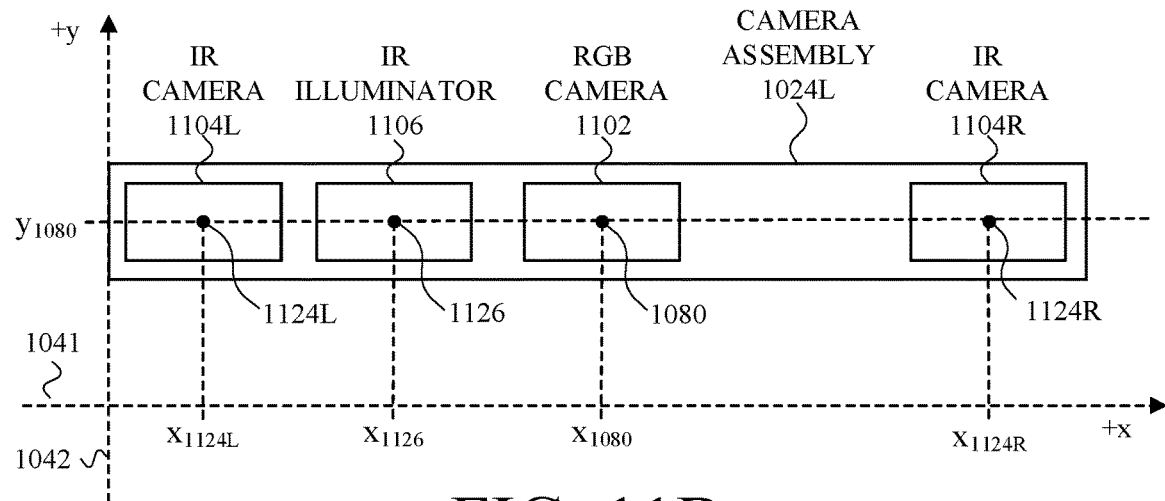
FIG. 11B is a second front view of the camera assembly of FIG. 11A, shown with respect to an example portion of the reference set of cartesian-coordinate axes of FIG. 10B, in accordance with at least one embodiment.
Figure 11C:
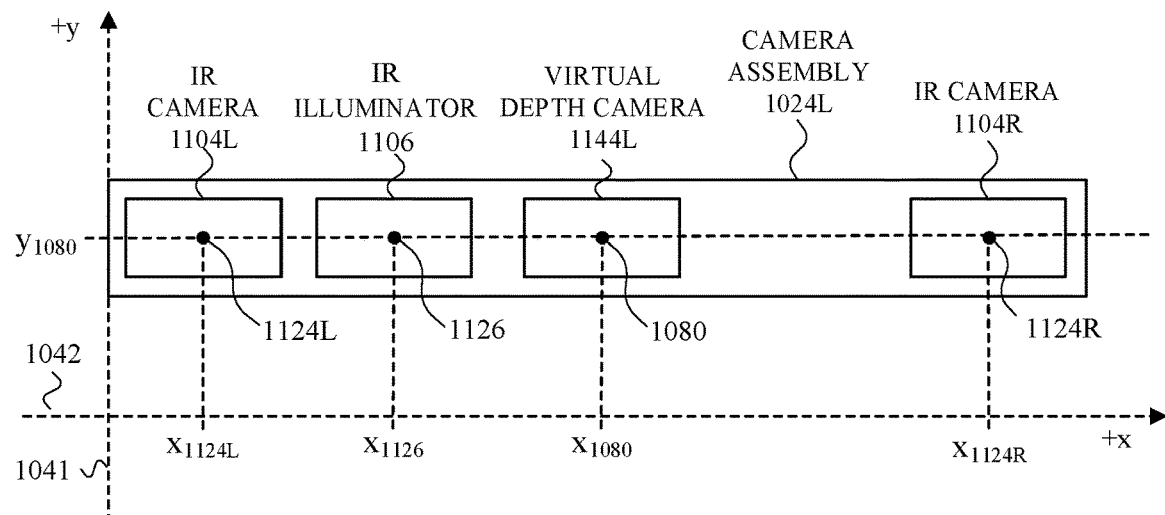
FIG. 11C is a modified virtual front view of the camera assembly of FIG. 11A, also shown with respect to the portion from FIG. 11B of the reference set of cartesian-coordinate axes of FIG. 10B, in accordance with at least one embodiment.

An example camera assembly is shown in further detail in FIGS. 11A-11C. And although FIG. 11A is a front view 1100 of the above-mentioned camera assembly 1024L in accordance with at least one embodiment, it should be understood that any one or more of the VDCs 106, any one or more of the camera assemblies 924, and/or any one or more of the camera assemblies 1024 could have a structure similar to the camera-assembly structure (e.g., composition, arrangement, and/or the like) that is depicted in and described in connection with FIGS. 11A-11C.

As can be seen in FIG. 11A, the camera assembly 1024L includes an RGB camera 1102, an IR camera 1104L, an IR camera 1104R, and an IR illuminator 1106. And certainly other suitable components and arrangements of components could be used. In at least one embodiment, one or more of the camera assemblies 924 and/or 1024 is a RealSense 410® from Intel Corporation of Santa Clara, Calif. In at least one embodiment, one or more of the camera assemblies 924 and/or 1024 is a RealSense 430® from Intel Corporation. And certainly other examples could be listed as well.

The RGB camera 1102 of a given camera assembly 1024 could be any RGB (or other visible-light) video camera deemed suitable by those of skill in the art for a given implementation. The RGB camera 1102 could be a standalone device, a modular component installed in another device (e.g., in a camera assembly 1024), or another possibility deemed suitable by those of skill in the art for a given implementation. In at least one embodiment, the RGB camera 1102 includes (i) a color sensor known as the Chameleon3 3.2 megapixel (MP) Color USB3 Vision (a.k.a. the Sony IMX265) manufactured by FLIR Integrated Imaging Solutions Inc. (formerly Point Grey Research), which has its main office in Richmond, British Columbia, Canada and (ii) a high-field-of-view, low-distortion lens. As described herein, some embodiments involve the camera assemblies 1024 using their respective RGB cameras 1102 to gather video of the subject (e.g., the presenter 102) and to transmit a raw video stream 208 of the subject to a server such as PSS 202.

Each IR camera 1104 of a given camera assembly 1024 could be any IR camera deemed suitable by those of skill in the art for a given implementation. Each IR camera 1104 could be a standalone device, a modular component installed in another device (e.g., in a camera assembly 1024), or another possibility deemed suitable by those of skill in the art for a given implementation. In at least one embodiment, each IR camera 1104 includes (i) a high-field-of-view lens and (ii) an IR sensor known as the OV9715 from OmniVision Technologies, Inc., which has its corporate headquarters in Santa Clara, Calif. As described herein, some embodiments involve the various camera assemblies 1024 using their respective pairs of IR cameras 1104 to gather depth data of the subject (e.g., the presenter 102) and to transmit a depth-data stream 110 of the subject to a server such as PSS 202.

The IR illuminator 1106 of a given camera assembly 1024 could be any IR illuminator, emitter, transmitter, and/or the like deemed suitable by those of skill in the art for a given implementation. The IR illuminator 1106 could be a set of one or more components that alone or together carry out the herein-described functions of the IR illuminator 1106. For example, IR illuminator 1106 could include LIMA high-contrast IR dot projector from Heptagon, Large Divergence 945 nanometer (nm) vertical-cavity surface-emitting laser (VCSEL) Array Module from Princeton Optronics as will be appreciated by one of skill in the art.

In at least one embodiment, to aid in gathering (e.g., obtaining, generating, and/or the like) depth data, depth images, 3D meshes, and the like, the IR illuminator 1106 of a given camera assembly 1024 is used to project a pattern of IR light on the subject. The IR cameras 1104L and 1104R may then be used to gather reflective images of this projected pattern, where such reflective images can then be stereoscopically compared and analyzed to ascertain depth information regarding the subject. As mentioned, stereoscopic analysis of projected-IR-pattern reflections is but one way that such depth information could be ascertained, and those of skill in the art may select another depth-information-gathering technology without departing from the scope and spirit of the present disclosure.

FIG. 11B is a front view 1120 of the camera assembly 1024L shown with respect to an example portion of the cartesian-coordinate axes 1040, in accordance with at least one embodiment. The x-axis 1041 and the y-axis 1042 are shown in FIG. 11B, though the z-axis 1043 is not (although the different points that are labeled in FIG. 11B would in fact have different z-values than one another, due to the orientation of the camera assembly 1024L as depicted in FIG. 10C). Also depicted is the 3D-space point 1080, which, as can be seen in FIG. 11B and as was mentioned above, is the front centroid of both the camera assembly 1024L as a whole and of the RGB camera 1102 of the camera assembly 1024L. As was described above, the front centroid 1080 has coordinates $xyz_{1040}::\{x_{1080}, y_{1080}, 0\}$. The IR camera 1104L has a front centroid 1124L having an x-coordinate of $x_{1124L}$, a y-coordinate of $y_{1080}$, and a non-depicted z-coordinate. The IR camera 1104R has a front centroid 1124R having an x-coordinate of $x_{1124R}$, a y-coordinate of $y_{1080}$, and a non-depicted z-coordinate. The IR illuminator 1106 has a front centroid 1126 having an x-coordinate of $x_{1126}$, a y-coordinate of $y_{1080}$, and a non-depicted z-coordinate.

FIG. 11C is a modified virtual front view 1140 of the camera assembly 1024L, also shown with respect to the portion from FIG. 11B of the cartesian-coordinate axes 1040. FIG. 11C is substantially identical to FIG. 11B, other than that the RGB camera 1102 has been replaced by a virtual depth camera 1144L at the exact same position having a virtual front centroid 1080 that is co-located with the front centroid 1080 of the RGB camera 1102 of the camera assembly 1024L at the coordinates $xyz_{1040}::\{x_{1080}, y_{1080}, 0\}$.

The relevance of the virtual depth camera 1144L being at the same location of the actual RGB camera 1102 of the camera assembly 1024L is explained more fully below. And each of the other camera assemblies 924 and 1024 could similarly be considered to have a virtual depth camera 1144 co-located with their respective RGB camera 1102. In particular with respect to the camera assemblies 1024C and 1024R, in the described embodiment, the camera assembly 1024C is considered to have a virtual depth camera 1144C co-located (e.g., having a common front centroid 1082) with the respective RGB camera 1102 of the camera assembly 1024C, and the camera assembly 1024R is considered to have a virtual depth camera 1144R co-located (e.g., having a common front centroid 1084) with the respective RGB camera 1102 of the camera assembly 1024R. And certainly other example arrangements could be used as well.

III. Example Scenarios

A. Example Presenter Scenarios

Figure 12:
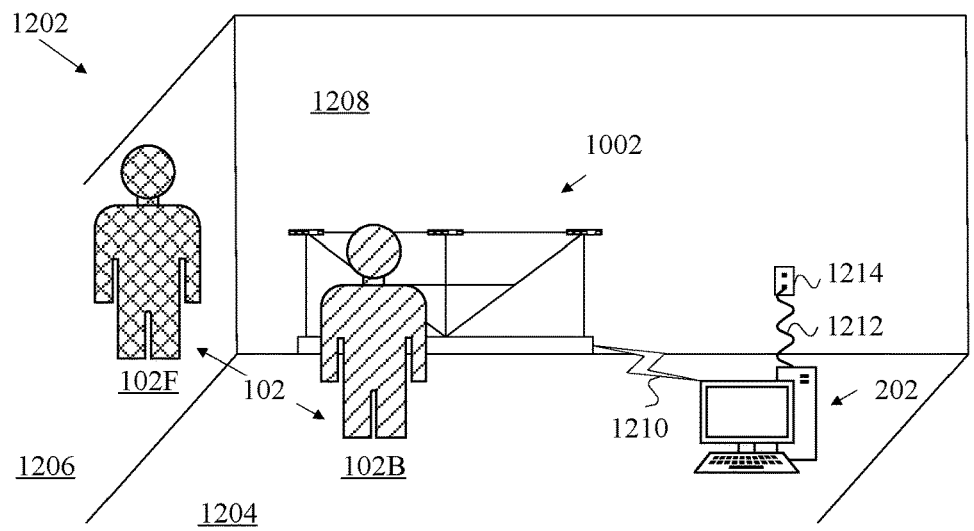
FIG. 12 is a diagram of a first example presenter scenario in which the presenter of FIG. 1 is positioned in an example room in front of the camera-assembly rig and camera assemblies of FIG. 10A, in accordance with at least one embodiment.

One possible setup in which the presenter 102 may be situated is depicted in FIG. 12, which is a diagram of a first example presenter scenario 1200 in which the presenter 102 is positioned in an example room 1202 in front of the camera-assembly rig 1002 and the camera assemblies 1024 of FIG. 10A, in accordance with at least one embodiment. The presenter scenario 1200 takes place in the room 1202, which has a floor 1204, a left wall 1206, and a back wall 1208. Clearly the room 1202 could—and likely would—have other walls, a ceiling, etc., as only an illustrative part of the room 1202 is depicted in FIG. 12.

The view of FIG. 12 is from behind the presenter 102, and therefore a back 102B of the presenter 102 is shown as actually positioned where the presenter 102 would be standing in this example. It can be seen that the back 102B of the presenter 102 is shown with a pattern of diagonal parallel lines that go from lower-left to upper-right. Also depicted in FIG. 12 is a front 102F of the presenter 102, using a crisscross pattern formed by diagonal lines. Clearly the presenter would not appear floating in two places to an observer standing behind the presenter 102. The depiction of the front 102F of the presenter 102 is provided merely to illustrate to the reader of this disclosure that a remote viewer would generally see the front 102F of the presenter 102. It is further noted that the crisscross pattern that is depicted on the front 102F of the presenter 102 in FIG. 12 is consistent with the manner in which the presenter persona 116 is depicted in FIGS. 1, 2, 14, 15, and 24-29, as examples.

Also depicted as being in the room 1202 in FIG. 12 is PSS 202, which in this case is embodied in the form of a desktop computer that has a wireless (e.g., Wi-Fi) data connection 1210 with the camera rig 1002 and a wired (e.g., Ethernet) connection 1212 to a data port 1214, which may in turn provide high-speed Internet access, as an example, as direct high-speed data connections to one or more viewer locations are contemplated as well. The wireless connection 1210 could be between PSS 202 and a single module (not depicted) on the camera rig 1002, where that single module in turn interfaces with each of the camera assemblies 1024. In another embodiment, there is an independent wireless connection 1210 (1210L, 1210R, and 1210C) with each of the respective camera assemblies 1024. And certainly other possible arrangements could be described here as well.

Figure 13:
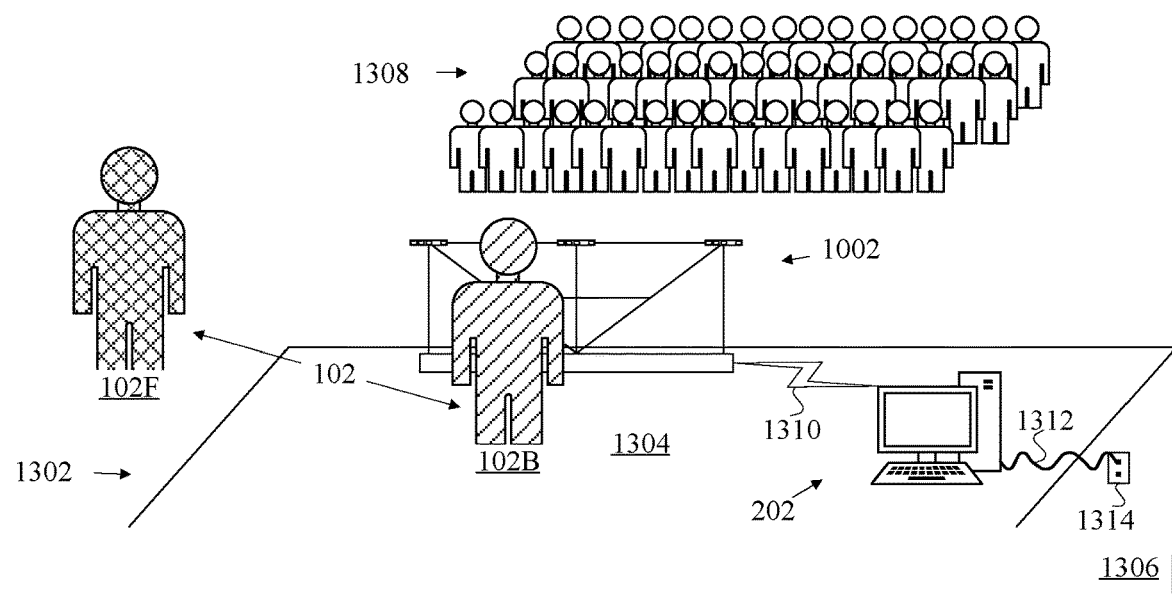
FIG. 13 is a diagram of a second example presenter scenario in which the presenter of FIG. 1 is positioned on an example stage in front of the camera-assembly rig and camera assemblies of FIG. 10A, in accordance with at least one embodiment.

As described earlier, in one example, the presenter 102 is delivering an astronomy lecture in a lecture hall. Such an example is depicted in FIG. 13, which is a diagram of a second example presenter scenario 1300 in which the presenter 102 is positioned on an example stage 1302 in front of the camera-assembly rig 1002 and the camera assemblies 1024 of FIG. 10A, in accordance with at least one embodiment. Some aspects of FIG. 13 that are identical or at least quite similar to parallel aspects in FIG. 12, and thus that are not further described here, include the presenter 102, the front 102F of the presenter 102, the back 102B of the presenter 102, the camera rig 1002, the camera assemblies 1024 (not specifically enumerated in FIG. 13), PSS 202, a wireless connection 1310, a wired connection 1312, and a data port 1314.

As can be seen in FIG. 13, the stage 1302 has a surface 1302 and a side wall 1306. The camera rig 1002 is positioned at the front of the stage 1302 on the surface 1304. The presenter 102 is standing on the surface 1304, facing the camera rig 1002, and addressing a live, in-person audience 1308. Certainly other arrangements could be depicted, as the scenarios 1200 and 1300 are provided by way of example. Also, as is the case with FIG. 12, the front 102F of the presenter 102 is included in FIG. 13 to show what the audience 1308 would be seeing, and not at all to indicate that somehow both the front 102F and the back 102B of the presenter 102 would be visible from the overall perspective of FIG. 13.

B. Example Viewer Scenarios

1. Virtual Reality (VR)

Figure 14:
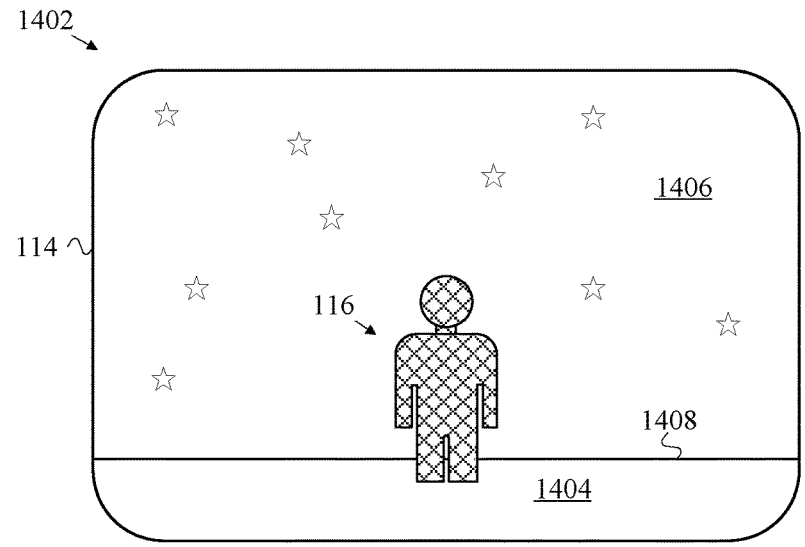
FIG. 14 is a diagram of a first example viewer scenario according to which a viewer is using the HMD of FIG. 1 to view the 3D persona of FIG. 1 of the presenter of FIG. 1 as part of an example virtual-reality (VR) experience, in accordance with at least one embodiment.

As mentioned above, there are several ways in which a viewer could experience the presentation by the presenter 102. Some examples include VR experiences and AR experiences. One example VR scenario is depicted in FIG. 14, which is a diagram of a first example viewer scenario 1400 according to which a viewer is using HMD 112 to view the 3D presenter persona 116, in accordance with at least one embodiment. The scenario 1400 is quite simplified, but in general is included to demonstrate the point that the viewer could view the presentation in a VR experience.

As can be seen in FIG. 14, in the scenario 1400, the viewer sees a depiction 1402 on the display 114 of HMD 112. In the depiction 1402, the 3D presenter persona 116 is depicted as standing on a (virtual) lunar surface 1404 with a (virtual) starfield (e.g., the lunar sky) 1406 as a backdrop. A (virtual) horizon 1408 separates the lunar surface 1404 from the starfield 1406. It will be quite apparent to those of skill in the art and to people in general that the number of possible VR examples that could be used in various different implementations is as limitless as the human imagination.

2. Augmented Reality (AR)

Figure 15:
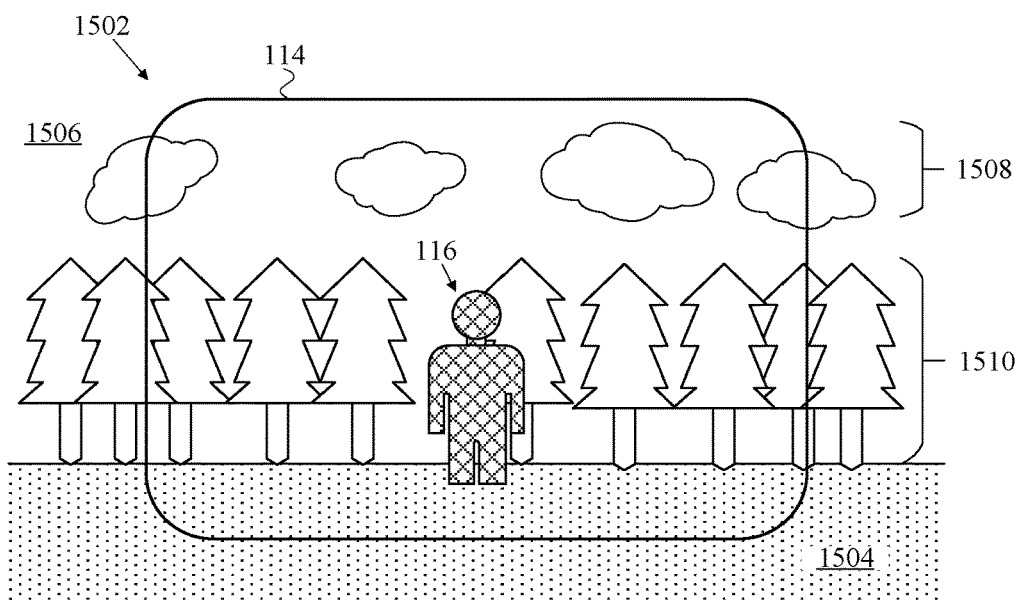
FIG. 15 is a diagram of a second example viewer scenario according to which a viewer is using the HMD of FIG. 1 to view the 3D persona of FIG. 1 of the presenter of FIG. 1 as part of an example augmented-reality (AR) experience, in accordance with at least one embodiment.

Another type of viewer scenario, in this case an AR viewer scenario, is depicted in FIG. 15, which is a diagram of a second example viewer scenario 1500, according to which a viewer is using HMD 112 to view the 3D persona 116 of the presenter 102 as part of an example AR experience, in accordance with at least one embodiment. The scenario 1500 is quite simplified as well, and is included to demonstrate that the viewer could view the presentation in an AR experience.

In the particular example that is shown in FIG. 15, there is a depiction 1502 in which the only virtual element is the 3D presenter persona 116. Certainly one or more additional virtual elements could be depicted in various different embodiments. In this example, then, the 3D presenter persona 116 is depicted as standing on the (real) ground 1504 in front of some (real) trees 1510 and some (real) clouds 1508 against the backdrop of the (real) sky 1506. In this simple example, the viewer has chosen to view the lecture by the presenter 102 from a location out in nature, but of course this is presented merely by way of example and not limitation.

IV. Example Operation

A. Example Sender-Side Operation

1. Introduction

FIG. 16A is a flowchart of a first example method 1600, in accordance with at least one embodiment. In various different embodiments, the method 1600 could be carried out by any one of a number of different entities—or perhaps by a combination of multiple such entities. Some examples of disclosed entities and combinations of disclosed entities that could carry out the method 1600 include the VDCs 106, PSS 202, and PSS 502. By way of example and not limitation, the method 1600 is described below as being carried out by PSS 202.

Furthermore, the below description of the method 1600 is given with respect to other elements that are also in the drawings, though this again is for clarity of presentation and by way of example, and in no way implies limitation. Each step 1602-1610 is described in a way that refers by way of example to various elements in the drawings of the present disclosure. In particular, and with some exceptions, the method 1600 is generally described with respect to the presenter scenario 1300, the viewer scenario 1400, the camera-assembly rig 1002, the camera assemblies 1024L, 1024R, and 1024C, and the basic information flow of FIG. 2 (albeit with the camera assemblies 1024LCR taking the respective places of the VDCs 206LCR).

2. Receiving Raw Video Streams from Camera Assemblies

At step 1602, PSS 202 receives three (in general M, where M is an integer) video streams 208 including the raw video streams 208L, 208C, and 208R, collectively the raw video streams 208LCR, respectively captured of the presenter 102 by the respective RGB video cameras 1102 of the camera assemblies 1024. RGB video cameras 1102 of the respective camera assemblies 1024 capture video, and, specifically, PSS 202 receives raw video streams 208 from the respective camera assemblies 1024. A similar convention is employed for depth-data streams 210.

As described herein, each video stream 208 includes video frames that are time-synchronized with the video frames of each of the other such video streams 208 according to a shared frame rate. That is, in accordance with embodiments of the present systems and methods, not only do multiple entities (e.g., the camera assemblies 1024) and the corresponding data (e.g., the raw video streams 208) that those entities process (e.g., receive, generate, modify, transmit, and/or the like) operate according to (or at least reflect) a shared frame rate, they do so in a time-synchronized manner.

Of course certain corrections and synchronization steps may be taken in various embodiments using hardware, firmware, and/or software to achieve or at least very closely approach time-synchronized operation, but the point is this: not only does a given frame x (e.g., the frame having sequence number x, frame number x, timestamp x, and/or other data x useful in synchronization of video frames with one another) in one data stream 208 have the same duration as frame x in each of the other corresponding data streams 208, but each frame x would start and therefore end at the same time, at least within an acceptable margin of error that may differ among various implementations.

In at least one embodiment, the shared frame rate is 120 frames per second (fps), which would make the shared-frame-rate period $\frac{1}{120}$ of a second (8⅓ ms). In at least one embodiment, the shared frame rate is 240 fps, which would make the shared-frame-rate period $\frac{1}{240}$ of a second (4⅙ ms). In at least one embodiment, the shared frame rate is 300 fps, which would make the shared-frame-rate period $\frac{1}{300}$ of a second (3⅓ ms). In at least one embodiment, the shared frame rate is 55 fps, which would make the shared-frame-rate period $\frac{1}{55}$ of a second (18 2/11 ms). And certainly other frame rates and corresponding periods could be used in various different embodiments, as deemed suitable by those of skill in the art for a given implementation.

Further, as described above, each of the video cameras 1102 has a known vantage point in a predetermined coordinate system, in this case the predetermined coordinate axes 1040. In particular, as explained above, the known vantage point of the video camera 1102 of the camera assembly 1024L is at their common front centroid 1080, oriented towards the 3D-space point 1070; the known vantage point of the video camera 1102 of the camera assembly 1024C is at their common front centroid 1082, also oriented towards the 3D-space point 1070; and the known vantage point of the video camera 1102 of the camera assembly 1024R is at their common front centroid 1084, also oriented towards the 3D-space point 1070. As explained, all of the points 1070, 1080, 1082, and 1084 are in the predetermined coordinate system 1040. Due to their co-location and static arrangement during operation, the various front centroids 1080, 1082, and 1084 are referred to at times in this written description as the vantage points 1080, 1082, and 1084, respectively.

3. Generation of 3D Mesh of Subject a. Receipt of Depth Images from Camera Assemblies At step 1604, PSS 202 obtains 3D meshes of the presenter 102 at the shared frame rate, and such 3D meshes are time-synchronized with the video frames of each of the 3 raw video streams 208 such that 3D mesh x is time-synchronized with frame x in each raw video stream 208. PSS 202 obtains or generates at least one 3D mesh of the presenter 102. In one embodiment, PSS at least one pre-existing mesh is available to PSS 202.

Although PSS 202 could carry out step 1604 in a number of different ways, examples of which are described herein, in this particular example, step 1604 includes PSS 202, receiving from the camera assemblies 1024, depth-data streams 210 made up of depth images generated by the respective camera assemblies 1024.

In this example, those depth images are generated by the camera assemblies 1024 in the following manner: each camera assembly 1024 uses its respective IR illuminator 1106 to project a non-repeating, pseudorandom temporally static pattern of IR light on to the presenter 102 and further uses its respective IR cameras 1104L and 1104R to gather two different reflections of that pattern (reflections of that pattern from two different vantage points—e.g., the front centroids 1124L and 1124R of the camera assembly 1024L) off of the presenter 102. Each camera assembly 1024 conducts hardware-based stereoscopic analysis to determine a depth value for each pixel location in the corresponding depth image, where such pixel locations in at least one embodiment correspond on a one-to-one basis with color pixels in the video frames in the corresponding raw video stream 208 from the same camera assembly 1024. The non-repeating nature of the IR pattern could be globally non-repeating or locally non-repeating to various extents in various different embodiments.

Thus, in at least one embodiment, when carrying out step 1604, PSS 202 receives a depth image from each camera assembly 1024 for each shared-frame-rate time period. This provides PSS 202 with, in this example, three depth images of the presenter 102 for each frame (e.g., for each shared-frame-rate time period). In at least one embodiment, each of those depth images will be made up of depth values (e.g., depth pixels) that each represent a distance from the respective vantage point of the camera assembly from which the corresponding depth frame was received.

b. Projection of Received Depth Images Onto Shared Geometry in Construction of Single 3D-Point Cloud of Subject PSS 202 can use the known location of the vantage point of that camera assembly 1024 in the predetermined coordinate system 1040 to convert each such distance to a point (having a 3D-space location) in that shared geometry 1040. (Note that "the axes 1040," "the coordinate axes 1040," "the predetermined coordinate system 1040," "the shared geometry 1040," and the like are all used interchangeably herein.) PSS 202 then combines all such identified points into a single 3D-point cloud that is representative of the subject (e.g., the presenter 102).

In at least one embodiment, and using the camera assembly 1024C by way of example, to convert (i) a measured distance from the vantage point of the camera assembly 1024L as reflected in a depth-pixel value of a depth pixel in a depth frame that is received by PSS 202 from the camera assembly 1024C into (ii) a 3D point location in the shared geometry 1040, PSS 202 may carry out a series of calculations, transformations, and the like. An example of such processing is described in the ensuing paragraphs in connection with FIGS. 17-19.

Figure 17:
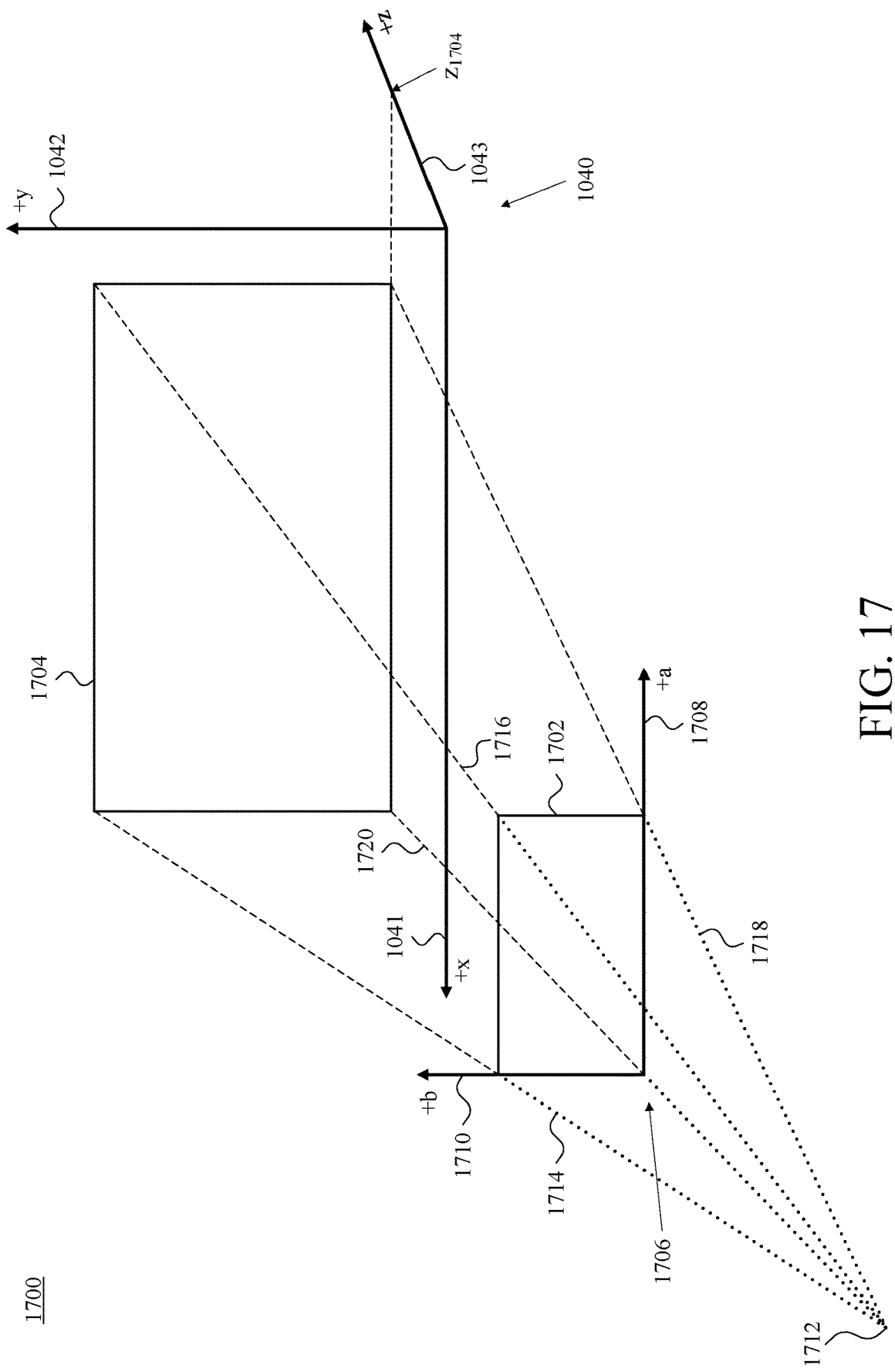
FIG. 17 is a perspective diagram depicting a view of a first example projection from a focal point of an example one of the camera assemblies of FIG. 10A through the four corners of a two-dimensional (2D) pixel array of the example camera assembly on to the reference set of cartesian-coordinate axes of FIG. 10B, in accordance with at least one embodiment.

FIG. 17 is a perspective diagram depicting a view 1700 of a first example projection from a focal point 1712 of the camera assembly 1024C (as an example one of the camera assemblies 1024) through the four corners of a 2D pixel array 1702 of the example camera assembly 1024C on to the shared geometry 1040, in accordance with at least one embodiment. As to the type of processing in general that is described here, the focal point 1712 and the pixel array 1702 could correspond to one of three different vantage points on the camera assembly 1024C, namely (i) the vantage point 1124L of the IR camera 1104L of the camera assembly 1024C, (ii) the vantage point 1124R of the IR camera 1104R of the camera assembly 1024C, or (iii) the vantage point 1082 of the virtual depth camera 1144C—and of the RGB camera 1102—of the camera assembly 1024C. Note that the focal point 1712 is different from the vantage point in all these cases, but they are optically associated with one another as known in the art.

In this example description, PSS 202 conducts processing on depth frames received in the depth-data stream 210C from the camera assembly 1024C. In one example, focal point 1712 and the pixel array 1702 are associated with the third option outlined in the preceding paragraph—the focal point 1712 and the pixel array 1702 are associated with the vantage point 1082 of the virtual depth camera 1144C—and of the RGB camera 1102—of the camera assembly 1024C.

Referring to FIG. 17, the pixel array 1702 is framed on its bottom and left edges by a 2D set of coordinate axes 1706 that includes a horizontal a-axis 1708 and a vertical b-axis 1710. Emanating from the focal point 1712 through the top-left corner of the pixel array 1702 is a ray 1714, which continues on and projects to the top-left corner of an xy-plane 1704 in the shared geometry 1040. For the convenience of the reader, the ray 1714 is depicted as a dotted line between the focal point 1712 and its crossing of the (ab) plane of the pixel array 1702 and is depicted as a dashed line between the plane of the pixel array 1702 and the xy-plane 1704. This convention is used to show the crossing point of a given ray with respect to the plane of the pixel array 1702, and is followed with respect to the other three rays 1716, 1718, and 1720 in FIG. 17, and with respect to the rays that are shown in FIGS. 18 and 19 as well.

Figure 18:
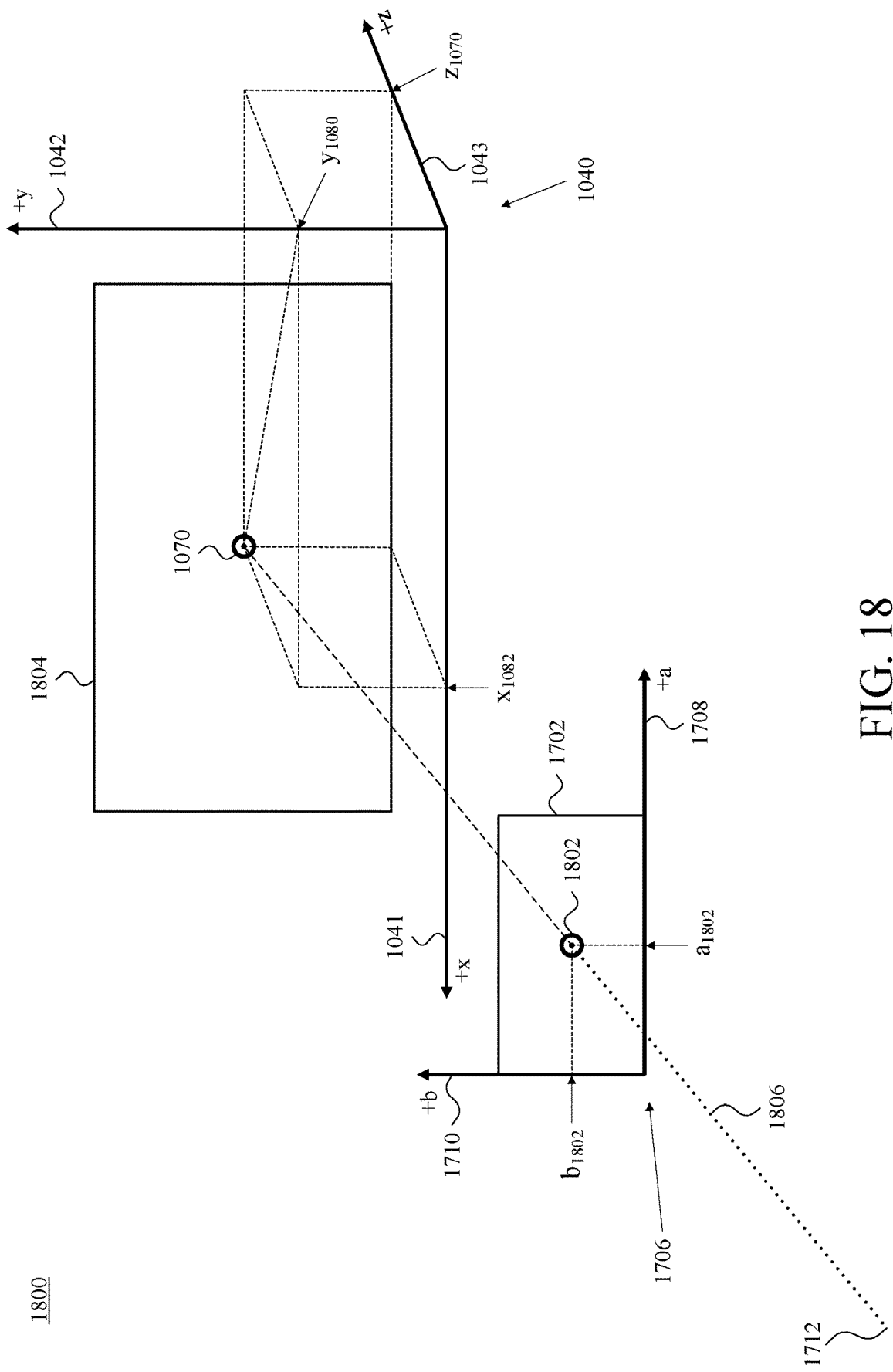
FIG. 18 is a perspective diagram depicting a view of a second example projection from the focal point of FIG. 17 through the centroid of the 2D pixel array of FIG. 17 on to the reference set of cartesian-coordinate axes of FIG. 10B, in accordance with at least one embodiment.
Figure 19:
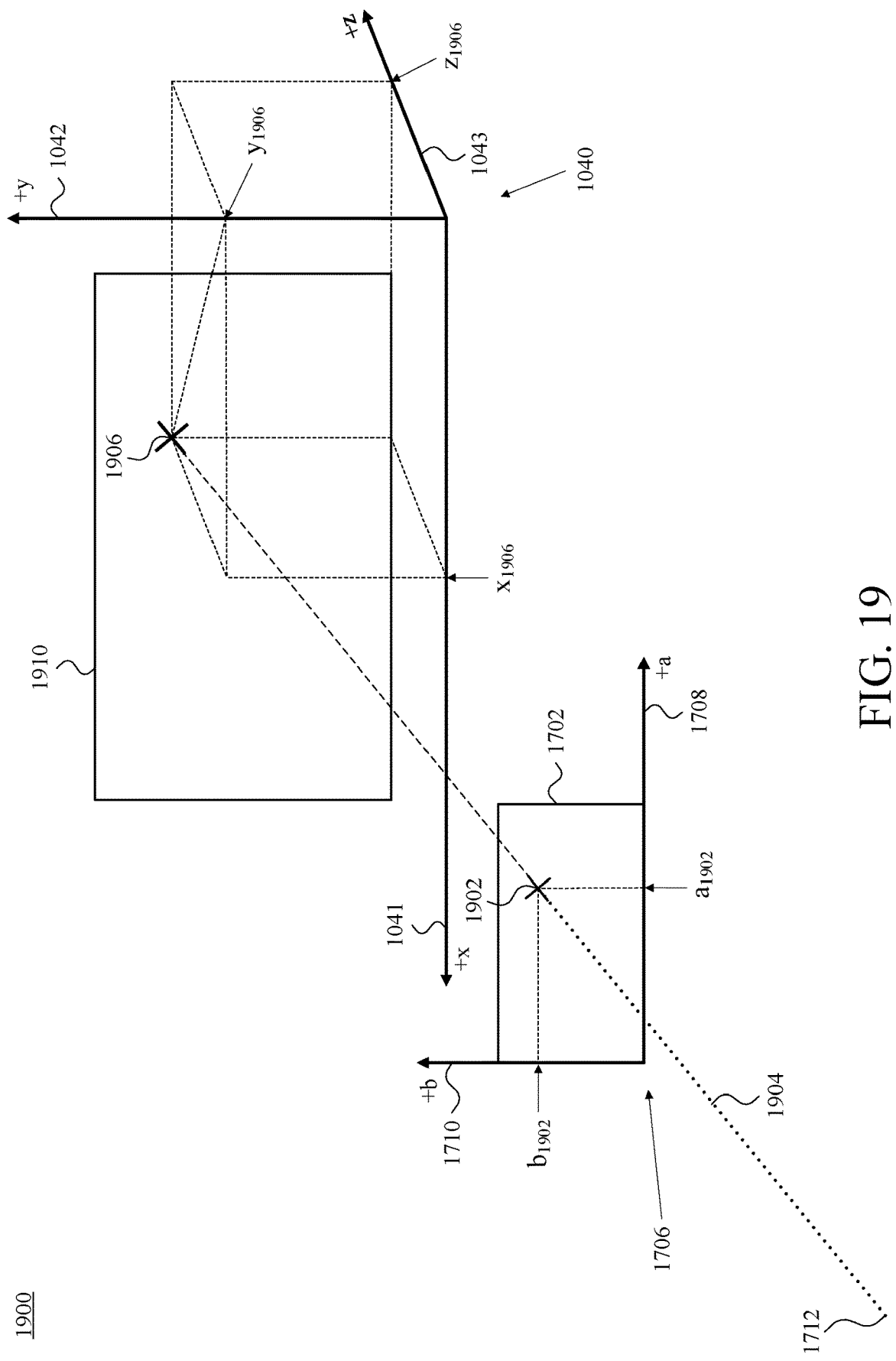
FIG. 19 is a perspective diagram depicting a view of a third example projection from the focal point of FIG. 17 through an example pixel in the 2D pixel array of FIG. 17 on to the reference set of cartesian-coordinate axes of FIG. 10B, in accordance with at least one embodiment.

The xy-plane 1704 sits at the positive depth $z_{1704}$ in the shared geometry 1040; as the reader can see, the view in FIGS. 17-19 of the shared geometry 1040 is from the perspective of the camera assembly 1024C, and thus is rotated 180° around the y-axis 1042 as compared with the view that is presented in FIG. 10B and others. Also emanating from the focal point 1712 are (i) a ray 1716, which passes through the top-right corner of the pixel array 1702 and projects to the top-right corner of the xy-plane 1704, (ii) a ray 1718, which passes through the bottom-right corner of the pixel array 1702 and projects to the bottom-right corner of the xy-plane 1704, and (iii) a ray 1720, which passes through the bottom-left corner of the pixel array 1702 and projects to the bottom-left corner of the xy-plane 1704.

Thus, the view 1700 of FIG. 17 illustrates—as a general matter and in at least one example arrangement—the interrelation (for a given camera or virtual camera) of the focal point 1712 (which could pertain to color pixels and/or depth pixels), the 2D pixel array 1702 (of color pixels or depth pixels, or combined color-and-depth pixels, as the case may be, and the projection from the focal point 1712 via that 2D pixel array 1702 on to a shared 3D real-world geometry.

The xy-plane 1704 is included in this disclosure to show the scale and projection relationships between the 2D pixel array 1702 and the 3D shared geometry 1040. A subject—such as the presenter 102—would not need to be situated perfectly in the xy-plane 1704 to be seen by the camera assembly 1024C; rather, the xy-plane 1704 is presented to show that a point that is detected to be at the depth $z_{1704}$ could be thought of as sitting in a 2D plane 1704 in the real world that corresponds to some extent with the 2D pixel array 1702 of the camera assembly 1024C. The depicted xy-plane 1704 (and other types of planes) could have been depicted in FIG. 17. In shared geometry 1040, every point in the shared geometry has a z-value and resides in a particular xy-plane (at a particular x-coordinate and y-coordinate on that particular xy-plane).

FIG. 18 is a perspective diagram depicting a view 1800 of a second example projection from the focal point 1712 (of the virtual depth camera 1144L of the camera assembly 1024C) through a pixel-array centroid 1802 of the 2D pixel array 1702 (of the virtual depth camera 1144L) on to the shared geometry 1040, in accordance with at least one embodiment. As mentioned herein, the virtual depth camera 1144C of the camera assembly 1024C has a front centroid 1082 having coordinates $xyz_{1040}::\{x_{1082}, y_{1080}, 0\}$. In this described example, the pixel-array centroid 1802 of the 2D pixel array 1702 corresponds with the front centroid 1082 of the camera assembly 1024C. The pixel array 1702 may have an even number of pixels in each row and column, and may therefore not have a true center pixel, so the pixel-array centroid 1802 may or may not represent a particular pixel.

Many aspects of FIG. 18 are common or at least similar to FIG. 17, though some aspects of FIG. 17 have been removed for clarity: for example, FIG. 18 does not explicitly depict rays emanating from the focal point 1712 and touching each of the four corners of the pixel array 1702. FIG. 18 includes a ray 1806 that emanates from the focal point 1712, passes through the pixel-array centroid 1802, and projects to the above-mentioned 3D point 1070, which is pictured in FIG. 18 as residing in an xy-plane 1804, which itself is situated at a positive-z depth of $z_{1070}$, a value that is shown in FIG. 10C as well. FIGS. 10C and 18 illustrate that the 3D point 1070 has coordinates $xyz_{1040}::\{x_{1082}, y_{1080}, z_{1070}\}$. The depth $z_{1704}$ that is depicted in FIG. 17 may or may not be the same as the depth $z_{1070}$ that is depicted in FIG. 18.

FIG. 18 illustrates that the pixel-array centroid 1802 has coordinates $\{a_{1802}, b_{1802}\}$ in the coordinate system 1706 associated with the pixel array 1702. In at least one embodiment, the ab-coordinate system 1706 corresponds with the ab-plane at c=0 of the camera-assembly-specific coordinate system 1094C as shown in FIG. 10D. The $\{a=0, b=0\}$ point in the coordinate system 1094C is anchored at the front centroid 1082; pixel-array centroid 1802 is not at the $\{a=0, b=0\}$ point of the ab-coordinate system 1706 of the pixel array 1702, illustrating the point that an a-shift-and-b-shift transform could be needed between the two coordinate systems in some embodiments (and perhaps a c-shift transform in others). In some embodiments, the camera-assembly-specific coordinate system 1094C is selected such that the a-axis is along the bottom edge and the b-axis is along the left edge of the virtual depth camera 1144C. And certainly many other example arrangements could be used as well.

In embodiments in which the pixel-array centroid 1802 corresponds to an actual pixel in the pixel array 1702, PSS 202 could determine the 3D coordinates of the point 1070 in the shared geometry 1040 from (i) a depth-pixel value for the pixel-centroid 1802 (in which the depth-pixel value is received in an embodiment by PSS 202 from the camera assembly 1024C), (ii) data reflecting the fixed physical relationship between the camera assembly 1024C and the shared geometry 1040, and (iii) data reflecting the relationship between the focal point 1712, the pixel array 1702, and other relevant inherent characteristics of the camera assembly 1024. The second and third of those three categories of data are referred to as the "extrinsics" and the "intrinsics," respectively, of the camera assembly 1024C. These terms are further described herein.

In the particular arrangement that is depicted in FIG. 18, a single line can be drawn that intersects the focal point 1712, the pixel-array centroid 1802, and the point 1070 in the shared geometry 1040; for any pixel location in the pixel array 1702 other than the pixel-array centroid 1802, however, there would be a relevant angle between (i) the ray 1806 that is depicted in FIG. 18 and (ii) a ray emanating from the focal point 1712, passing through that other pixel location, and projecting somewhere other than the point 1070 in the shared geometry 1040. That angle would be relevant in determining the coordinates in the shared geometry 1040 of that other point. Such an example is depicted in FIG. 19, in fact, which is a perspective diagram depicting a view 1900 of a third example projection from the focal point 1712 (of the virtual depth camera 1144C of the camera assembly 1024C) through an example pixel 1902 (also referred to herein at times as "the pixel location 1902") in the 2D pixel array 1702 on to the shared geometry 1040, in accordance with at least one embodiment.

As can be seen in FIG. 19, the pixel 1902 has coordinates $\{a_{1902}, b_{1902}\}$ in the ab-coordinate system 1706 of the pixel array 1702. Ray 1904 emanating from the focal point 1712, passes through the plane of the pixel array 1702 at the pixel location of the pixel 1902, and projects on to a point 1906 in the shared geometry 1040. The point 1906 is shown by way of example as residing in an xy-plane 1910 in the shared geometry 1040, where the xy-plane 1910 itself resides at a positive depth $z_{1906}$. As such, it can be seen by inspection of FIG. 19 that the example 3D point 1906 has coordinates $xyz_{1040}::\{x_{1906}, y_{1906}, z_{1906}\}$.

Unlike a potentially known focal point such as the 3D point 1070 that is described above, PSS 202 in at least one embodiment has no prior knowledge of what $x_{1906}$, $y_{1906}$, or $z_{1906}$ might be. Rather, as will be evident to those of skill in the art having the benefit of this disclosure, PSS 202 will receive from the camera assembly 1024C a depth value for the pixel 1902, and derive the coordinates C of the 3D point 1906 from (i) that received depth value, (ii) the extrinsics of the camera assembly 1024C, and (iii) the intrinsics of the camera assembly 1024C. In at least one embodiment, this geometric calculation takes into account an angle between the ray 1806 of FIG. 18 (as a reference ray) and the ray 1906 of FIG. 19. PSS 202 can determine this angle in realtime, or be pre-provisioned with respective angles for each respective pixel location (or perhaps a subset of the pixel locations) in the pixel array 1702. And certainly other approaches could be listed here as well.

Geometric relationships that are depicted in FIGS. 17-19, as well as the associated mathematical calculations, are useful for determining 3D coordinates in the shared geometry based on depth-pixel values received from the camera assemblies 1024. Certainly this geometry and related mathematics are useful for that, but they are also useful for determining which pixel location in a 2D pixel array such as the pixel array 1702 projects to an already known location in the shared geometry 1040. This calculation is useful for determining which pixel in a color image (e.g., a video frame) projects on to a known (e.g., already determined) location of a vertex in a 3D mesh.

In other words, given a vertex in the 3D space of the predetermined coordinate system 1040, the geometry and mathematics depicted in—and described in connection with—FIGS. 17-19 are used by PSS 202 to determine which pixel location (and therefore which pixel and therefore which color (and brightness, and the like)) in a given 2D video frame projects on to that vertex. This latter type of calculation can be carried out on the receiver side (e.g., by a rendering device such as HMD 112), in at least one embodiment, the color information (e.g., the encoded video streams 218) is transmitted from PSS 202 to HMD 112 separately from the geometric information (pertaining to the 3D mesh of the subject, e.g., the geometric-data stream 220LCR), and it is the task of the rendering device to integrate the color information with the geometric information in rendering the viewpoint-adaptive 3D persona 116 of the presenter 102.

c. Mesh Extraction from 3D-Point Cloud i. Introduction

Returning to the description of 3D-mesh generation (e.g., step 1604 of the method 1600), in at least one embodiment, PSS 202 combines all of the 3D points from all three received depth images into a single 3D point cloud, which PSS 202 then integrates into what is known in the art as a "voxel grid," from which PSS 202 extracts—by way of a number of iterative processing steps—what is known as and referred to herein as a 3D mesh of the subject (e.g., the presenter 102).

In the present disclosure, a 3D mesh of a subject is a data model (e.g., a collection of particular data arranged in a particular way) of all or part of the surface of that subject. The 3D-space points that make up the 3D mesh such as the 3D-space points that survive and/or are identified by the herein-described mesh-generation processes (e.g., step 1604)—are referred to interchangeably as "vertices," "mesh vertices," and the like. A term of art for the herein-described 3D-mesh-generation processes is "multi-camera 3D reconstruction."

As a relatively early step in at least one embodiment of the herein-described 3D-mesh-generation processing, PSS 202 uses one or more known techniques—e.g., relative locations, clustering, eliminating outliers, and/or the like—to eliminate points from the point cloud that are relatively easily determined to not be part of the presenter 102. In at least one embodiment, the exclusion of non-presenter points is left to the below-described Truncated Signed Distance Function (TSDF) processing. Other approaches may be used as well.

ii. Identification of Mesh Vertices Using Truncated Signed Distance Function (TSDF) Processing Among the remaining points, PSS 202 may carry out further processing to identify and eliminate points that are non-surface (e.g., internal) points of the presenter 102, and perhaps also to identify and eliminate at least some points that are not part of (e.g., external to) the presenter 102. In at least one embodiment, PSS 202 identifies surface points (e.g., vertices) of the presenter 102 using what is known in the art as TSDF processing, which involves a comparison of what is referred to herein as a current-data TSDF volume to what is referred to herein as a reference TSDF volume. The result of that comparison is the set of vertices of the current 3D mesh of the presenter 102.

The reference TSDF volume is a set of contiguous 3D spaces in the shared geometry 1040. Those 3D spaces are referred to herein as reference voxels, and each has a reference-voxel centroid having a known location—referred to herein as a "reference-voxel-centroid location"—in the shared geometry 1040. The current-data TSDF volume is made up of (e.g., reflects) actual measured 3D-data points corresponding to the current frame, and in particular typically includes a respective 3D-data point located (somewhere) within each of the reference voxels of the reference TSDF volume. Each such 3D-data point also has a known 3D-data-point location in the shared geometry 1040.

Thus, one computation that can be done in advance (or in realtime) is to compute a respective reference distance between (i) the vantage point of the corresponding camera and (ii) the known reference-voxel-centroid location of each reference-voxel centroid. In the case of the camera assembly 1024L, that vantage point is the above-identified front centroid 1080. During the realtime TSDF processing, PSS 202 further computes a respective actual distance between (i) the vantage point of the corresponding camera and (ii) the 3D-data point that is located within each reference voxel.

For each respective reference voxel, PSS 202 in at least one embodiment next computes the difference between (i) the reference distance (between the camera vantage point and the reference-voxel centroid) of that particular reference voxel and (ii) the actual distance (between the camera vantage point and the 3D-data point located within the bounds of) that particular reference voxel. Thus, for a given reference voxel i, a difference $\Delta_i$ is given by:

$$\Delta_i = \text{ReferenceDistance}_i - \text{ActualDistance}_i \quad \text{(Eq. 1)}$$

Next, in at least one embodiment, for each respective reference voxel i, PSS 202 computes the quotient (referred to herein as the "TSDF value") of (i) the computed $\Delta_i$ for that reference voxel and (ii) a truncation threshold $T_{trunc}$ that is common to each such division calculation in a given instance of carrying out TSDF processing. Thus, for a given reference voxel i, the TSDF value $TSDF_i$ is given by:

$$TSDF_i = \frac{\Delta_i}{T_{trunc}} \quad \text{(Eq. 2)}$$

Next, in at least one embodiment, for each respective reference voxel i, PSS 202 carries out computation to compare the various $TSDF_i$ values with various TSDF thresholds (detailed just below) and further stores data and/or deletes (e.g., removes from a list or other array or structure) data reflecting that:
  (i) each reference voxel i that has a sufficiently positive $TSDF_i$ (e.g., a $TSDF_i$ that is greater than a positive TSDF threshold) is considered to be a reference voxel that does not include a 3D-data point that is any part of the presenter 102 at all;
  (ii) each reference voxel i that has a sufficiently negative $TSDF_i$ (e.g., a $TSDF_i$ that is less than a negative $TSDF_i$ threshold) is considered to be a reference voxel that includes a respective 3D-data point that is internal to (e.g., part of but not on any surface of) the presenter 102; and
  (iii) each of the remaining reference voxels i (e.g., those with a $TSDF_i$ that is between the above-mentioned positive and negative TSDF thresholds) is considered to be what is referred to herein as a "surface-candidate voxel"—which is also referred to by those of skill in the art as an "active voxel," defined herein as a reference voxel that includes a 3D-data point that is on or at least sufficiently near a surface of the presenter 102.

In at least one embodiment, PSS 202 then continues the TSDF processing by identifying instances of adjoining surface-candidate reference voxels for which it is the case that (i) one of the adjoining surface-candidate reference voxels has a positive TSDF value and (ii) the other of the adjoining surface-candidate reference voxels has a negative TSDF value. In other words, PSS 202 looks to identify transitions from positive TSDF values to negative TSDF values, the so-called "zero crossings."

PSS 202 then "cuts" the 3D-point cloud along the best approximation of those transition points that the TSDF processing has identified, and in so doing marks a subset of 3D-data points from those contained in the identified set of surface-candidate reference voxels to be considered vertices of the 3D mesh that is being generated. In carrying out this function, in at least one embodiment, for each such pair of adjoining reference voxels, PSS 202 selects (as a vertex of the mesh) either the 3D-data point from the surface-candidate reference voxel that has the positive TSDF value or the 3D-data point from the surface-candidate reference voxel that has the negative TSDF value. In at least one embodiment, PSS 202 selects the 3D-data point from whichever of those two surface-candidate reference voxels has an associated TSDF value that is closer to zero (e.g., that has a lower absolute value). In at least one embodiment, one or more additional iterations of the above-described TSDF processing are carried out using progressively smaller reference-voxel volumes, thereby increasing the precision and accuracy of the TSDF-processing result.

At this point in the carrying out of step 1604, then, PSS 202 has identified a set of points in the shared geometry 1040 that PSS 202 has determined to be vertices of the 3D mesh that PSS 202 is generating of the presenter 102. The usefulness of the reference voxels, reference-voxel centroids, and the like has now been exhausted in this particular carrying out of step 1604, and such constructs are not needed and therefore not used until the next time PSS 202 carries out step 1604, which will, however, be quite soon (albeit during the next frame).

iii. Identification of Connected Vertices (Triangularization)

After having used TSDF processing to identify the vertices, PSS 202 in at least one embodiment then identifies pairs of vertices that are neighboring points on a common surface of the presenter 102, and stores data that associates these points with one another, essentially storing data that "draws" of a virtual line connecting such vertices with one another. To identify connected vertices, PSS 202 may use an algorithm such as "marching cubes" (as is known to those of skill in the art) or another suitable approach.

By virtue of basic geometry, many groups of three of these lines will form triangles—e.g., the stored data will reflect that they form triangles—that together approximate the surface of the presenter 102. As such, carrying out the marching-cubes (or an alternative connected-vertices-identifying) algorithm is referred to herein at times as "triangularizing" the vertices. The smoothness of that approximation depends in large part on the density of triangles in the data model as a whole, though this density can vary from portion to portion of a given 3D mesh of a given subject such as the presenter 102, perhaps using a higher triangle density in areas such as the face and hands of the presenter 102 than is used for areas such as the torso of the presenter 102, as but one example. In any event, then, a 3D mesh of a subject such as the presenter 102 can be modeled as a collection of these triangles, where each such triangle is defined by a unique set of three mesh vertices.

In at least one embodiment, each vertex is represented by a vertex data object—named "meshVertex" by way of example in this written description—that includes the location of that particular vertex in the shared geometry 1040. In some embodiments, a vertex data object also includes connection information to one or more other vertices. In some embodiments, connected-vertices information is maintained external to the vertex data objects, perhaps in a "meshTriangle" data object that includes three meshVertex objects, or perhaps in a minimum-four-column array where each row corresponds to a triangle and includes a triangle identifier and three meshVertex objects. And certainly innumerable other possible example data architectures could be listed here.

If a given mesh comprehensively reflects all (or at least substantially all) of the surfaces of a given subject from every (or at least substantially every) angle, such that a true 360° experience could be provided, such a mesh is referred to in the art and herein as a "manifold" mesh. Any mesh that does not meet this standard of comprehensiveness is known as a "non-manifold" mesh.

Whether manifold or non-manifold, a 3D mesh of a subject in at least one embodiment is a collection of data (e.g., a data model) that (i) includes (e.g., includes data indicative of, defining, conveying, containing, and/or the like) a list of vertices and (ii) indicates which vertices are connected to which other vertices; in other words, a 3D mesh of a subject in at least one embodiment is essentially data that defines a 3D surface at least in part by defining a set of triangles in 3D space by virtue of defining a set of mesh vertices and the interconnections among those mesh vertices. And certainly other manners of organizing data defining a 3D surface could be used as well or instead.

iv. Mesh Tuning

A. Introduction

The above description of 3D-mesh generation (e.g., step 1604 of the method 1600) is essentially a frame-independent, standalone method for generating a brand-new, fresh mesh for every frame. In some embodiments, that is what happens—e.g., step 1604 is complete for that frame. In other embodiments, however, the 3D mesh that step 1604 generates is not quite ready yet, and one or more of what are referred to in this disclosure as mesh-tuning processes are carried out, and it is the result of the one or more mesh-tuning processes that are carried out in a given embodiment that is the 3D mesh that is generated in step 1604.

Such embodiments, including those in which one or more mesh-tuning processes are carried out prior to step 1604 being considered complete for a given frame, are referred to herein at times as "mesh-tuning embodiments." Moreover, in various different mesh-tuning embodiments, various combinations of mesh-tuning processes are permuted into various different orders.

B. Mesh Modification Using a Reference Mesh

In one or more mesh-tuning embodiments, at least part of a current mesh is compared to a pre-stored reference mesh models that reflect standard shape meshes, such as facial models, hand models, etc. Such reference models may also include pre-identified features, or feature vertices, such as finger joints, palms, and other geometries for a hand model, and lip shape, eye shape, nose shapes, etc., for a face model. One or more modifications of at least part of the current mesh in light of that comparison result in a more accurate, realistic representation of a user or chosen facial features.

More specifically, in accordance with an embodiment, cameras with a lower level of detail can be used for full body 3D mesh generation by creating a hybrid mesh that uses a model to replace portions of the full body 3D mesh through using specific feature measurements, such as face feature measurements (or hand feature measurements) and comparing the measured feature vertices to the reference feature vertices, and then combining the reference model with the existing data mesh to generate a more accurate representation. Thus, low-detail depth cameras, with lower resolution are capable of being used to generate higher resolution details of facial features when combined with statistically-generated models based on known measurements.

For example, in one embodiment, rather than relying on specific facial measurements of a specific user obtained from a depth camera (DC), a pre-existing approximation model is altered using a video image of the specific user. Image analysis may be performed to identify a user's facial characteristics such as eye shape, spacing, nose shape and width, width of face, ear location and size, etc. These measurements from the video image may be used to adjust the reference model to make it more closely match the specific user. In some embodiments, an initial model calibration procedure may be performed by instructing the user to face directly at a video camera to enable the system to capture a front view of the user. The system may also capture a profile view to capture additional geometric measurements of the user's face (e.g., nose length). This calibrated reference model can be used to replace portions of a user's mesh generated from a depth camera, such as the face. Thus, instead of trying to get more detailed facial depth measurements, a detailed reference model of the face is adapted to more closely conform to the user's appearance.

Thus, in one embodiment a set of vertices can be based on a high-resolution face model, and combined with lower resolution body mesh vertices, thereby forming a hybrid mesh.

FIG. 16B is a flowchart of an exemplary method 1611, in accordance with at least one embodiment for replacing a facial component of a 3D mesh of a subject with a facial-mesh model. Like the method 1600 shown in FIG. 16A, the method 1611 could be carried out by any number of different entities—or a combination of multiple entities or components. Thus, VDCs 106, PSS 202, PSS 502 and processors, memories and computer system components illustrated in FIG. 6 could carry out the method 1611, as will be appreciated by those of skill in the art.

Furthermore, the below description of the method 1611 is given with respect to other elements that are also in the drawings, though this again is for clarity of presentation and by way of example, and in no way implies limitation. Each step 1612-1622 is described in a way that refers by way of example to various elements in the drawings of the present disclosure.

Figure 16C:
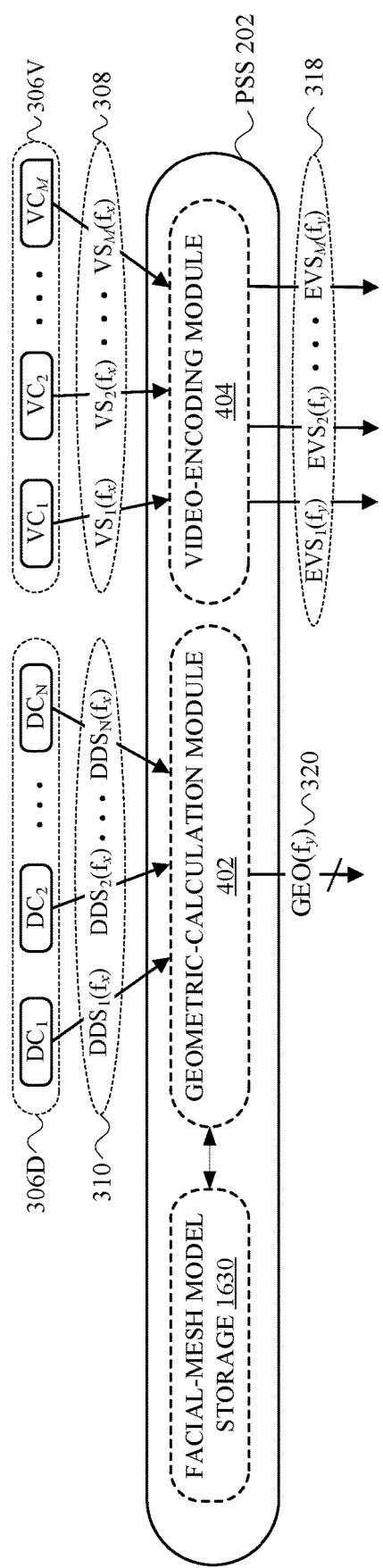
FIG. 16C is a second example functional-module-specific I/O-characteristic block diagram of the PSS of FIG. 2, in accordance with at least one embodiment.

Referring now to FIG. 16B in combination with FIG. 16C, step 1612 provides for obtaining a 3D mesh of a subject. For example, the obtained 3D mesh can be generated from depth-camera-captured information about the subject. In one embodiment the obtaining the 3D mesh of the subject includes generating the 3D mesh of the subject from depth-camera-captured information about the subject via one or more camera assemblies arranged to collect visible-light-image and depth-image data. As shown in FIG. 2, PSS 202 is shown coupled to set of example VDCs 206, which are capable of collecting data to enable generating a 3D mesh. Also, in FIG. 16D, several modules are shown that are capable of performing one or more of the steps shown in FIG. 16B, including geometric-calculation module 1642, which can calculate a 3D mesh from received data.

Step 1614 provides for obtaining a facial-mesh model. In one embodiment, the facial-mesh model can be obtained via facial-mesh model storage 1630 shown in FIG. 16C and in other embodiments, facial-mesh model can be retrieved from data storage 606 shown in FIG. 16D as facial-mesh model storage 1640. As one of skill in the art will appreciate, facial-mesh models can also be transmitted to communication interface 202 and provided as needed.

Step 1616 provides for locating a facial portion of the obtained 3D mesh of the subject. For example, as described above, a full body mesh of a presenter is created and identified portions of the full body mesh include a facial portion. Thus, PSS 202 included video-encoding module 404 and geometric-calculation module 402, can be equipped to identify portions of a full body mesh as facial or otherwise. Geometric-calculation module 1642 can also be equipped to identify portions of the full body mesh as will be appreciated can be located elsewhere within the system described.

Step 1618 provides for computing a geometric transform based on the facial portion and the facial-mesh model. In one embodiment, geometric transform module 1646 shown in FIG. 16D computes the geometric transform. The geometric transform can include one or more aggregated error differences between a plurality of feature points on the facial-mesh model and a plurality of corresponding feature points on the facial portion of the obtained 3D mesh. In one embodiment, the geometric transform is based on an affine transform, such as a rigid transform. More particularly, the geometric transform can rotate and translate a set of model feature points so that they align with located feature points (referred to as landmarks or landmark points) within the system mesh. The landmark data points can therefore be coarse noisy data as compared to the higher-resolution facial mesh data from the facial-mesh model. The landmarks can include one or more locations of facial features common to both the facial-mesh model and the facial portion. For example, facial features could include corners of eyes, locations related to a nose, lips and ears. As will be appreciated by one of skill in the art, areas of the face with corners or edge detail may be more likely to enable correspondence between model and facial portion.

In one embodiment, the computing the geometric transform can include identifying the feature points on the facial-mesh model and the corresponding feature points on the facial portion of the obtained 3D mesh by locating at least 6 feature points, or between 6 and 845 feature points. In one embodiment, a facial-mesh model can include up to 3000 feature points. In some embodiments, this may be characterized as an overdetermined set of equations (e.g., 25 or 50, or more, using points around the eyes, mouth, jawline) to determine a set of six unknowns (three rotation angles and three translations).

The geometric transform enables a best fit mapping for translation/scaling and rotation. One exemplary best-fit mapping could include a minimum-mean squared error (MMSE) type mapping. Well-known techniques of solving such a system of equations may be used, such as minimum mean-squared error metrics, and the like. Such solutions may be based on reducing or minimizing a set of errors, or an aggregate error metric, based on how closely the transformed model feature points align to the landmark points.

Step 1620 provides for generating a transformed facial-mesh model using the geometric transform. For example, PSS 202 as shown in FIG. 16C can generate the transformed facial-mesh model. Hybrid module 1648 shown in FIG. 16D, in one embodiment can be part of PSS 202 and generate the transformed facial-mesh model in combination with geometric transform module 1646.

Step 1622 provides for generating a hybrid mesh of the subject at least in part by combining the transformed facial-mesh model and at least a portion of the obtained 3D mesh. For example, in one embodiment, the obtained 3D mesh, minus the facial portion of the mesh is combined with the facial-mesh model to produce a hybrid mesh of both facial model and obtained 3D mesh. Thus, vertices in the original facial portion data mesh are replaced with the transformed face model.

In one embodiment generating the transformed facial-mesh model and generating the hybrid mesh is repeated periodically to remove accumulated error that could generate over time. Thus, rather than a frame-by-frame synchronization, the facial model is synchronized only periodically.

Figure 16D:
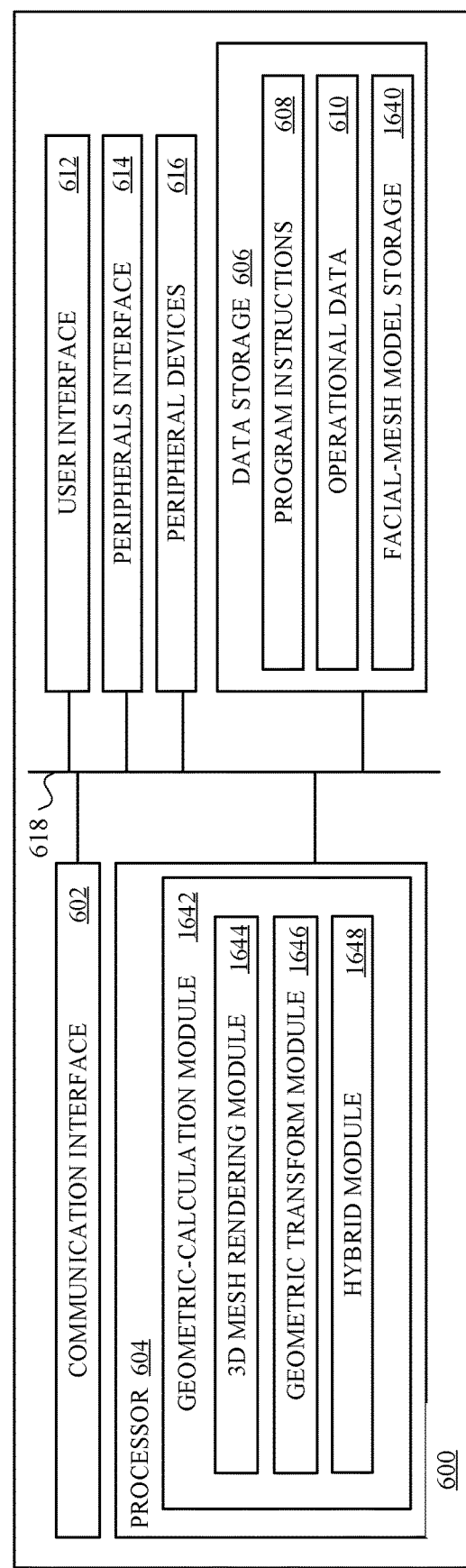
FIG. 16D is the hardware-architecture diagram of FIG. 6 further including a facial-mesh model storage, in accordance with at least one embodiment.

The final hybrid mesh can then be output via communication interface 602, or output to peripheral interface 614 as shown in FIG. 16D. In one embodiment, the hybrid mesh is sent for further processing to rendering device 112, shown in FIG. 2. Thus, in one embodiment the hybrid mesh can be a set of geometric-data streams and/or video streams that are time-synchronized streams sent to a receiver, such as rendering device 112 or other device.

One embodiment shown in FIGS. 16B, 16C and 16D in combination with other FIGs. herein described relates to systems for generating a hybrid mesh. More specifically, one embodiment shown in FIG. 16D relates to a system including a memory, such as data storage 606 including a data storage of one or more facial-mesh models 1640, each of the one or more facial-mesh models including high resolution geometric facial image data. The system further includes a processor 604 coupled to the memory, the processor 604 including a geometric-calculation module 1642. In one embodiment, geometric-calculation module 1642 includes a 3D mesh rendering module 1644 to receive data from one or more one or more camera assemblies arranged to collect visible-light-image and depth-image data and create a 3D mesh of a subject, the 3D mesh including a facial portion. The geometric-calculation module 1642 can further include a geometric transform module 1646 coupled to the 3D mesh rendering module 1644, the geometric transform module computing a geometric transform based on the facial portion and one of the facial-mesh models. In one embodiment, the geometric transform is determined in response to one or more aggregated error differences between a plurality of feature points on the facial-mesh model and a plurality of corresponding feature points on the facial portion, and the transform is then used to generate a transformed facial mesh model. The geometric-calculation module 1642 can further include a hybrid module 1648 coupled to the geometric transform module 1646, the hybrid module generating a hybrid mesh of the subject at least in part by combining the transformed facial-mesh model and at least a portion of the obtained 3D mesh. In one embodiment, the system can further include a transceiver, which can be communication interface 602 or other hardware capable of transmitting the hybrid mesh/facial model or the like as a set of geometric-data streams and video streams as time-synchronized data streams to a receiver.

In an alternate embodiment, a system includes at least one computer and a non-transitory computer readable medium having stored thereon one or more programs, which when executed by the at least one computer, cause the at least one computer to obtain a three-dimensional (3D) mesh of a subject, wherein the obtained 3D mesh is generated from depth-camera-captured information about the subject; obtain a facial-mesh model; locate a facial portion of the obtained 3D mesh of the subject; compute a geometric transform based on the facial portion and the facial-mesh model, the geometric transform determined in response to one or more aggregated error differences between a plurality of feature points on the facial-mesh model and a plurality of corresponding feature points on the facial portion of the obtained 3D mesh; generate a transformed facial-mesh model using the geometric transform; generate a hybrid mesh of the subject at least in part by combining the transformed facial-mesh model and at least a portion of the obtained 3D mesh; and output the hybrid mesh of the subject.

In one embodiment, once the hybrid mesh is created, a non-rigid deformation algorithm applies to determine deformation of the data driven system model. That is, the hybrid mesh can be moved as close as possible to current-frame depth-image data by using a non-rigid deformation, explained more fully below with respect to weighted deformations, below.

C. Weighted Deformation

One mesh-tuning process is referred to herein as "weighted deformation." In short, and stated generally, embodiments that involve fine-tuning a mesh using a weighted-deformation technique as described herein involve generating a current mesh in perhaps the manner described above, and then combining that current mesh with a "historical" mesh according to a weighting scheme. For example, then, the 3D mesh that step 1604 ultimately produces could be the result of a weighted-deformation technique that gives 90% weight to the historical mesh and 10% weight to the current mesh, where the historical mesh could be the mesh ultimately generated from the previous frame, since that mesh itself would also be a product of hysteresis-type historical weighting, a mathematical tool that is known in the engineering arts in general.

In at least one weighted-deformation mesh-tuning embodiment, PSS 202 does not simply compute a weighted average between the historical mesh and the current mesh, but instead carries out a process of actually deforming the historical mesh based at least in part on the current mesh. Thus, in some such embodiments, the historical mesh is considered to be a valid position for the presenter 102, and in the current frame that historical mesh is allowed to be deformed to better match the current mesh, but only in restricted ways that are programmed in advance as being valid amounts and/or types of human motion. Such motion restrictions in general tend to smooth out and reduce the amount of perceived jerkiness of motion of the 3D presenter persona 116.

One way to visualize this mesh deformation is that PSS 202 is deforming the historical (e.g., previous-frame) mesh to look more similar to the currently generated mesh (than the historical mesh looks prior to any such deformation). In deforming the historical mesh, the established connections among vertices (e.g., the triangles) stay connected as they are in modeling the surface of the subject in the historical mesh—they simply get "pulled along" in various ways that are determined by the current mesh in a process that is referred to in the art as "non-rigid deformation."

There is a process that is known in the art as "optical flow" that is a 2D analog to the 3D non-rigid deformation of the historical mesh based on the current mesh that is carried out in at least one embodiment of the present systems and methods. An example of an optical-flow algorithm is explained in Michael W. Tao, Jiamin Bai, Pushmeet Kohli, and Sylvain Paris.: "SimpleFlow: A Non-Iterative, Sublinear Optical Flow Algorithm". *Computer Graphics Forum (Eurographics* 2012), 31(2), May 2012, which is hereby incorporated herein by reference.

In some optical-flow implementations and in the mesh-deformation processes of some embodiments of the present methods and systems, historical data (such as the historical mesh) is moved as close as possible to the current data (such as the 3D mesh generated from current-frame depth-image data), and then an average (perhaps a weighted average) of the current data and the post-move historical data is computed. The result of this average is in some embodiments the 3D mesh that is generated by carrying out step 1604 of the method 1600. And certainly other implementations could be used as well.

As to how mathematically to model the distortion of a given historical mesh to more closely match a current mesh: in at least one embodiment, a substantial calculation known in the art as an energy-minimization problem is carried out. In at least one embodiment, this energy-minimization problem is carried out with respect to a subset of the vertices that are referred to herein as "nodes." In an embodiment, a meshVertex object has a Boolean value called something akin to "isNode," which is set to "True" if that meshVertex is a node and is otherwise set to "False." Clearly there is no end to the variety of ways in which such a toggleable mesh-vertex property could be implemented.

In an embodiment, the nodes of the historical mesh (the "historical-mesh nodes") are compared with the nodes of the current mesh (the "current-mesh nodes") to determine the extent to which the presenter 102 moved between the prior frame and the current frame. On one extreme, if the presenter 102 has not moved at all, the historical-mesh nodes would match the locations of the current-mesh nodes on a node-wise basis; in such a situation, the "energy" would be determined to be zero, and thus not minimizable any further; the minimization calculation would be complete, the historical-mesh nodes wouldn't need to be moved at all, and the historical mesh—or equivalently the current mesh—would become the step-1604-*generated* mesh for that frame, perhaps subject to one or more additional mesh-tuning processes.

If, however, there is some mismatch between the 3D locations (in the shared geometry 1040) of the historical-mesh nodes and the current-mesh nodes, the initial measured energy for that iteration of the energy-minimization problem would be non-zero (and more specifically, positive). The historical-mesh nodes would then be moved (within movement constraints such as those mentioned above) to more closely align with the current-mesh nodes. When any historical-mesh node is moved, the connectivity among the triangles and vertices of the historical mesh is maintained, such that the connected triangles, vertices, and as a general matter the mesh surface gets pulled along with the moved historical-mesh node.

Once all of the historical-mesh nodes have been moved as much as possible within the allowed constraints to more closely align with the current-mesh nodes, the energy has been minimized to the extent possible for that iteration, and the now-modified historical mesh becomes the step-1604-*generated* mesh for that frame, perhaps subject to one or more additional mesh-tuning processes. There is no reason in principle that every vertex couldn't be a node, though in most contexts the time and processing demands would make such an implementation intractable.

4. Identification of Respective Lists of Mesh Vertices that are Visible from the Vantage Point of Each Respective Camera Assembly After PSS 202 has carried out step 1604 for a given shared-frame-rate time period (e.g., for a given frame), in at least one embodiment PSS 202 next, at step 1606, calculates three (and more generally, M) visible-vertices lists, one for each of the camera assemblies 1024 from which PSS 202 is receiving a raw video stream 208. And viewed on a broader temporal scale, step 1606 can be characterized as PSS 202 calculating sets of M visible-vertices lists at the shared frame rate, where each such visible-vertices list is the respective subset of the vertices of the current mesh that is visible in the predetermined coordinate system 1040 from the vantage point of a respective different one of the M video cameras of the M camera assemblies.

In connection with step 1604 in FIG. 16A above, the phrase "current mesh" refers to the standalone mesh generated for a frame x based only on information that is current to that frame x without reference to any historical data. The mesh that results from the step 1604 is a generated mesh. For purposes of explaining step 1606 however, the current mesh means the mesh that was generated in step 1604 for the current frame. As described above, there are embodiments in which step 1604 does not involve the use of any historical data, and there are embodiments in which step 1604 does involve the use of historical data.

In connection with step 1606, for each frame, there is a set of data processing that gets carried out independently from the vantage point of each of the camera assemblies 1024. For simplicity of explanation, this set of data processing is explained by way of example below in connection with the vantage point 1082 of the camera assembly 1024C, though the reader should understand that this same processing could also carried out with respect to the vantage point 1080 of the camera assembly 1024L, and with respect to the vantage point 1084 of the camera assembly 1024R. This is true in connection with step 1604 as well, as the processing described in connection with that step for identifying vertices of the mesh is conducted from the vantage points of each of the camera assemblies 1024 as well, though in the case of step 1604, the processing produces a single data result—the mesh, whereas in the case of step 1606, the processing produces a respective different data result from the vantage point of each respective camera assembly 1024.

Step 1606 produces a visible-vertices list from the vantage point of each respective camera assembly 1024. As mentioned above, the specifics in at least one embodiment of generating a visible-vertices list is described below in connection with the vantage point 1082 of the camera assembly 1024C. The term "submesh" is also used herein interchangeably with "visible-vertices list;" a contiguous subset of the mesh vertices visible from a given vantage point can include a submesh of the 3D mesh of the subject (e.g., the presenter 102).

Step 1606—the identification of a visible-vertices list from a particular vantage point—can be done anywhere on the communication path between where the data is captured and where the data is rendered. In some embodiments, such as the method 1600, this processing is done by PSS 202. In other embodiments, this processing is done by the rendering device (e.g., HMD 112). Numerous other possible implementations with respect to which device or combination of devices carries out the visible-vertices-list-identification processing, as well as with respect to where on the above-mentioned communication path this processing occurs. Identifying a visible vertices list can be more of a sender-side function, as is the case with the method 1600, and gives an entity such as PSS 202 the opportunity to compress the visible-vertices lists prior to transmitting them to the rendering device. Some example embodiments of mesh compression—including visible-vertices-list compression (a.k.a. submesh compression)—are discussed below.

Identifying a visible-vertices list of a current mesh (again, the mesh ultimately generated by step 1604 in connection with the current frame) from the vantage point 1082 of the camera assembly 1024C, includes identifying which vertices of the current mesh are visible from the vantage point 1082 of the RGB camera 1102 of the camera assembly 1024C. Identifying can include modeling the virtual depth camera 1144C as being in exactly the same location in the shared geometry 1040—and therefore seeing exactly the same field of view—as the RGB camera 1102 of the camera assembly 1024C, consistent with the relationship between FIGS. 11B and 11C (although it is the camera assembly 1024L that is depicted by way of example there).

In at least one embodiment, PSS 202 then evaluates the current mesh from the vantage point of the virtual depth camera 1144C. Using a conceptual framework such as the one displayed and described in connection with FIGS. 17-19, PSS 202 may go pixel location by pixel location through a (virtual) 2D pixel array of the virtual depth camera 1144C. For each such pixel location, PSS 202 may conduct a "Z-delta" analysis to distinguish visible surfaces (and therefore visible vertices) of the current mesh from non-visible surfaces (and therefore non-visible vertices) of the current mesh from the vantage point 1082 of the virtual camera 1144C.

In conducting this Z-delta analysis for a given pixel location in the 2D pixel array of the virtual depth camera 1144C, PSS 202 may carry out operations that simulate drawing a ray that emanates from the focal point of the virtual depth camera 1144C and passes through the particular pixel location that is currently being evaluated. PSS 202 may next determine whether that ray intersects any of the vertices of the current mesh. If the answer is zero, no vertex is added to the visible-vertices list for that pixel location. If there is one, that vertex is added to the visible-vertices list for that pixel location. If there is more than one, the vertex with the lowest z-value (e.g., the vertex, among those intersected by that ray, that is closest to the vantage point 1082 of the virtual camera 1144C) is added to the visible-vertices list for that pixel location. As the reader might suppose, in some embodiments that operate by stepping in positive-z increments from the vantage point 1082 of the virtual camera 1144C and frequently evaluating whether a vertex has been intersected, one is enough and the algorithm can stop searching along that ray. And certainly other example implementations could be described here.

In at least one embodiment, the fact that a given vertex is visible from a given camera assembly is sufficient to warrant adding that vertex to the corresponding visible-vertices list. In other embodiments, however, each visible-vertices list from each respective vantage point is organized as a list of mesh triangles for which all three vertices are visible from the given vantage point. In such embodiments, vertices are only added to the corresponding visible-vertices lists in groups of three vertices that (i) form a triangle in the mesh and (ii) are all visible from the corresponding vantage point. A visible-vertices list that is organized by mesh triangles is referred to in this disclosure as a "visible-triangles list," and it should be understood that a visible-triangles list is a type of visible-vertices list. And certainly other example implementations could be listed here.

Whenever a given vertex is added to the visible-vertices list for the camera assembly 1024C (or any other camera assembly, though that is the one being used by way of example in this part of this written description) using an approach such as that described just above, PSS 202 knows which pixel location in the 2D pixel array of the virtual depth camera 1144C projects on to that particular vertex that is being added at that time, and therefore also knows which pixel location in the corresponding simultaneous video frame captured by the camera assembly 1024C projects on to that particular vertex (in embodiments in which the pixel locations of the virtual 2D pixel array of the virtual depth camera 1144C correspond on a one-to-one basis with the pixel locations of the actual 2D pixel array of the RGB camera 1102 of the camera assembly 1024C; if for some reason such an alignment is not present, a suitable conversion transform can be used to figure out which pixel location in the 2D pixel array of the RGB camera 1102 corresponds to a given pixel location in the virtual 2D pixel array of the virtual depth camera 1144C).

Thus, since PSS 202 knows which pixel location (the {a,b} coordinates in the 2D pixel array) corresponds to a given visible vertex, PSS 202 could convey this information to HMD 112 in the geometric-data stream 220LCR (or in another data stream), and in at least one embodiment PSS 202 does just that. PSS 202 need not, however, and in at least one embodiment does not convey this information to HMD 112 in the geometric-data stream 220LCR (or in any other data stream); in at least one embodiment, even though PSS 202 knows which pixel location maps on to a given vertex, PSS 202 elects to save bandwidth by not conveying this information to the rendering device, and instead leaves it to the rendering device to "reinvent the wheel" to some extent by figuring out for itself which pixel location maps to a given vertex in the mesh from a given vantage point.

The same is clearly true with the color information of the corresponding pixel location in the corresponding video frame. PSS 202 could determine that and send it along as well, but information identification, acquisition, manipulation, and transmission are not free, and in various different embodiments, explicit and purposeful choices are made to not send data even though such data is known or readily knowable by PSS 202, to incur savings in metrics such as required bandwidth and processing time and burden on the sender side.

In at least one embodiment, purposeful and insightful engineering choices are made to keep what is generally referred to at times herein as "the color information" (e.g., the video frames captured by the RGB cameras 1102) separate from and not integrated with what is generally referred to at times herein as "the geometric information" (e.g., information such as depth images, vertices, visible vertices from different perspectives, interconnections among vertices, and the like) on the sender side (e.g., at PSS 202) or in transmission between PSS 202 and HMD 112 (see, e.g., the separateness in FIG. 2 of the data streams 218L, 218C, and 218R representing the color information from the geometric-data stream 220LCR representing the geometric information).

And in some embodiments, the separateness of the data into streams—that are not integrated until they arrive at HMD 112—applies within the category of the color information as well. Again, reference is made to FIG. 2 where the respective encoded video streams 218L, 218C, and 218R respectively encode raw video from the raw video streams 208L, 208C, and 208R. It is known in the art how to cheaply and efficiently encode a single raw video stream into a single encoded video stream for transmission across a data connection to a rendering device; various embodiments represent the insight that leveraging this knowledge is advantageous to the overall task of accomplishing virtual teleportation in ways that provide good user experiences.

The transmission of the video data in this manner delivers a full, rich set of color information to the receiver. As described below, the rendering device uses this color information in combination with the geometric information to render the viewpoint-adaptive 3D presenter persona 116. As part of that viewing experience, a viewer may frequently change their point of view with respect to the 3D persona 116; and not only that, but in cases in which the full color information and the accompanying geometric information is transmitted to multiple different endpoints, the viewers at those different endpoints will almost certainly view the 3D persona from different perspectives at least some of the time.

By not pre-blending the color information on the sender side, each respective viewer can select their own viewpoint and each get a full-color experience, blended at the receiver side to account for various vertices being visible from more than one relevant camera assembly. Thus, in connection with some embodiments of the present methods and systems, all of the users receive all of the color information and experience full and rich detail from their own particular selected perspective.

5. Generation of Encoded Video Streams and Geometric-Data Stream(s)

a. Introduction

In at least one embodiment, once PSS 202 has completed the above-described pixel-location-by-pixel-location identification of a visible-vertices list (perhaps a visible-triangles list, as the case may be) from the perspective of each of the camera assemblies 1024L, 1024C, and 1024R, which may be done serially or in parallel in various different embodiments, as deemed suitable by those of skill in the art for a given implementation, step 1606 is complete, and PSS 202 proceeds, at step 1608, to generating at least M+1 (or at least 4 in the described example embodiment) separate time-synchronized data streams at the shared frame rate. The at least M+1 (in this case, 4) separate time-synchronized data streams include (i) M (in this case, 3) encoded video streams 218 that each encode a respective different one of the received (raw) video streams 208 and (ii) a set of one or more geometric-data streams 220LCR * that collectively conveys the visible-vertices lists that were generated in step 1606**.

b. The Color Information i. Generally

It is described in other parts of this disclosure, that each of the encoded video streams 218 encodes a respective different one of the received video streams 208. In at least one embodiment, the encoded video streams 218 do not contain any data that is referred to herein as geometric information. In at least one embodiment, the geometric-data stream 220LCR does not contain any data that is referred to herein as color information. In at least one embodiment, (a) the encoded video streams 218 do not contain any data that is referred to herein as geometric information and (b) the geometric-data stream 220LCR does not contain any data that is referred to herein as color information.

Background Removal

In at least one embodiment, the encoded video streams 218 convey full (e.g., rectangular) frames of color information. The encoded video streams 218 may or may not include standalone i-frames as they are known in the art. In some embodiments, that is the case; in other embodiments, the encoded video streams 218 make use of inter-frame-referential constructs such as p-frames to reduce the amount of bandwidth occupied by the encoded video streams 218.

In other embodiments, however, the encoded video streams 218 do not convey full (e.g., rectangular) frames of detailed color information. Instead, in some embodiments, the encoded video streams convey frames that only have detailed color information for pixels that represent the subject (e.g., the presenter 102), and in which the rest of the pixels in the (still-rectangular-shaped) frames are filled in with a particular color known as a chromakey, selected in some embodiments to be a color that does not occur or at least rarely occurs in the image of the presenter 102 itself.

The fact that a given frame includes detailed color information of the subject and is chromakeyed everywhere else does not convert such a video frame into being one that conveys or contains geometric information. Even though the subject has been isolated and surrounded by a chromakey in the video frames, those video frames still include no indication of which color pixels project on to which vertices; the color frames know nothing of vertices. In that sense, chromakey embodiments are not all that different from non-chromakey embodiments, other than being lighter on required bandwidth, since both types of embodiments ultimately turn to the geometric information to identify color pixels that map onto mesh vertices: the chromakey embodiments simply involve transmission ultimately of fewer detailed color pixels.

In at least one embodiment, the removal of background pixels (or the extraction of pixels that represent the subject, or "user extraction") is performed using "alpha masks" which identify the pixel locations belonging to a desired persona (e.g., user). A given alpha mask may take the form of or at least include an array with a respective stored data element corresponding to each pixel in the corresponding frame, where such stored data elements are individually and respectively set equal to 1 (one) for each user pixel and to 0 (zero) for every other pixel (i.e., for each non-user (a.k.a. background) pixel).

The described alpha masks correspond in name with the definition of the "A" in the "RGBA" pixel-data format known to those of skill in the art, where "R" is a red-color value, "G" is a green-color value, "B" is a blue-color value, and "A" is an alpha value ranging from 0 (complete transparency) to 1 (complete opacity). In a typical implementation, the "0" in the previous sentence may take the form of a hexadecimal number such as 0x00 (equal to a decimal value of 0 (zero)), while the "1" may take the form of a hexadecimal number such as 0xFF (equal to a decimal value of 255); that is, a given alpha value may be expressed as an 8-bit number that can be set equal to any integer that is (i) greater than or equal to zero and (ii) less than or equal to 255. Moreover, a typical RGBA implementation provides for such an 8 bit alpha number for each of what are known as the red channel, the green channel, and the blue channel; as such, each pixel has (i) a red ("R") color value whose corresponding transparency value can be set to any integer value between 0x00 and 0xFF, (ii) a green ("G") color value whose corresponding transparency value can be set to any integer value between 0x00 and 0xFF, and (iii) a blue ("B") color value whose corresponding transparency value can be set to any integer value between 0x00 and 0xFF. And certainly other pixel-data formats could be used, as deemed suitable by those having skill in the relevant art for a given implementation.

When merging an extracted persona with content, the disclosed methods and/or systems may create a merged display in a manner consistent with the related applications previously cited; in particular, on a pixel-by-pixel (i.e., pixel-wise) basis, the merging is carried out using pixels from the captured video frame for which the corresponding alpha-mask values equal 1, and otherwise using pixels from the content.

c. The Geometric Information i. Generally

As stated above, among the data streams that PSS 202 generates as part of carrying out step 1608 is the geometric-data stream 220LCR. In at least one embodiment, PSS 202 generates and sends three separate geometric data streams: geometric-data stream 220L associated with the camera assembly 1024L, geometric-data stream 220C associated with the camera assembly 1024C, and geometric-data stream 220R associated with the camera assembly 1024R. In other embodiments, PSS 202 generates and sends a single geometric-data stream 220LCR that conveys geometric data (e.g., visible-vertices lists) associated with all three of the camera assemblies 1024L, 1024C, and 1024R. This distinction not being overly important, as mentioned above, whether one, three, or some other number of geometric-data streams are used, they are collectively referred to herein as the geometric-data stream 220LCR or more simply the geometric-data stream 220.

In at least one embodiment, the geometric-data stream 220 conveys each visible-vertices list as simply a list or array of meshVertex data objects, where each such meshVertex includes its coordinates in the shared geometry 1040. In other embodiments, each meshVertex also includes data identifying one or more other meshVertexes to which the instant meshVertex is connected. In some embodiments, each visible-vertices list includes a list of meshTriangle data objects that each include three meshVertex objects that are implied by their inclusion in a given meshTriangle data object to be connected to one another. In other embodiments, the visible-vertices list takes the form of an at-least-four-column array where each row includes a triangle identifier and three meshVertex objects (or perhaps identifiers thereof).

Clearly there are innumerable ways in which a given visible-vertices list can be arranged for conveyance from PSS 202 to HMD 112, and the various possibilities offered here are merely illustrative examples. Some further possibilities are detailed below in connection with the topic of submesh compression.

ii. Camera Intrinsics and Extrinsics

In at least one embodiment, in order to provide HMD 112 (or other rendering system or device) with sufficient information to render the 3D presenter persona 116, PSS 202 transmits to HMD 112 what is referred to herein as camera-intrinsic data (or "camera intrinsics" or simply "intrinsics," a.k.a. "camera-assembly-capabilities data") as well as what is referred to herein as camera-extrinsic data (or "camera extrinsics" or simply "extrinsics," a.k.a. "geometric-arrangement data"). And it is explicitly noted that, although this topic is addressed in this disclosure as a subsection of step 1608, the transmission of the camera-intrinsic data and the camera-extrinsic data could be done only a single time and need not be done repeatedly (unless some modification occurs and an update is needed, for example).

In at least one embodiment, the camera-intrinsic data includes one or more values that convey inherent (e.g., configured, manufactured, physical, and in general either permanently or at least semi-permanently immutable) properties of one or more components of the camera assemblies. Examples include focal lengths, principal point, skew parameter, and/or one or more others. In some cases, both a focal length in the x-direction and a focal length in the y direction are provided; in other cases, such as may be the case with a substantially square pixel array, the x-direction and y-direction focal lengths may be the same and as such only a single value would be conveyed.

In at least one embodiment, the camera-extrinsic data includes one or more values that convey aspects of how the various camera assemblies are arranged in the particular implementation at hand. Examples include location and orientation in the shared geometry 1040.

iii. Submesh Compression

A. Introduction

Bandwidth is often at a premium, and the efficient use of available bandwidth is an important concern. When a mesh is generated on the sender side and transmitted to the receiving side, reducing the amount of data needed to convey the visible-vertices lists is advantageous. Among the benefits of bandwidth conservation with respect to the geometric information is that it increases the relative amount of available bandwidth available to transmit the color information, and increases the richness of the color information conveyed in a given implementation.

The terms "mesh compression," "submesh compression," and "visible-vertices-list compression" are used relatively interchangeably herein. Among those terms, the one that is used most often in this description is submesh compression, and just as "submesh" is basically synonymous with "visible-vertices list" in this description, so is "submesh compression" basically synonymous with "visible-vertices-list compression." The term "mesh compression" can either be thought of as (i) a synonym of "submesh compression" (since a submesh is still a mesh) or (ii) as a collective term that includes (a) carrying out submesh compression with respect to each of multiple submeshes of a given mesh, thereby compressing the mesh by compressing its component submeshes and can include (b) carrying out one or more additional functions (such as duplicative-vertex reduction, as described) with respect to one or more component submeshes and/or the mesh as a whole.

In the ensuing paragraphs, various different measures that are taken in various different embodiments to effect submesh compression are described. In each case, unless otherwise noted, each described submesh-compression measure is described by way of example with respect to one submesh (though not one particular submesh) though it may be the case that such a measure in at least one embodiment is carried out with respect to more than one submesh.

B. Reducing Submesh Granularity

In at least one embodiment, a submesh-compression measure that is employed with respect to a given submesh is to simplify the submesh by reducing its granularity—in short, reducing the total number of triangles in the submesh. Doing so reduces the amount of geometric detail that the submesh includes, but this is a tradeoff that may be worth it to free up bandwidth for richer color information.

As a general matter, the flatter a given surface is (or is being modeled to be), the fewer triangles one needs to represent that surface. It is further noted that another way to express a reduction in submesh granularity is as a reduction in triangle density of the submesh—which can be the average number of triangles used to represent the texture of a given amount of surface area of the subject.

In some embodiments, some submesh compression is accomplished by reducing the triangle density in some but not all of the regions of a given submesh. For example, in some embodiments, detail may be retained (e.g., using a higher triangle density) for representing body parts such as the face, head, and hands, while detail may be sacrificed (e.g., using a lower triangle density) for representing body parts such as a torso. In other embodiments, the triangle density is reduced across the board for an entire submesh. And certainly other example implementations could be described here.

Whether a reduction in triangle density is carried out for all of a given submesh or only for one or more portions of the given submesh, there are a number of different algorithms known to those of skill in the art for reducing the granularity of a given triangle-based mesh. One such algorithm essentially involves merging nearby vertices and then removing any resulting zero-area triangles from the particular submesh.

To give the reader an idea of the order of magnitude both before and after a triangle-granularity-reduction operation such as is being described here, it may be the case that the "before picture" is a submesh that has about 50,000 triangles among about 25,000 vertices and that the "after picture" is a submesh that has about 30,000 triangles among about 15,000 vertices. These numbers are offered purely by way of example and not limitation, as it is certainly the case that (i) a given "before picture" of a given submesh could include virtually any number of triangles, though the number of triangles of course bears some relation to the corresponding number of vertices from which those triangles are formed and (ii) various different algorithms for reducing the granularity of a triangle-based mesh would have different reduction effects on the triangle density.

C. Stripifying the Triangles

1. Introduction

Figure 20:
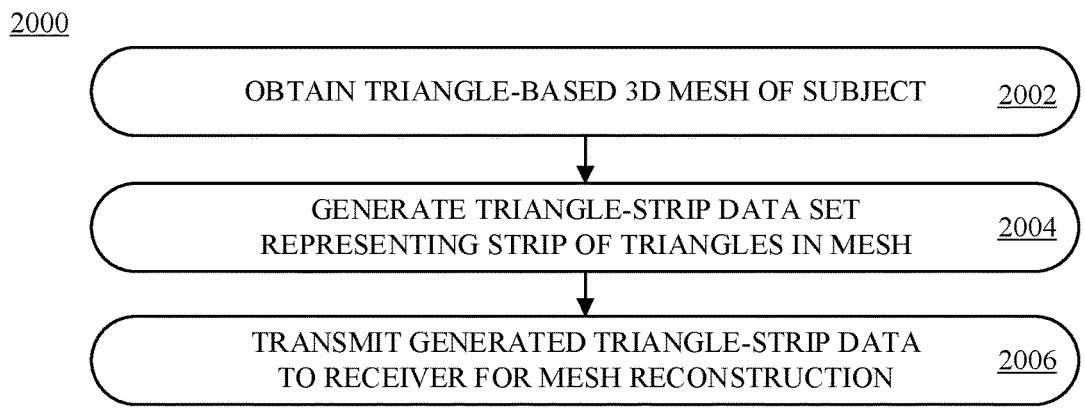
FIG. 20 is a flowchart of a third example method, in accordance with at least one embodiment.

In at least one embodiment, a submesh-compression measure that is employed for a given submesh includes stripification or a stripifying of the triangles. An example stripification embodiment is depicted in and described in connection with FIG. 20, which is a flowchart of a method in accordance with at least one embodiment. As is described above with respect to method 1600, method 2000 could be carried out by any CCD that is suitably equipped, configured, and programmed to carry out the functions described herein in connection with stripification of mesh triangles, submesh triangles, and the like. By way of example and not limitation, the method 2000 is described herein as being carried out by PSS 202.

In some embodiments, method 2000 is a substep of step 1608, in which PSS 202 generates the geometric-data stream (s) 220LCR. In short, method 2000 can be thought of as an example way for PSS 202 to transition from having full geometric information about the mesh that it just generated to having a compressed, abbreviated form of that geometric information that can be more efficiently transmitted to a receiving device for reconstruction of the associated mesh and ultimately rendering of the 3D presenter persona 116.

Figure 21:
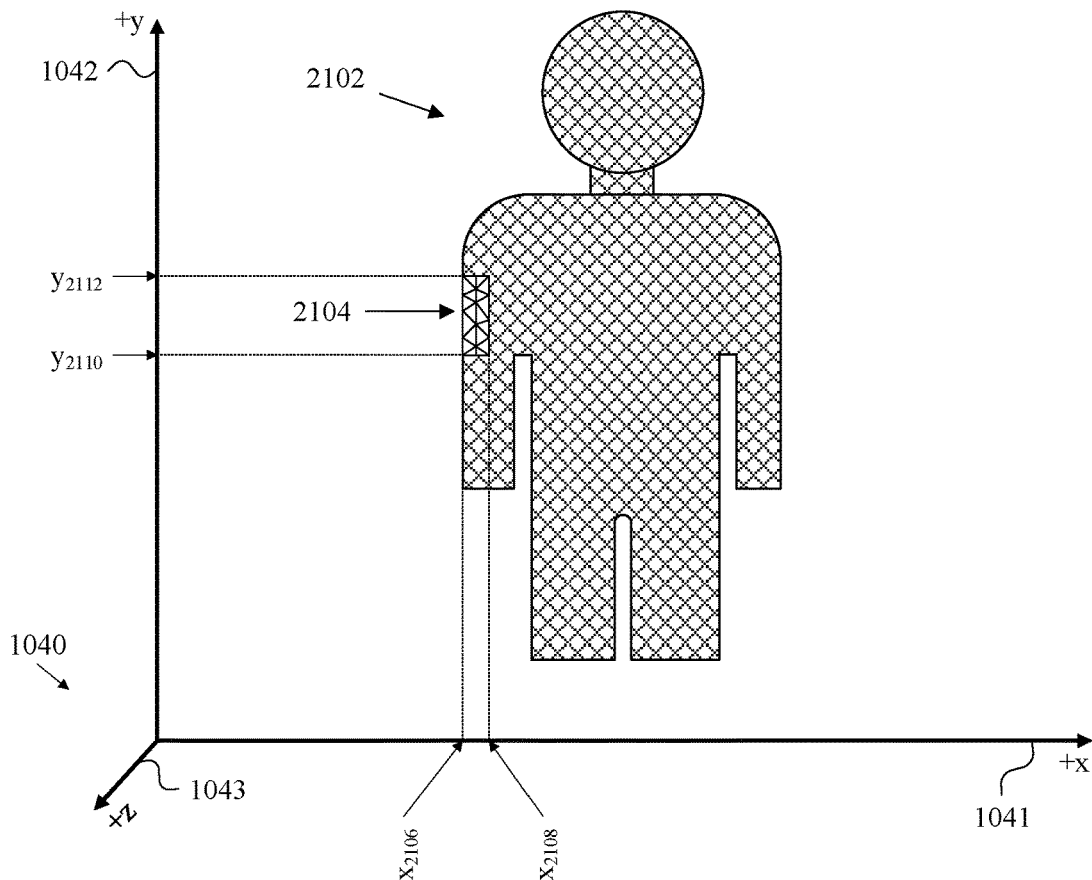
FIG. 21 is a first view of an example submesh of a subject, shown with respect to the reference set of cartesian-coordinate axes of FIG. 10B, in accordance with at least one embodiment.

FIG. 21 is a first view of an example submesh 2104 of part of the presenter 102, shown for the shared geometry 1040. Unlike FIGS. 17-19, the shared geometry 1040 is depicted in FIG. 21 from the same perspective as is used in, e.g., FIG. 10B. Among the reasons for using the rotated views in FIGS. 17-19 was to show the orientation of the shared geometry 1040 for another coordinate system, which in those figures was a 2D pixel array.

Figure 22:
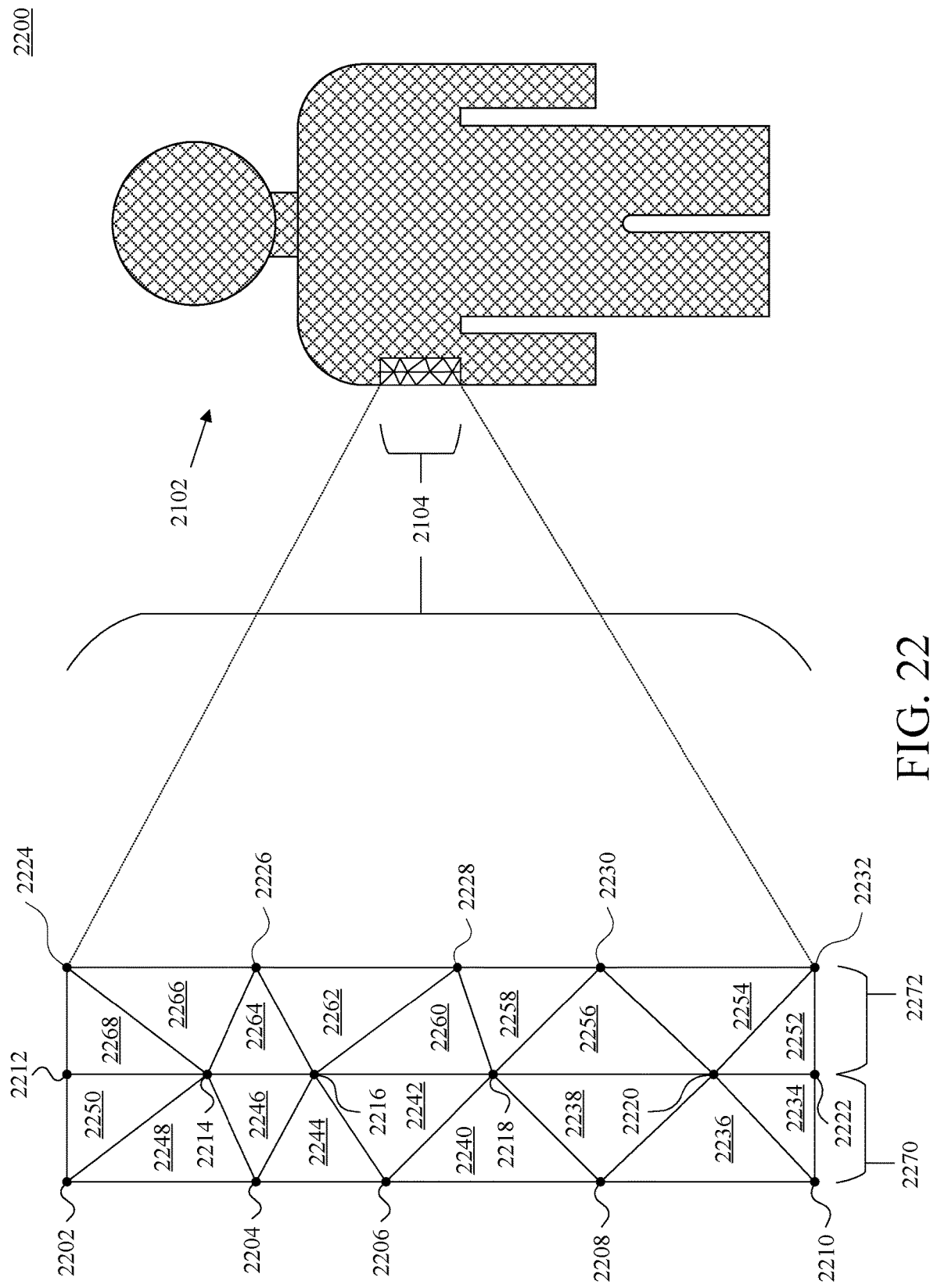
FIG. 22 is a second view of the submesh of FIG. 21, as well as a magnified portion thereof, in accordance with at least one embodiment.

As depicted in FIG. 21, the submesh 2102 includes a section 2104 depicted in this example as being on the right arm of the presenter 102. The section 2104 spans x-values from $x_{2106}$ to $x_{2108}$ and y-values from $y_{2110}$ to $y_{2112}$, all four of which are arbitrary values. FIGS. 21 and 22 are explained herein without explicit reference to the z-dimension; all of the vertices discussed are assumed to have a constant z-value that is referred to here as $z_{2104}$ (the arbitrarily selected constant z-value of the section 2104 of the submesh 2102). In a typical operation there would be a number of different z-values among the various vertices of the section 2104, to show the contours of that part of the right arm of the presenter 102. Each of the vertices 2202-2232, therefore, has a location in the shared geometry 1040 that can be expressed as follows, using the vertex 2218 as an example: $xyz_{1040}::\{x_{2218}, y_{2218}, z_{2104}\}$.

FIG. 22 depicts a view 2200 that includes the submesh 2102 and the section 2104, and that also includes a magnified version of the section 2104. As can be seen in FIG. 22, the section 2104 contains 16 vertices that are numbered using the even numbers between 2202 and 2232, inclusive. These 16 vertices 2202-2232 are shown as forming 18 triangles numbered using the even numbers between 2234 and 2268, inclusive. The triangles 2234-2268 are organized into two strips. In particular, the triangles 2234-2250 form a strip 2270, and the triangles 2252-2268 form a strip 2272. This section 2104, these vertices 2202-2232, these triangles 2234-2268, and these strips 2270 and 2272 are used as an example data set for embodiments of the method 2000.

At step 2002, PSS 202 obtains the triangle-based 3D mesh (in this case, the submesh 2102) of a subject (e.g., the presenter 102). In an embodiment, PSS 202 carries out step 2002 at least in part by carrying out the above-described steps 1604 and 1606, which results in the generation of three meshes: the submesh from the perspective of the camera assembly 1024L, the submesh from the perspective of the camera assembly 1024C, and the submesh from the perspective of the camera assembly 1024R. In this example, the submesh 2104 is from the perspective of the camera assembly 1024C.

At step 2004, PSS 202 generates a triangle-strip data set that represents a strip of triangles in the submesh 2102. In the below-described examples, PSS 202 generates a triangle-strip data set to represent the strip 2270. Finally, at step 2006, PSS 202 transmits the generated triangle-strip data set to a receiving/rendering device such as the HMD 112 for reconstruction by the HMD of the submesh 2102 and ultimately for rendering by the HMD 112 of the viewpoint-adaptive 3D persona 116. Example ways in which PSS 202 may carry out step 2004 are described below.

In some embodiments, PSS 202 stores each vertex as a meshVertex data object that includes at least the 3D coordinates of the instant vertex in the shared geometry 1040. Furthermore, PSS 202 may store a given triangle as a meshTriangle data object that itself includes three meshVertex objects. PSS 202 may further store each strip as a meshStrip data object that itself includes some number of meshTriangle objects. Thus, in one embodiment, PSS 202 carries out step 2004 by generating a meshStrip data object for the strip 2270, wherein that meshStrip data object includes a meshTriangle data objects for each of the triangles 2234-2250, and wherein each of those meshTriangle data objects includes a meshVertex data object for each of the three vertices of the corresponding triangle, wherein each such meshVertex data object includes a separate 8-bit floating point number for each of the x-coordinate, the y-coordinate, and the z-coordinate of that particular vertex.

This approach would involve PSS 202 conveying the strip 2270 by sending a meshStrip object containing nine meshTriangle objects, each of which includes three meshVertex objects, each of which includes three 8-bit floating-point values. That amounts to 81 8-bit floating-point values, which amounts to 648 bits without even counting any bits for the overhead of the data-object structures themselves. But using 648 bits as a floor, this approach gets metrics of using 648 bits to send nine triangles, which amounts to 72 bits per triangle (bpt) at best. In terms of bits per vertex (bpv), which is equal to ⅓ of the bpt (due to there being three vertices per triangle); in this case the described approach achieves 24 bpv at best. Even a simplified table or array containing all of these vertices could do no better than 72 bpt and 24 bpv.

An even more brute-force, naïve approach would be one in which each of the 27 transmitted vertices not only includes three 8-bit floats for the xyz coordinates, but also includes color information in the form of an 8-bit red value, an 8-bit green (G) value, and an 8-bit blue (B) value. As each vertex would then require six 8-bit values instead of three 8-bit values, doing this would double the bandwidth costs to 1296 total bits for the strip 2270 (144 bpt and 48 bpv). These numbers are offered by way of comparison to various embodiments, not by way of suggestion.

The triangle 2234 includes the vertices 2222, 2210, and 2220. The triangle 2236 includes the vertices 2210, 2220, and 2208. The triangle 2236 differs from the triangle 2234, therefore, by only a single vertex: the vertex 2208 (and not the vertex 2222). Thus, in at least one embodiment, once all three vertices of a given triangle have been conveyed to a recipient, with those three vertices ordered such that, for example, the second and third listed of those three vertices are implied to be part of the next triangle, that next triangle can be specified with only a single vertex.

In an embodiment, PSS 202 and the HMD 112 both understand that for a strip of triangles to be conveyed, the first such triangle will be specified by all three of its vertices listed in a particular first, second, and third order. The second such triangle will be specified with only a fourth vertex and the implication that the triangle also includes the second and third vertices from the previous triangle. The third such triangle can be specified with only a fifth vertex and the implication that the third triangle also includes the third and the fourth vertices that have been specified, and so on.

An approach such as this would need nine 8-bit floats (short for "floating-point values or numbers") to fully specify the {x,y,z} coordinates of the three vertices 2222, 2210, and 2220 of the triangle 2234. For each of the second through ninth triangles 2236-2250, however, only a single vertex (e.g., three 8-bit floats) would need to be specified for each. Therefore, this same strip 2270 of nine triangles could be sent using three 8-bit floats for each of 11 vertices, for a total of 11 vertices*3 floats/vertex*8 bits/float=264 bits, which amounts to 29.33 bpt and 9.78 bpv.

2. Space-Modeling Parameters

In at least one embodiment, there are two space-modeling parameters that are relevant to the precision and scale that can be represented, as well as to the bandwidth that will be required to do so. These two space-modeling parameters are referred to herein as the "cube-side size" and the "cube-side quantization."

The cube-side size is a real-world dimension that corresponds to each side (e.g., length, width, and depth) of a single (imaginary or virtual) cube of 3D space that the subject (e.g., the presenter 102) is considered to be in. In at least one embodiment, the cube-side size is two meters, though many other values could be used instead, as deemed suitable by those of skill in the art. In some embodiments, a cube-side-size of two meters is used for situations in which a presenter is standing, while a cube-side size of one meter is used for situations in which a presenter is sitting (and only the top half of the presenter is visible). Certainly many other example cube-side sizes could be used in various different embodiments, as deemed suitable by those of skill in the art for a given implementation.

The cube-side quantization is the number of bits available for subdivision of the cube-side size (e.g., the length of each side of the cube) into sub-segments. If the cube-side quantization were one, each side of the cube could be divided and resolved into only two parts (0, 1). If the cube-side quantization were two, each side of the cube could be divided into quarters (00, 01, 10, 11). In at least one embodiment, the cube-side quantization is 10, allowing subdivision (e.g., resolution) of each side of the cube into $2^{10}$ (e.g., 1024) different sub-segments, though many other values could be used instead, as deemed suitable by those of skill in the art. The cube-side quantization, then, is a measure of how many different pixel locations will be available (to hold potentially different values from one another) in each of the x-direction, the y-direction, and the z-direction in the shared geometry 1040.

In an embodiment in which the cube-side size is two meters and the cube-side quantization is 10, the available two meters in the x-direction, the available two meters in the y-direction, and the available two meters in the z-direction are each resolvable into 1024 different parts that each have a length in their respective direction of two meters/side*side/1024 sub-segments*1000 mm/m=~1.95 millimeters (mm). This result (1.95 mm in this case) is referred to herein as the "step size" of a given configuration, and it will be understood by the reader having the benefit of this disclosure that the step size is a function of both the cube-side size and the cube-side quantization, and that changing one or both of those space-modeling parameters would change the step size (unless of course, they were both changed in a way that produced the same result, such as a cube-side size of one meter and a cube-side quantization of nine (such as one meter divided into $2^9$ (512) steps and then multiplied by 1000 mm/m also yields a step size of 1.95 mm)). Using an example cube-side size of two meters and an example cube-side quantization of 10, then, the atomic part of the mesh is a cube that is ~1.95 mm along each side. In some instances, 3D pixels are known as voxels.

In this disclosure, the "step size" is the smallest amount of distance that can be moved (e.g., "stepped") in any one direction (e.g., x, y, or z), somewhat analogous to what is known in physics circles (for our universe) as the "Planck length," named for renowned German theoretical physicist Max Planck and generally considered to be on the order of $10^{-35}$ meters (and of course real-world movement of any distance is not restricted to being along only one of three permitted axial directions).

3. Expressing Vertices in Step Sizes

Some examples given above of a few different ways in which PSS 202 could carry out step 2004 using an 8-bit float to express every x-coordinate, y-coordinate, and z-coordinate of every vertex. Given the above discussion regarding the cube-side size, the cube-side quantization, and the step size, some parallel examples are given in this sub-section where a 10-bit number of steps is used rather than an 8-bit float to express any absolute x-coordinate, y-coordinate, or z-coordinate values.

Revisiting the example in which PSS 202 transmitted all 81 coordinates of the 27 vertices of the 9 triangles in the strip 2270, mapping that brute-force, naïve approach on to use of step sizes, that approach would require the transmission of 81 coordinates*10 bits/coordinate=810 bits total (90 bpt and 30 bpv). Not surprising that using two extra bits per coordinate raised the overall bandwidth cost.

Now revisiting the example in which PSS 202 needed 264 bits to send an 8-bit float for each coordinate of each of the 11 vertices in the strip 2270, using 10-bit step counts (from the origin (e.g., {0,0,0}) of the shared geometry 1040) instead of 8-bit floats would again raise the bandwidth cost, this time to 11 vertices*3 step counts/vertex*10 bits/step count=330 total bits (36.67 bpt and 12.22 bpv).

4. Replacing Coordinate Values with Coordinate Deltas

Some embodiments involve expression of a coordinate (e.g., an x-coordinate) using not an absolute number (a floating-point distance or an integer number of steps) from the origin but rather using a delta for another (e.g., the immediately preceding) value (e.g., the x-coordinate specified immediately prior to the x-coordinate that is currently being expressed using an x-coordinate delta). In some embodiments, assuming that a preceding vertex was specified in some manner (either with absolute values from origin or using deltas from its preceding vertex), a current vertex is denoted delta-x, a delta-y, and a delta-z for that immediately preceding vertex.

Step size is relevant in embodiments in which a delta in a given axial direction is expressed in an integer number of "steps" of size "step size." Therefore, when it comes to considerations of bandwidth usage, the number of bits that is allocated for a given delta determines the maximum number of step sizes for a given coordinate delta. This adjustable parameter is similar in principle to the cube-side quantization discussed above, in that a number of bits naturally determines a number of unique values that can be represented by such bits (# of values=$2^{\text{\# of bits}}$).

The number of bits allocated in a given embodiment to express a delta in a given axial direction (a delta-x, a delta-y, or a delta-z) is referred to as the "delta allowance" (and is referred for the particular axial directions as the "delta-x allowance," the "delta-y allowance," and the "delta-z allowance"). A related value is the "max delta," which in this disclosure refers to the maximum number of step sizes in any given axial direction that can be specified by a given delta. If a delta allowance is two, the max delta is three (e.g., "00" could specify zero steps (e.g., the same x-value as the previous x-value), "01" could specify one step, "10" could specify two steps, and "11" could specify three steps). In at least one embodiment, the delta allowance is four and the max delta is therefore 15, though certainly many other numbers could be used instead.

Those examples assume that the progression in a given dimension would always be positive (e.g., a delta-x of three would mean "go three steps the (implied positive) x-direction"). This may not be the case, however, and therefore in some embodiments a delta allowance of, e.g. four, would still permit expression of 16 different values, but in a given implementation, perhaps seven of those would be negative (e.g. "one step in the negative direction" through "seven steps in the negative direction"), one would be "no steps in this axial direction", and the other eight would be positive (e.g., "1 step in the positive direction" through "eight steps in the positive direction"). And certainly numerous other example implementations could be listed here.

Returning now to example ways in which PSS 202 could carry out step 2004, the two examples above in which PSS 202 compressed the strip 2270 by sending all three vertices for the first triangle, and then only one vertex for each ensuing triangle, each time implying that the current triangle is formed from the newly specified vertex and the two last-specified vertices of the preceding triangle. Taking this approach using absolute coordinates expressed in 8-bit floats incurred a bandwidth cost of 264 total bits (29.33 bpt and 9.78 bpv), and taking this approach using absolute coordinates in 10-bit step counts incurred a bandwidth cost of 330 total bits (36.67 bpt and 12.22 bpv).

In at least one embodiment, PSS 202 uses the following approach for compressing and transmitting the strip 2270. The first triangle is sent using three 10-bit step counts from origin for the first vertex, three 4-bit coordinate deltas from the first vertex for the second vertex, and three 4-bit coordinate deltas from the second vertex for the third vertex (for a total of 38 bits so far (38 bpt and 12.67 bpv)). The second triangle is sent as just the fourth vertex in the form of three 4-bit coordinate deltas from the third vertex (for a total of 50 bits so far (25 bpt and 16.67 bpv)). The third triangle is sent as just the fifth vertex in the form of three 4-bit coordinate deltas from the fourth vertex (for a total of 62 bits so far (20.67 bpt and 6.89 bpv)). By the time the ninth (of the nine)

triangles is sent—as just the eleventh vertex in the form of three 4-bit coordinate deltas from the tenth vertex, the total bandwidth cost for the whole strip 2270 is 134 bit total (14.89 bpt and 4.96 bpv).

In some embodiments, as demonstrated in the explanation of the prior example, the more triangles in a given strip, the better the bpt and bpv scores become, since each additional triangle only incurs the cost of a single vertex, whether that single vertex be expressed as three 8-bit floats, three 10-bit step counts, three 4-bit coordinate deltas, or some other possibility. In the case of the example described in the preceding paragraph, the bpt would continue to approach (but never quite reach) 12 and the bpv would continue to approach (but never quite reach) four, though these asymptotic limits can be shattered by using other techniques such as the entropy-encoding techniques described below. Other similar examples are possible as will be appreciated by one of skill in the art.

In at least one embodiment, to minimize the amount of data that is being moved around during—and the amount of time needed for—the stripification functions, PSS 202 generates a table of submesh vertices where each vertex is assigned a simple identifier and is stored in association with its x, y, and z coordinates, perhaps as 8-bit floats or as 10-bit step counts. This could be as simple as a four-column array where each row contains a vertex identifier for a given vertex, the x-coordinate for that given vertex, the y-coordinate for that given vertex, and the z-coordinate for that given vertex. As with a number of the other aspects of this disclosure, the number of bits allotted for expressing vertex identifiers puts an upper limit on the number of vertices that can be stored in such a structure, though such limitations tend to be more important for transmission operations than they are for local operations such as vertex-table management.

5. Encoding Entropy

Some embodiments use entropy-encoding mechanisms to further reduce the bpt and bpv scores for transmission of strips of triangles of triangle-based meshes. This is based on the insight that a great many of the triangles in a typical implementation tend to be very close to being equilateral triangles, which means that there are particular values for delta-x, delta-y, and delta-z that occur significantly more frequently than other values. To continuously keep repeating that same value in coordinate delta after coordinate delta would be unnecessarily wasteful of the available bandwidth. As such, in certain embodiments, PSS 202 encodes frequently occurring coordinate-delta values using fewer than four bits (or whatever the delta allowance is for the given implementation). One way that this can be done is by using Huffman encoding, though those of skill in the art will be aware of other encoding approaches as well.

6. Reducing the Number of Duplicative Receiver-Side Vertices

As described above, some embodiments involve the compression and transmission of triangle strips using coordinate deltas instead of absolute coordinates to specify particular vertices to the receiver. Thus, using FIG. 22 for reference, PSS 202 may first compress the strip 2270 as described above for transmission to the receiver and then proceed to compressing the strip 2272 in a similar fashion, also for transmission to the receiver. In compressing each of these strips 2270 and 2272 for transmission using coordinate deltas, it won't be long until PSS 202 encodes some vertices that it has already sent to the receiver.

In an example sequence, PSS 202, as part of compressing and transmitting the first strip 2270, transmits the following eleven vertices in the following order:
1. vertex 2222 (30 bits of absolute step-count coordinates);
2. vertex 2210 (12 bits of coordinate deltas);
3. vertex 2220 (12 bits of coordinate deltas);
4. vertex 2208 (12 bits of coordinate deltas);
5. vertex 2218 (12 bits of coordinate deltas);
6. vertex 2206 (12 bits of coordinate deltas);
7. vertex 2216 (12 bits of coordinate deltas);
8. vertex 2204 (12 bits of coordinate deltas);
9. vertex 2214 (12 bits of coordinate deltas);
10. vertex 2202 (12 bits of coordinate deltas); and
11. vertex 2212 (12 bits of coordinate deltas).

Upon starting the compression of the strip 2272 (and assuming that, as would tend to be the case from time to time, PSS 202 has to revert to sending a full 30-bit expression of the step-size coordinates of a given triangle, and then resume the coordinate-delta approach), PSS 202, as part of compressing and transmitting the first strip 2270, transmits the following eleven vertices in the following order, wherein the list numbering is continued purposefully from the previous numbered list:

12. vertex 2222 (30 bits of absolute step-count coordinates);
13. vertex 2232 (12 bits of coordinate deltas);
14. vertex 2220 (12 bits of coordinate deltas);
15. vertex 2230 (12 bits of coordinate deltas);
16. vertex 2218 (12 bits of coordinate deltas);
17. vertex 2228 (12 bits of coordinate deltas);
18. vertex 2216 (12 bits of coordinate deltas);
19. vertex 2226 (12 bits of coordinate deltas);
20. vertex 2214 (12 bits of coordinate deltas);
21. vertex 2224 (12 bits of coordinate deltas); and
22. vertex 2212 (12 bits of coordinate deltas).

It can be seen, then, that PSS 202 transmitted the following duplicate vertices:

vertex 2222 was sent as both 1 and 12 on the list (in full 30-bit form, no less, though that would actually help the receiver remove the second occurrence as a duplicate vertex);

vertex 2220 was sent as both 3 and 14 on the list (in only coordinate-delta form, as is the case with the remaining items in this list of duplications, thus offering little help to the receiving device in identifying the duplicative-vertex transmission);

vertex 2218 was sent as both 5 and 16 on the list;

vertex 2216 was sent as both 7 and 18 on the list;

vertex 2214 was sent as both 9 and 20 on the list; and vertex 2212 was sent as both 11 and 22 on the list.

In some instances, the ratio of transmitted vertices to actual vertices (e.g., unique vertices in the mesh on the sender side) is close to two. One possible workaround for this issue is to transmit a unique index for each vertex. However, as discussed above, even after simplification, there is often on the order of 15,000 unique vertices in the mesh on the server side. As such, it would require 14 bits per vertex to include such a vertex identifier (where 14 bits provides for 16,384 different possible binary identifiers). Thus, it is "cheaper" in the bandwidth sense to send a 12-bit (such as three 4-bit coordinate deltas) vertex twice than it would be to send such a vertex identifier with every unique vertex.

When receiving compressed-submesh information, the receiver compiles a list of submesh vertices, and that last include a significant number of duplicates, often approaching half of the total number of vertices. This places an undue processing burden on the receiver in a number of ways. First, the receiver simply has to add nearly twice as many vertices to its running list of vertices than it would if there were no duplicates. Second, the receiver is then tasked with rendering what it believes without any reason not to is a mesh with, say, 28,000 vertices in it instead of the 15,000 that are in the mesh data model on the sender side (for representing the same subject in the same level of geometric detail). This causes problems such as the rendering device wastefully using spots in its rendering (e.g., vertex) cache.

The receiver could carry out functions such as sorting and merging to remove duplicate vertices, but this too is computationally expensive. Another looming problem is that in some instances the receiver may not have sufficient memory or other storage to maintain such a large table of vertices. In some implementations, there is an upper bound of 16 bits for receiver-side vertex indices, maxing out the number of different (or so the client-side device thinks) vertices at $2^{16}$ (65,536).

To address this issue, in various different embodiments, in addition to sending the mesh-vertices information to the rendering device, PSS 202 also transmits one or more duplicate-vertex lists, conveying in various different ways information that conveys (though more tersely than this) messages such as "the nineteenth vertex that I sent you is a duplicate of the fifth vertex that I sent you, so you can ignore the nineteenth vertex." Thus, in at least some embodiments, further aspects of mesh compression involve informing the receiver-side device that certain vertices are really duplicates or co-located in the shared geometry 1040 with previously identified vertices.

In some embodiments, PSS 202 organizes one or more duplicate-vertices-notification reports in the form of two-column table, where each row contains the sequence number of two vertices that have the same xyz coordinates in the shared geometry 1040. In some embodiments, such reports are sent by PSS 202 during intermediate time frames. And certainly other possible implementations could be listed here as well.

6. Transmission of Encoded Video Streams and Geometric-Data Stream(s) to Rendering Device At step 1610, PSS 202 transmits the at least M+1 separate time-synchronized data streams to the HMD 112 for rendering of the viewpoint-adaptive 3D persona 116 of the presenter 102. In this particular example, PSS 202 transmits the encoded video streams 218L, 218C, and 218R, as well as the geometric-data stream 220LCR, which, as described above, could be a single stream, could be three separate streams 220L, 220C, and 220R, or perhaps some other arrangement deemed suitable by those of skill in the art for arranging the geometric information among one or more data streams separate and apart from the streams conveying the color information.

In various different embodiments, the color information and/or the geometric information could be transmitted using the Internet Protocol (IP) as the network-layer protocol and either the Transport Control Protocol (TCP) or the User Datagram Protocol (UDP) as the transport-layer protocol, among other options. As a general matter, TCP/IP incurs more overhead than UDP/IP but includes retransmission protocols to increase the likelihood of delivery, while UDP/IP includes no such retransmission protocols but incurs less overhead and therefore frees up more bandwidth. Those of skill in the art are familiar with such tradeoffs. Other protocols may be used as well, as deemed suitable by those of skill in the art for a given implementation and/or in a given context.

B. Example Receiver-Side Operation

Figure 23:
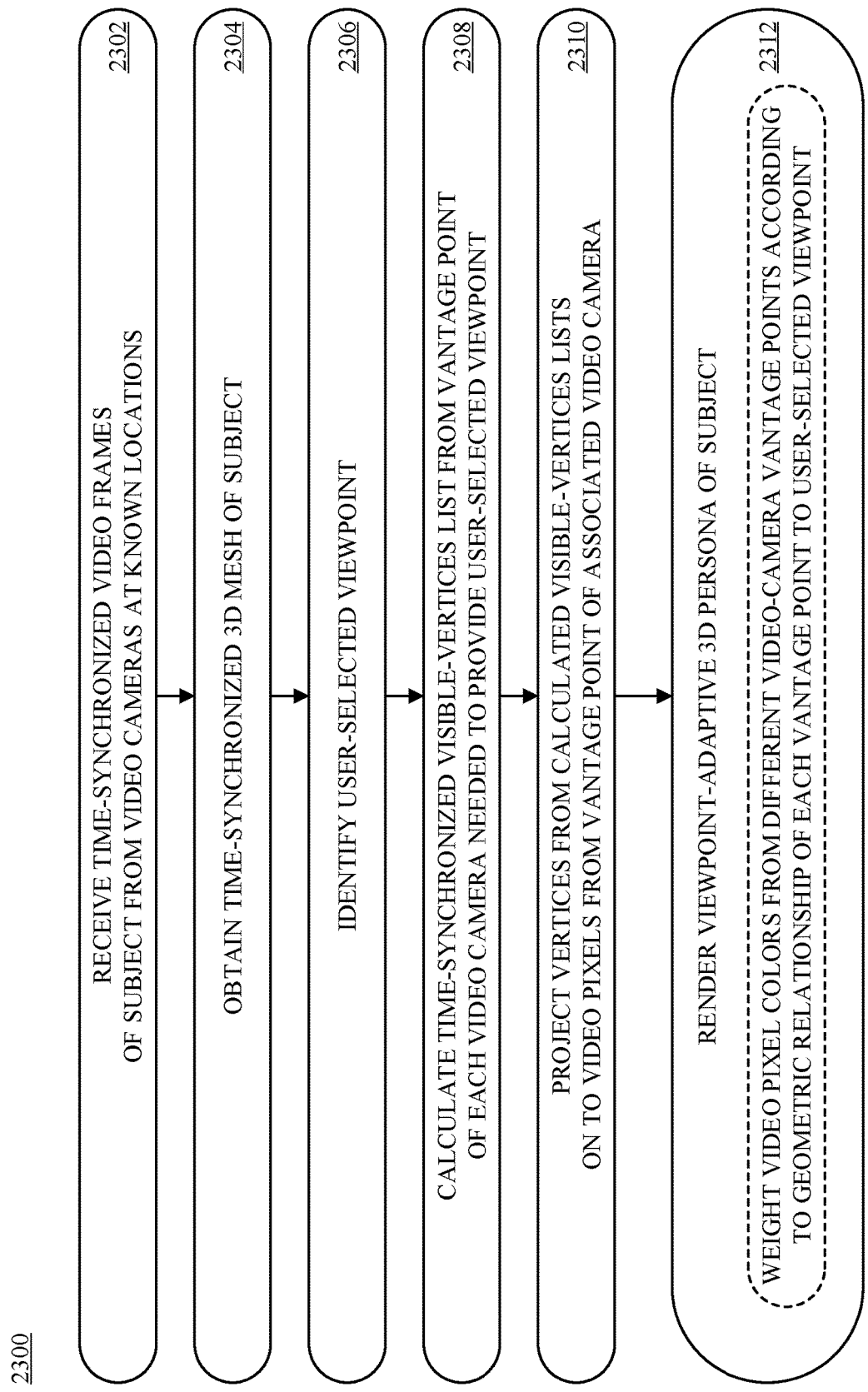
FIG. 23 is a flowchart of a fourth example method, in accordance with at least one embodiment.

FIG. 23 is a flowchart of a method 2300, in accordance with at least one embodiment. By way of example, the method 2300 is described below as being carried out by the HMD 112, though any computing system or device, or combination of such systems and devices, CCD or other device that is suitably equipped, programmed, and configured could be used in various different implementations to carry out the method 2300.

At step 2302, the HMD 112 receives time-synchronized video frames of a subject (e.g., the presenter 102) that were captured by video cameras (e.g., the camera assemblies 1024) at known locations in a shared geometry such as the shared geometry 1040. In some embodiments, the video frames arrive as raw video streams such as the raw video streams 208. In other embodiments, the video frames arrive at the HMD 112 as encoded video streams such as the encoded video streams 218.

At step 2304, the HMD 112 obtains a time-synchronized 3D mesh of the subject. In at least one embodiment, the HMD 112 may carry out step 2304 of the method 2300 in any of the various ways that are described above for PSS 202 carrying out step 1604 of the method 1600. Thus, taken together, on a frame-by-frame basis, the carrying out of steps 2302 and 2304 provides the HMD 112 with full-color, full-resolution color images of the subject from, in this example, three different vantage points in the shared geometry (e.g., the vantage point 1080 of the camera assembly 1024L, the vantage point 1082 of the camera assembly 1024C, and the vantage point 1084 of the camera assembly 1024R).

At step 2306, HMD 112 identifies a user-selected viewpoint for the shared geometry 1040. In various different embodiments, HMD 112 may carry out step 2306 on the basis of one or more factors such as eye gaze, head tilt, head rotation, and/or any other factors that are known in the art for determining a user-selected viewpoint for a VR or AR experience.

At step 2308, HMD 112 calculates time-synchronized visible-vertices lists, again on a per-shared-frame-rate-time-period basis, from the vantage point of at least each of the camera assemblies that is necessary to render the 3D persona 116 based on the user-selected viewpoint that is identified in step 2306. For the most part, HMD 112 may carry out step 2308 of the method 2300 in any of the various ways that are described above for PSS 202 carrying out step 1606 of the method 1600.

An exception to this in certain embodiments is that, while PSS 202, in carrying out step 1606, calculates a visible-vertices list from the perspective of each and every camera assembly 1024 (because PSS 202 does not know what viewpoint a user may select for a given frame, and may in any event be streaming the data to multiple viewers that are nearly certain to select at least slightly different viewpoints in many frames), HMD 112, in some embodiments of carrying out step 2308, only computes visible-vertices lists from the vantage points of those camera assemblies 1024 that will be needed to render the 3D persona from the perspective of the user-selected viewpoint that is identified in step 2306. In many cases, only two such visible-vertices lists are needed.

At step 2310, HMD 112 projects the vertices from each visible-vertices list that it calculated in step 2308 on to video pixels (color-data pixels from RGB video cameras 1102 of camera assemblies 1024) from the respective vantage points of the camera assemblies 1024 that are associated with the visible-vertices lists calculated in step 2308. Thus, using the type of geometry and mathematics that are displayed in, and described in connection with, FIGS. 17-19, the HMD determines, for each vertex in each visible-vertices list, which color pixel in the corresponding RGB video frame projects to that vertex in the shared geometry 1040.

At step 2312, the HMD 112 renders the viewpoint-adaptive 3D presenter persona 116 of the subject (e.g., of the presenter 102) using the geometric information from the visible-vertices lists that the HMD 112 calculated in step 2308 and the color-pixel information identified for such vertices in step 2310. HMD 112 may, as is known in the art, carry out some geometric interpolation between and among the vertices that are identified as visible in step 2308.

If the HMD 112 is rendering the 3D persona in a given frame based on two camera-assembly perspectives, the HMD 112 may first render the submesh associated with the visible-vertices list of the first of those two camera-assembly perspectives and then overlay a rendering of the submesh associated with the visible-vertices list of the second of those two camera-assembly perspectives. Serial render-and-overlay sequence could be used for any number of submeshes representing respective parts of the subject.

In some embodiments, as each successive submesh is overlaid on the one or more that had been rendered already, the HMD 112 specifies the weighting percentages to give the new submesh as compared with what has already been rendered. Thus, to get a ⅓ weighting result for each of three color values for a given vertex, the HMD 112 may specify to use 100% weighting for the color information from the first viewpoint for that vertex when rendering the first submesh, then to go 50% percent weighting for color information for that vertex from each of the second submesh and the existing rendering, and then finally go to 67% weighting for color information from the existing rendering for that vertex and 33% weighting for color information from the third submesh for that vertex. And certainly many other examples could be listed as well.

In cases where the HMD 112 determines that a given vertex is visible from two different perspectives, the HMD 112 may carry out a process that is known in the art as texture blending, projective texture blending, and the like. In accordance with that process, the HMD 112 may render that vertex in a color that is a weighted blend of the respective different color pixels that the HMD 112 projected on to that same 3D location in the shared geometry 1040 from however many camera-assembly perspectives are being blended in the case of that given vertex. An example of texture-blending is described in, e.g., U.S. Pat. No. 7,142,209, issued Nov. 28, 2006 to Uyttendaele et al. and is entitled "Real-Time Rendering System and Process for Interactive Viewpoint Video that was Generated Using Overlapping Images of a Scene Captured from Viewpoints Forming a Grid," and which is hereby incorporated herein by reference in its entirety.

Figure 24:
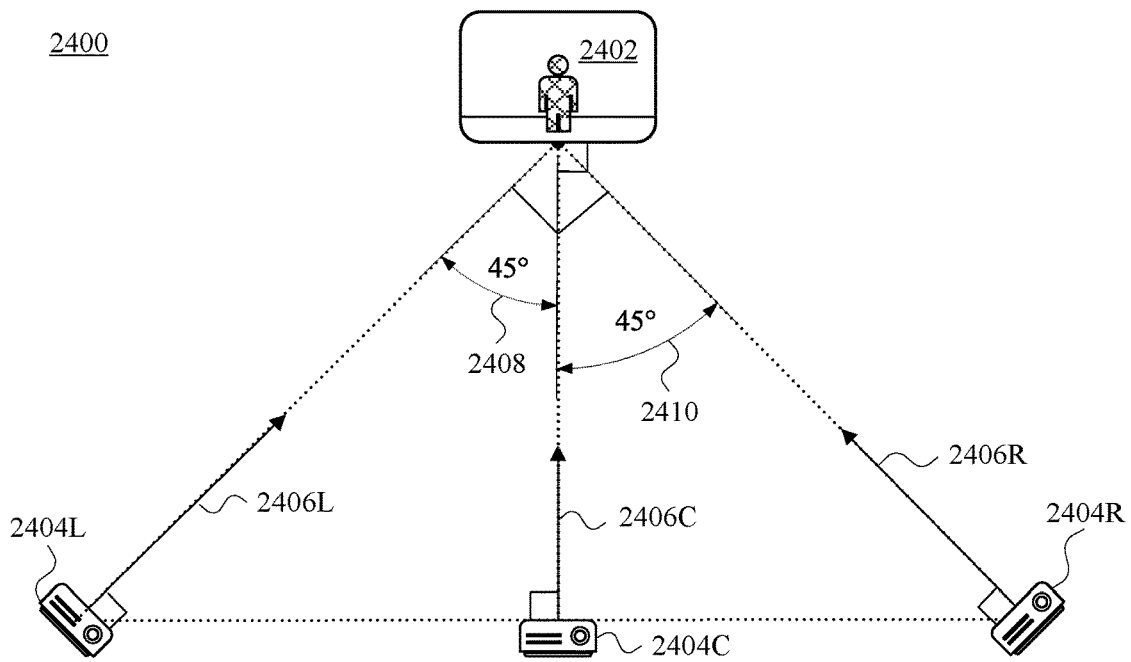
FIG. 24 is a view of an example viewer-side arrangement including three example submesh virtual-projection viewpoints that correspond respectively with the three camera assemblies of FIG. 10A, in accordance with at least one embodiment.

FIG. 24 is a view of an example viewer-side arrangement 2400 that includes three example submesh virtual-projection viewpoints 2404L, 2404C, and 2404R that correspond with the three camera assemblies 1024L, 1024C, and 1024R, in accordance with at least one embodiment. Virtual-projection viewpoints 2404 are not physical devices on the receiver side, but rather are placed in FIG. 24 to correspond to the three respective viewpoints from which the subject was captured on the sender side. For actual rendering devices, in some embodiments, as is known in the art, the HMD 112 includes two rendering systems, one for each eye of the human user, in which each such rendering system renders an eye-specific image that is then stereoscopically combined naturally by the brain of the user.

In FIG. 24, it can be seen that the rendered display is represented by a simple icon 2402 that is not meant to convey any particular detail, but rather to serve as a representation of the common focal points of the virtual-projection viewpoints 2404L, 2404C, and 2404R. For the reader's convenience, example rays 2406L, 2406C, and 2406R are shown as respectively emanating from the virtual-projection viewpoints 2404L, 2404C, and 2404R. Consistent with the top-down view of the camera assemblies 1024 in FIG. 10C, the rays 2406L and 2406C form a 45° angle 2408, and the rays 2406C and 2406R form another 45° angle 2410, therefore combining into a 90° angle.

Figure 25:
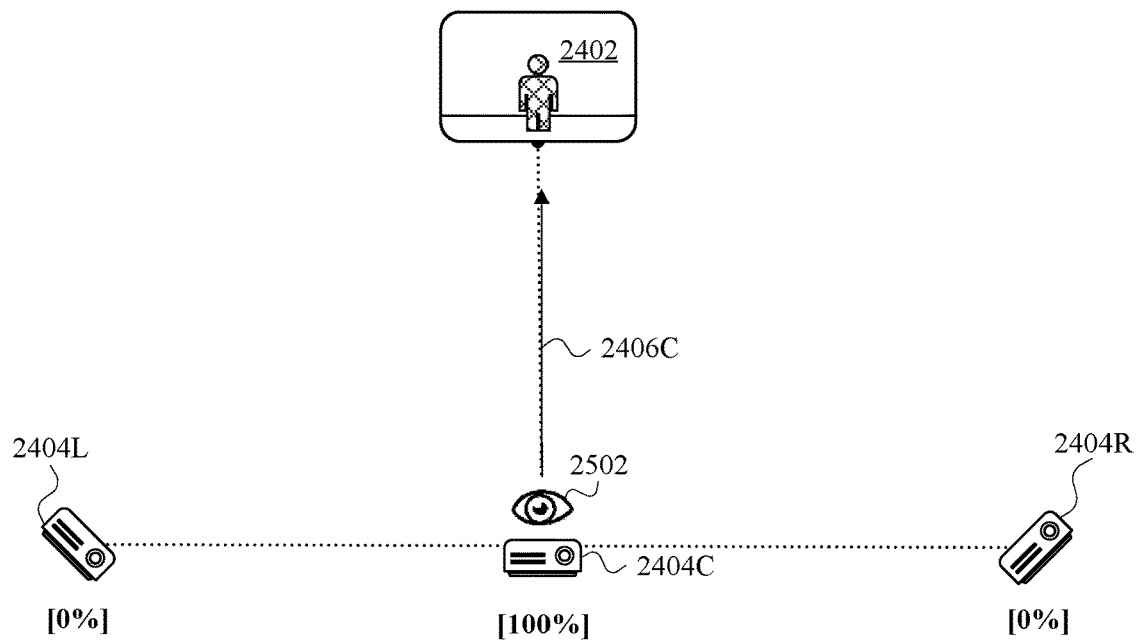
FIG. 25 is a view of the viewer-side arrangement of FIG. 24 in which a viewer has selected a center viewpoint, in accordance with at least one embodiment.
Figure 26:
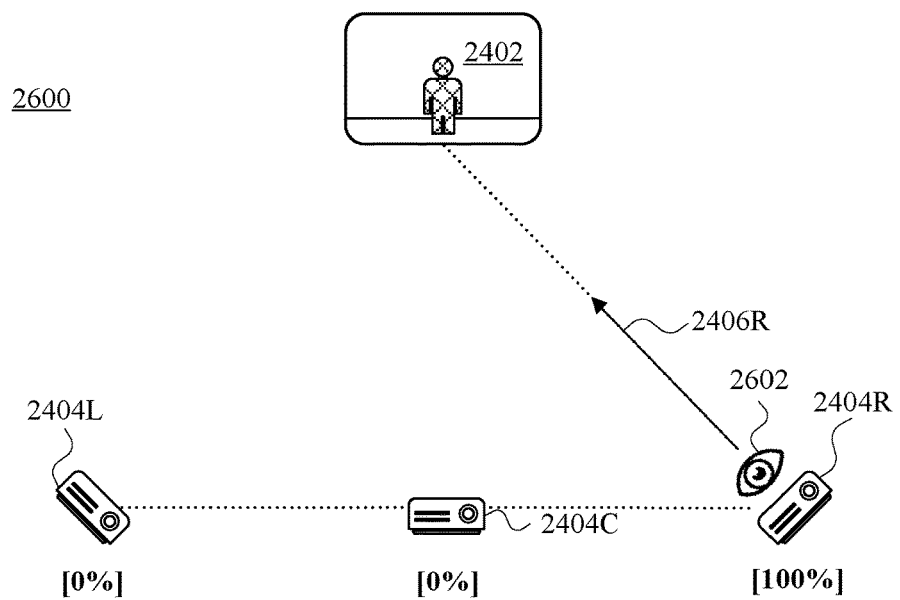
FIG. 26 is a view of the viewer-side arrangement of FIG. 24 in which a viewer has selected a rightmost viewpoint, in accordance with at least one embodiment.
Figure 27:
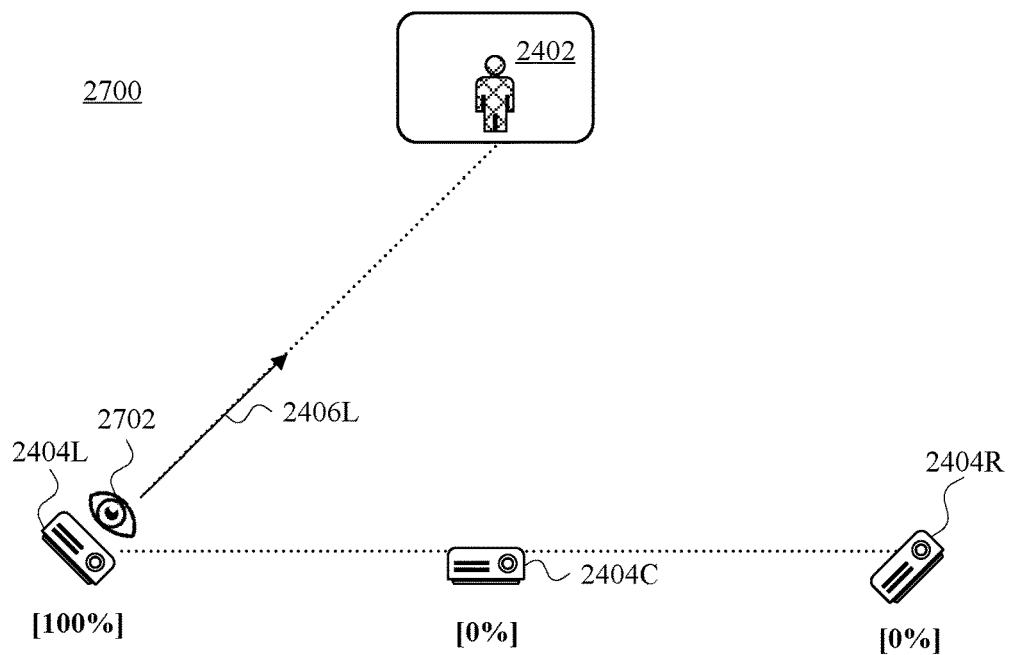
FIG. 27 is a view of the viewer-side arrangement of FIG. 24 in which a viewer has selected a leftmost viewpoint, in accordance with at least one embodiment.

FIG. 25-29 show respective views of five different example user-selected viewpoints, and the resulting weighting percentages that in at least one embodiment are given the various virtual-projection viewpoints 2404L, 2404C, and 2404R in the various different example scenarios. FIGS. 25-27 show three different user-selected viewpoints in which one of the three percentages is 100% and the other two are 0%. Thus, a given vertex is visible from multiple ones of the virtual-projection viewpoints 2404L, 2404C, and 2404R. Only the color information associated with one of those three virtual-projection viewpoints is used. Rather, this division of percentages in those three figures is meant to indicate that, from those three particular user-selected viewpoints, there are no vertices that are visible from more than one of the virtual-projection viewpoints.

FIG. 25 shows a view 2500 in which a perfectly centered user-selected viewpoint 2502 (looking perfectly along the ray 2406C) results in a 100% usage of the color information for the center virtual-projection viewpoint 2404C, 0% usage of the color information for the left-side virtual projection viewpoint 2404L and 0% usage of the color information for the right-side virtual-projection viewpoint 2404R.

FIG. 26 shows a view 2600 in which a rightmost user-selected viewpoint 2602 (looking along the ray 2406R) results in a 100% usage of the color information for the right-side virtual-projection viewpoint 2404R, 0% usage of the color information for the center virtual projection viewpoint 2404C, and 0% usage of the color information for the left-side virtual-projection viewpoint 2404L.

FIG. 27 shows a view 2700 in which a leftmost user-selected viewpoint 2702 (looking perfectly along the ray 2406L) results in a 100% usage of the color information for the left-side virtual-projection viewpoint 2404L, 0% usage of the color information for the center virtual projection viewpoint 2404C, and 0% usage of the color information for the right-side virtual-projection viewpoint 2404R.

Figure 28:
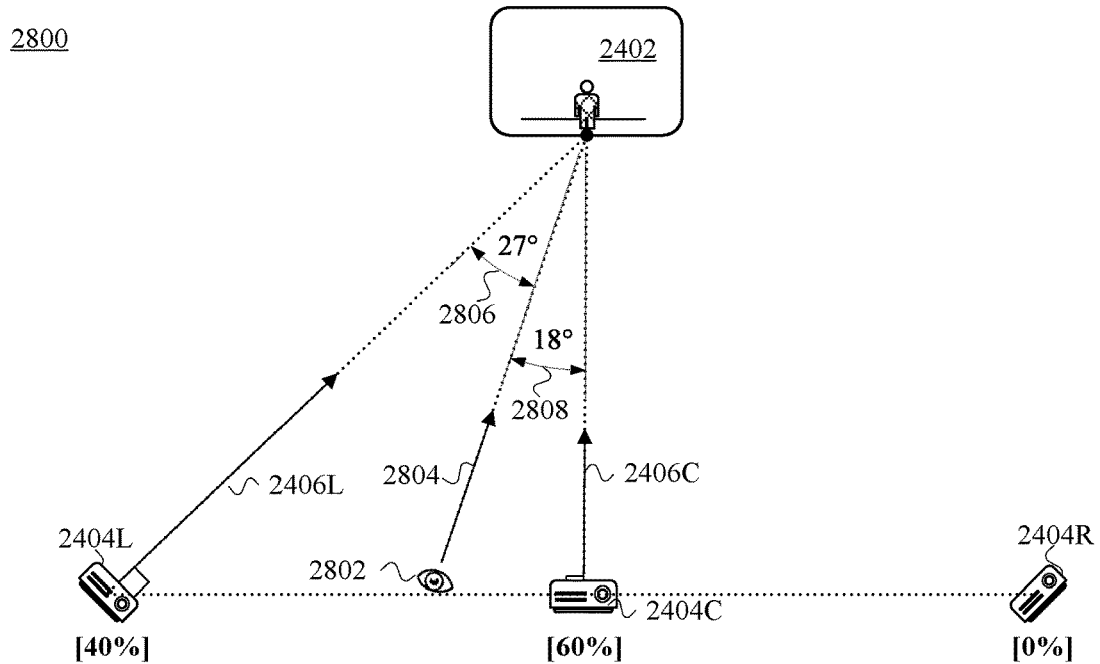
FIG. 28 is a view of the viewer-side arrangement of FIG. 24 in which a viewer has selected an example intermediate viewpoint between the center viewpoint of FIG. 25 and the leftmost viewpoint of FIG. 27, in accordance with at least one embodiment.

FIG. 28 shows a view 2800 in which a user-selected viewpoint 2802 (looking along a ray 2804) is an intermediate viewpoint between the center viewpoint 2502 of FIG. 25 and the leftmost viewpoint 2702 of FIG. 27. In the example, this results in a 27° angle 2806 between the ray 2406L and the ray 2804 and also results in an 18° angle 2808 between the ray 2804 and the ray 2406C. As one might expect from a user-selected viewpoint that is angularly closer to center, the resulting percentage weighting (60%) given to pixel colors from the center virtual projection viewpoint 2404C is greater than the percentage weighting (40%) given in this example to color-pixel information from the left-side virtual-projection viewpoint 2404L. In this example, the center-viewpoint color information weight was derived by the fraction 27°/45°, while the left-side viewpoint color-information weight was derived by the complementary fraction 18°/45°. Other approaches could be used.

Figure 29:
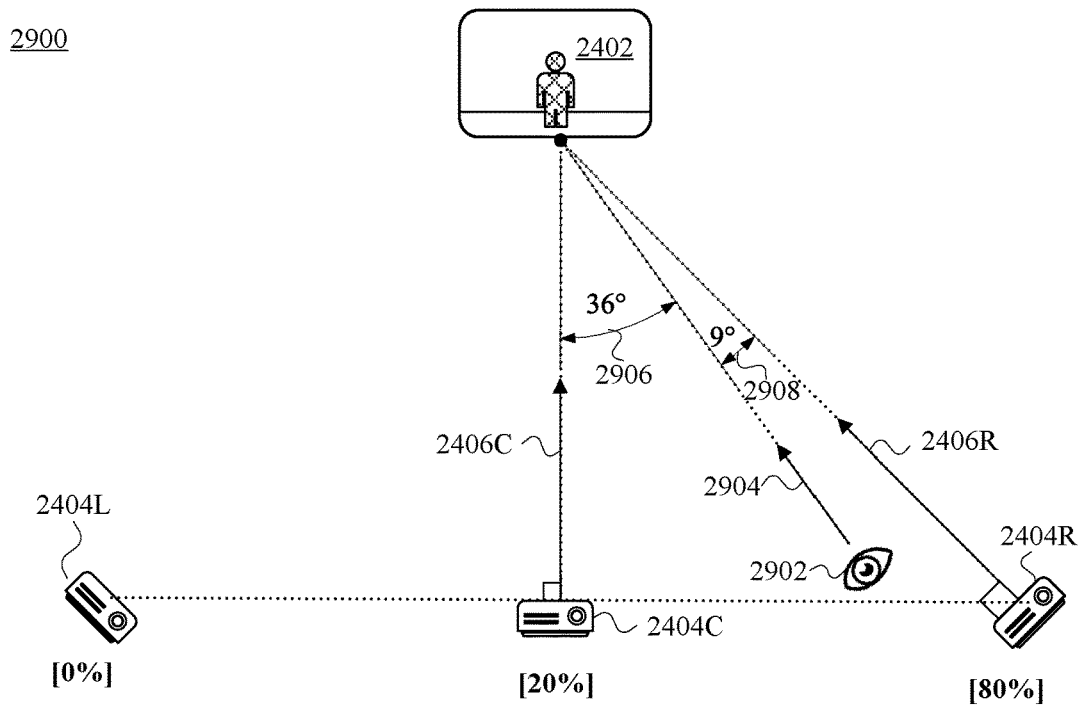
FIG. 29 is a view of the viewer-side arrangement of FIG. 24 in which a viewer has selected an example intermediate viewpoint between the center viewpoint of FIG. 25 and the rightmost viewpoint of FIG. 26, in accordance with at least one embodiment.

FIG. 29 shows a view 2900 in which a user-selected viewpoint 2902 (looking along a ray 2904) is an intermediate viewpoint between the center viewpoint 2502 of FIG. 25 and the rightmost viewpoint 2602 of FIG. 26. In the example, this results in a 36° angle 2906 between the ray 2406C and the ray 2904 and also results in an 9° angle 2908 between the ray 2904 and the ray 2406R. From a user-selected viewpoint that is angularly closer to the rightmost viewpoint than it is to the center viewpoint, the resulting percentage weighting (80%) given to pixel colors from the right-side virtual projection viewpoint 2404R is greater than the percentage weighting (20%) given in this example to color-pixel information from the center virtual-projection viewpoint 2404C. In this example, the center-viewpoint color information weight was derived by the fraction 9°/45°, while the right-side viewpoint color-information weight was derived by the complementary fraction 36°/45°. Certainly other approaches could be used.

What is claimed is:

1. A method comprising:
receiving a plurality of video streams captured of a subject by a plurality of video cameras, each video stream including video frames that are time-synchronized according to a shared frame rate, each video camera having a known vantage point in a predetermined coordinate system;
obtaining at least one three-dimensional (3D) mesh of the subject at the shared frame rate, the at least one 3D mesh time-synchronized with the video frames of the video streams, the at least one 3D mesh including a plurality of vertices with known locations in the predetermined coordinate system, wherein, for a current frame, obtaining the at least one 3D mesh of the subject at the shared frame rate includes:
receiving a current-frame 3D mesh of the subject corresponding to the current frame,
deforming, based at least in part on the current-frame 3D mesh of the subject, a previous-frame 3D mesh of the subject corresponding to a previous frame, and
determining, based on the deformed previous-frame 3D mesh of the subject, the at least one 3D mesh for use with the current frame;
calculating one or more lists of visible-vertices at the shared frame rate, each list including a subset of the plurality of vertices of the at least one 3D mesh of the subject, the subset being a function of the location of the known vantage point associated with at least one of the plurality of video cameras;
generating one or more time-synchronized data streams at the shared frame rate, the one or more time-synchronized data streams including:
one or more video streams encoding at least one of the plurality of video streams; and
one or more geometric-data streams including the calculated one or more visible-vertices lists; and
transmitting the one or more time-synchronized data streams to a receiver for rendering of a viewpoint-adaptive 3D persona of the subject.

2. The method of claim 1, wherein deforming, based at least in part on the current-frame 3D mesh of the subject, the previous-frame 3D mesh of the subject corresponding to the previous frame comprises moving vertices of the previous-frame 3D mesh of the subject closer to corresponding vertices of the current-frame 3D mesh of the subject.

3. The method of claim 2, wherein moving the vertices of the previous-frame 3D mesh of the subject closer to the corresponding vertices of the current-frame 3D mesh of the subject is constrained to a predefined amount or type of motion of the subject.

4. The method of claim 1, further comprising:
receiving a plurality of depth-data streams captured of the subject by a plurality of depth cameras that each have a known vantage point, each depth-data stream including depth-data frames, each depth-data frame including a plurality of depth-data points, the depth-data frames being time-synchronized with the video frames according to the shared frame rate.

5. The method of claim 4, wherein obtaining the at least one 3D mesh of the subject at the shared frame rate includes generating the at least one 3D mesh of the subject at the shared frame rate based at least in part on the received time-synchronized depth-data frames and includes, in each shared-frame-rate period:
combining the depth-data points from the depth-data streams into a collective 3D point cloud in the predetermined coordinate system; and
generating the at least one 3D mesh based at least in part on the collective 3D point cloud.

6. The method of claim 5, wherein generating the at least one 3D mesh based at least in part on the collective 3D point cloud comprises:
identifying a plurality of mesh vertices of the at least one 3D mesh at least in part by performing Truncated Signed Distance Function (TSDF) processing on the collective 3D point cloud.

7. The method of claim 5, wherein generating the at least one 3D mesh based at least in part on the collective 3D point cloud further comprises:
defining a plurality of mesh triangles of the at least one 3D mesh at least in part by identifying connections among neighboring mesh vertices.

8. The method of claim 1 further comprising:
receiving a plurality of depth-data streams captured of the subject by a plurality of depth-data cameras, at least one of the plurality of depth-data streams including depth-data frames that are time-synchronized with the video frames of the plurality of video streams according to the shared frame rate.

9. The method of claim 8 wherein obtaining the at least one 3D mesh of the subject at the shared frame rate further comprises:
generating the at least one 3D mesh of the subject at the shared frame rate based at least in part on the received time-synchronized depth-data frames in the plurality of depth-data streams.

10. The method of claim 8, wherein each depth-data camera includes two stereoscopic infrared (IR) depth cameras; and
each depth-data camera is associated with an IR illuminator providing a temporally static pseudorandom pattern of IR light on the subject.

11. The method of claim 10 further comprising:
capturing a depth-data set with respect to the subject using the depth-data camera by:
collecting reflections of at least some of the pseudorandom pattern with each stereoscopic IR depth camera; and
generating the depth-data set with respect to the subject based on a stereoscopic-differential analysis of the collected respective reflections of at least some of the pseudorandom pattern, the depth-data set including a user extraction (UE) of the subject.

12. The method of claim 1, wherein calculating the one or more lists of visible-vertices at the shared frame rate, each list including a subset of the plurality of vertices of the at least one 3D mesh of the subject, the subset being a function of the location of the known vantage point associated with the at least one of the plurality of video cameras comprises:
modeling a virtual depth camera having a vantage point matching that of the corresponding video camera; and
evaluating the at least one 3D mesh from the vantage point of the virtual depth camera to identify vertices visible therefrom.

13. The method of claim 12, wherein evaluating the at least one 3D mesh includes performing a Z-delta analysis.

14. The method of claim 1, wherein each visible-vertices list from each respective vantage point is organized as a list of mesh triangles for which all three vertices are visible from the corresponding vantage point.

15. The method of claim 1, wherein generating the plurality of encoded video streams includes:
identifying, in the plurality received video streams, non-subject pixels that are determined to not represent the subject; and
replacing the identified non-subject pixels with one or more of chromakey pixels and/or alpha mask pixels in the plurality encoded video streams.

16. The method of claim 1, further comprising:
transmitting, to the receiver, data identifying pixels in the video frames that project on to which vertices in the at least one 3D mesh of the subject.

17. The method of claim 1, further comprising:
transmitting, to the receiver, camera-assembly-capabilities data that convey one or more technical specifications of each of the video cameras in two or more camera assemblies; and
geometric-arrangement data that convey the known vantage points in the predetermined coordinate system of each of the video cameras.

18. The method of claim 17, wherein the one or more geometric-data streams including the calculated one or more visible-vertices lists include a respective geometric-data stream for each camera assembly.

19. A presenter server system comprising:
a communication interface; a processor; and
data storage containing instructions executable by the processor for causing the presenter server system to carry out a set of functions, wherein the set of functions includes:
receiving, via the communication interface, a plurality of video streams captured of a subject by a plurality of video cameras, each video stream including video frames that are time-synchronized according to a shared frame rate, each video camera having a known vantage point in a predetermined coordinate system;
obtaining at least one three-dimensional (3D) mesh of the subject at the shared frame rate, the at least one 3D mesh time-synchronized with the video frames of the video streams, the at least one 3D mesh including a plurality of vertices with known locations in the predetermined coordinate system, wherein, for a current frame, obtaining the at least one 3D mesh of the subject at the shared frame rate includes:
receiving a current-frame 3D mesh of the subject corresponding to the current frame,
deforming, based at least in part on the current-frame 3D mesh of the subject, a previous-frame 3D mesh of the subject corresponding to a previous frame, and
determining, based on the deformed previous-frame 3D mesh of the subject, the at least one 3D mesh for use with the current frame;
calculating, by the processor, one or more lists of visible-vertices at the shared frame rate, each list including a subset of the plurality of vertices of the at least one 3D mesh of the subject, the subset being a function of the location of the known vantage point associated with at least one of the plurality of video cameras;
generating, by the processor, one or more time-synchronized data streams at the shared frame rate, the one or more time-synchronized data streams including:
one or more video streams encoding at least one of the plurality of video streams; and one or more geometric-data streams including the calculated one or more visible-vertices lists; and
transmitting, via the communications interface, the one or more time-synchronized data streams to a receiver for rendering of a viewpoint-adaptive 3D persona of the subject.

20. A presenter server system comprising:
a video-encoding module configured to:
receive a plurality of video streams captured of a subject by a plurality of video cameras, each video stream including video frames that are time-synchronized according to a shared frame rate, each video camera having a known vantage point in a predetermined coordinate system;
a geometric-calculation module configured to:
obtain at least one three-dimensional (3D) mesh of the subject at the shared frame rate, the at least one 3D mesh time-synchronized with the video frames of the video streams, the at least one 3D mesh including a plurality of vertices with known locations in the predetermined coordinate system, wherein, for a current frame, obtaining the at least one 3D mesh of the subject at the shared frame rate includes:
receiving a current-frame 3D mesh of the subject corresponding to the current frame,
deforming, based at least in part on the current-frame 3D mesh of the subject, a previous-frame 3D mesh of the subject corresponding to a previous frame, and
determining, based on the deformed previous-frame 3D mesh of the subject, the at least one 3D mesh for use with the current frame;
calculate one or more lists of visible-vertices at the shared frame rate, each list including a subset of the plurality of vertices of the at least one 3D mesh of the subject, the subset being a function of the location of the known vantage point associated with at least one of the plurality of video cameras;
generate one or more time-synchronized data streams at the shared frame rate, the one or more time-synchronized data streams including:
one or more video streams encoding at least one of the plurality of video streams; and one or more geometric-data streams including the calculated one or more visible-vertices lists; and
transmit the one or more time-synchronized data streams to a receiver for rendering of a viewpoint-adaptive 3D persona of the subject.

21. A method comprising:
receiving a set of video streams captured, of a subject, by a set of video cameras having known vantage points in a predetermined coordinate system, the video streams including time-synchronized video frames;

obtaining a three-dimensional (3D) mesh of the subject, wherein the 3D mesh is time-synchronized with the video frames of the video streams and includes a plurality of vertices with known locations in the predetermined coordinate system, wherein, for a current frame, obtaining the at least one 3D mesh of the subject includes determining the 3D mesh of the subject for the current frame based on a current-frame 3D mesh of the subject corresponding to the current frame and a previous-frame 3D mesh of the subject corresponding to a previous frame; and generating one or more time-synchronized data streams based on the set of video streams and the 3D mesh of the subject, wherein the one or more time-synchronized data streams are operable to cause a viewpoint-adaptive 3D persona of the subject to be rendered.

\* \* \* \* \*